United States Patent
Ohlmeyer

(10) Patent No.: US 12,522,575 B2
(45) Date of Patent: Jan. 13, 2026

(54) 2-DIARYLMETHYL-4-AMINOTE-TRAHYDROPYRAN DERIVATIVES AND RELATED COMPOUNDS AS ANTICANCER, ANTIINFLAMMATORY, ANTIFIBROTIC AND NEUROPROTECTIVE AGENTS

(71) Applicant: Atux Iskay LLC, Plainsboro, NJ (US)

(72) Inventor: Michael Ohlmeyer, Plainsboro, NJ (US)

(73) Assignee: Atux Iskay LLC, Plainsboro, NJ (US)

( * ) Notice: Subject to any disclaimer, the term of this patent is extended or adjusted under 35 U.S.C. 154(b) by 0 days.

(21) Appl. No.: 19/309,448

(22) Filed: Aug. 25, 2025

(65) Prior Publication Data
US 2025/0376455 A1    Dec. 11, 2025

Related U.S. Application Data

(63) Continuation of application No. 18/683,470, filed as application No. PCT/US2022/075138 on Aug. 18, 2022.

(60) Provisional application No. 63/234,522, filed on Aug. 18, 2021.

(51) Int. Cl.
| C07D 309/14 | (2006.01) |
| A61K 31/351 | (2006.01) |
| A61K 31/451 | (2006.01) |
| C07D 211/58 | (2006.01) |

(52) U.S. Cl.
CPC .......... *C07D 309/14* (2013.01); *A61K 31/351* (2013.01); *A61K 31/451* (2013.01); *C07D 211/58* (2013.01)

(58) Field of Classification Search
None
See application file for complete search history.

(56) References Cited

U.S. PATENT DOCUMENTS

| 334,104 | A | 1/1886 | Burmester |
| 9,540,358 | B2 | 1/2017 | Ohlmeyer et al. |
| 10,744,141 | B2 | 8/2020 | Goutham et al. |
| 2006/0122263 | A1 | 6/2006 | Dutta |
| 2017/0015630 | A1 | 1/2017 | Ohlmeyer et al. |
| 2018/0251444 | A1 | 9/2018 | Ohlmeyer et al. |
| 2019/0117663 | A1 | 4/2019 | Difeo et al. |
| 2023/0146127 | A1 | 5/2023 | Ohlmeyer |
| 2024/0368105 | A1 | 11/2024 | Ohlmeyer |

FOREIGN PATENT DOCUMENTS

| WO | 2012/074128 | | 6/2012 |
| WO | 2013/025882 | A1 | 2/2013 |
| WO | 2015/138496 | A1 | 9/2015 |
| WO | 2015/138500 | A1 | 9/2015 |
| WO | 2017/044567 | A1 | 3/2017 |
| WO | 2017/044575 | A1 | 3/2017 |
| WO | 2021/150697 | A1 | 7/2021 |
| WO | 2021/150700 | A1 | 7/2021 |
| WO | 2021/170913 | A1 | 9/2021 |
| WO | 2021/188949 | A1 | 9/2021 |
| WO | 2023/023594 | A1 | 2/2023 |
| WO | 2024/040045 | A2 | 2/2024 |
| WO | 2024/182363 | A1 | 9/2024 |

OTHER PUBLICATIONS

Wei et. al. "Direct Activation of Protein Phosphatase 2A (PP2A) by Tricyclic Sulfonamides Ameliorates Alzheimer's Disease Pathogenesis in Cell and Animal Models" Neurotherapeutics 2020, 17, 1087-1103 (Year: 2020).*
Supplementary Information for Wei et. al. "Direct Activation of Protein Phosphatase 2A (PP2A) by Tricyclic Sulfonamides Ameliorates Alzheimerâ's Disease Pathogenesis in Cell and Animal Models" Neurotherapeutics 2020, 17, 1087-1103. (Year: 2020).*
International Search Report and Written Opinion, mailed Nov. 23, 2022, for International Application Serial No. PCT/US2022/075138 filed Aug. 18, 2022.
International Search Report and Written Opinion, mailed May 13, 2021, for International Application Serial No. PCT/US2021/023234 filed Mar. 19, 2021.
National Library of Medicine / National Center for Biotechnology Information. "PUBCHEM CID 66631634", 1-10. Web. 2012; p. 2.
Chang et al., "Regioselective synthesis of 2-substituted 3-diarylmethylenylenylpiperidines", Tetrahedron Letters, vol. 53. Issue 6, Feb. 8, 2012 [retrieved on Apr. 28, 2021]. Retrieved from the Internet: <URL:https://www.sciencedirect.com/science/article/abs/pii/S0040403911020697>. Abstract.

(Continued)

*Primary Examiner* — Jennifer A Berrios
*Assistant Examiner* — Sophia Reilly
(74) *Attorney, Agent, or Firm* — K&L Gates LLP; Brian J. Novak; Benjamin D. Heuberger

(57) ABSTRACT

2-diarylmethyl-4-aminotetrahydropyran derivatives are disclosed. The compounds include the following genus:

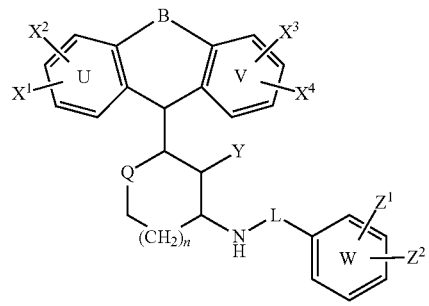

or a pharmaceutically acceptable salt thereof.
The compounds activate cellular PP2A, suppress oncogenic kinase signaling and negatively regulate MYC and MYCN in cancer. The compounds also induce FOXO transcription factor translocation to the nucleus by modulating PP2A and, as a consequence, exhibit anti-proliferative effects. They are useful in the treatment of a variety of disorders, including as a monotherapy in cancer treatment, or used in combination with other drugs to restore sensitivity to chemotherapy where resistance has developed.

19 Claims, 7 Drawing Sheets

(56) References Cited

OTHER PUBLICATIONS

Supplementary European Search Report dated Feb. 28, 2024 for European Application No. 21771472.4.
PUBCHEM, SID 465617953, Modify Date: Jul. 6, 2022 [retrieved on Apr. 16, 2024]., Retrieved from the Internet <URL:https://pubchem.ncbi.nlm.nih.gov/substance/465617953>.
International Search Report and Written Opinion, mailed Jun. 12, 2024, for International Application Serial No. PCT/US2024/017428 filed Feb. 27, 2024.
International Search Report and Written Opinion, mailed Feb. 22, 2024, for International Application Serial No. PCT/US2023/072200 filed Aug. 15, 2023.
U.S. Appl. No. 19/104,164, filed Feb. 14, 2025.
Extended European Search Report mailed Jul. 11, 2025 for European Patent Application No. 22859382.8.
U.S. Appl. No. 19/268,305, filed Jul. 14, 2025.
U.S. Appl. No. 19/159,289, filed Aug. 22, 2025.

* cited by examiner

2-DIARYLMETHYL-4-AMINOTETRA-HYDROPYRAN DERIVATIVES AND RELATED COMPOUNDS AS ANTICANCER, ANTIINFLAMMATORY, ANTIFIBROTIC AND NEUROPROTECTIVE AGENTS

RELATED APPLICATIONS

This application is a continuation of U.S. patent application Ser. No. 18/683,470, filed Feb. 13, 2024, which is a national stage entry under 35 U.S.C. § 371 of International Patent Application No. PCT/US2022/075138, filed Aug. 18, 2022, which claims priority of U.S. Provisional Patent Application No. 63/234,522, filed Aug. 18, 2021, the entire content of which is incorporated herein by reference.

STATEMENT OF GOVERNMENT SUPPORT

This invention was made with government support under W81XWH-20-1-0494 awarded by the Defense Health Agency, Medical Research and Development Branch, and under R44 AG071040 and R44 CA268329 awarded by the National Institutes of Health. The government has certain rights in the invention.

FIELD OF THE INVENTION

The invention relates to the use of small molecule modulators of PP2A, comprising 2-diarylmethyl-4-aminotetrahydropyran derivatives to treat diseases such as cancer, inflammatory and autoimmune conditions, and neurodegenerative diseases.

BACKGROUND

Protein phosphatase 2A is one of the four major serine threonine phosphatases and is implicated in the negative control of cell growth and division. Protein phosphatase 2A holoenzymes are composed of a structural subunit A and a catalytic subunit C which form a catalytically competent PP2A AC heterodimer. PP2A AC heterodimers then associate with a regulatory B subunit, which controls substrate specificity. Regulatory B subunits occur in four families and their expression is cell-type and context dependent. The PP2A heterotrimeric protein phosphatase is a ubiquitous and conserved phosphatase with diverse cellular functions. Among the targets of PP2A of the classical B-subunit containing holoenzymes are proteins of oncogenic signaling cascades, such as Raf, MEK, and AKT, and in this role they function as tumor suppressors.

Recently PP2A AC heterodimers have been shown to interact directly with the INTS6 subunit of the Integrator Complex without any B subunit. Integrator associates with RNA Polymerase II (RNAPII) to control it's transcriptional activity and PP2A AC associated Integrator acts to maintain RNAPII in a paused (i.e. transcriptionally stalled) state. This non-classical PP2A-Integrator complex thus functions to restrain transcription and this activity also contributes the tumor suppressor property of PP2A in transcriptionally addicted cancers, for example breast, lung, prostate, ovarian cancers, glioblastoma, melanoma, leukemia, and others in adults. Also in pediatric cancers such as neuroblastoma and medulloblastoma in children and infants.

Myc proteins (c-myc, Mycn and Mycl) target proliferative and apoptotic pathways vital for progression in cancer and it is overexpressed and deregulated in many human cancers. The control of Myc abundance through protein degradation has attracted considerable interest and Ser-62 phosphorylation by a number of kinases has been shown to stabilize the protein. PP2A is responsible for Ser-62 dephosphorylation which primes the protein for ubiquitylation and degradation, thus PP2A functions as a negative regulator of Myc.

The FOXO (Forkhead transcription factors, Class O) proteins are a group of transcription factors involved in control of a variety of physiological, metabolic and developmental pathways. They are downstream effectors in a number of signaling pathways including insulin and growth factor signaling; they are also regulated by oxidative stress and nutrient deprivation. Cellular processes affected by FOXO activity include cell cycle control, differentiation, proliferation and apoptosis. Disregulation of FOXO mediated processes has been implicated in a number of pathologies including tumorigenesis, inflammation, fibrosis, diabetes, neurodegenerative and other age related conditions amongst others. Activity of FOXO transcription factors are controlled in part by their sub-cellular localization, in particular their localization to the nucleus from the cytosol, and their subsequent transcriptional activation.

FOXO1 regulates expression of a number of genes that play critical roles in cell cycle and apoptosis. A pivotal regulatory mechanism of FOXO is reversible phosphorylation, catalyzed by kinases and phosphatases. Phosphorylation of FOXO1 is associated with 14-3-3 binding and cytosolic localization, whereas dephosphorylated FOXO1 translocates to the nucleus and is transcriptionally active. FOXO3 is regulated in an analogous manner.

PP2A interacts directly with FOXO1 and dephosphorylates FOXO1. Inhibition of PP2A phosphatases rescues FOXO1-mediated cell death by regulating the level of the pro-apoptotic protein BIM. In addition, PP2A directly regulates FOXO3a subcellular localization and transcriptional activation. Without wishing to be held to any particular theory, it may be that the compounds described herein promote apoptosis by acting on FOXO transcription factors via activation of PP2A.

Prostate cancer is the second leading cause of cancer death in men in America, behind lung cancer. According to the American Cancer Society, approximately 1 man in 36 will die of prostate cancer. Male hormones, specifically testosterone, fuel the growth of prostate cancer. By reducing the amount and activity of testosterone, the growth of advanced prostate cancer is slowed. Endocrine therapy, known as androgen ablation, is the first line of treatment for metastatic prostate cancer. Androgen deprivation therapy for metastatic prostate cancer results in tumor regression and symptomatic improvement in the majority of patients. However, metastatic prostate cancer inevitably progresses despite castrate levels of serum testosterone. Several new therapies have been approved for patients with castration-resistant prostate cancer (CRPC); however, none are curative and tumors ultimately develop resistance. To combat CRPC new approaches and novel therapies are required.

Breast cancer can affect both men and women. Breast cancer is the most prevalent cancer in women, after skin cancers, with about 1 in every 8 women expected to develop invasive breast cancer at some point. One subset of breast cancer expresses the androgen receptor (AR), which has been implicated as a therapeutic target in that subset. About 10-20% of breast cancers—more than one out of every 10—are found to be triple-negative. "Triple negative breast cancer" refers to a breast cancer that does not contain estrogen receptors, progesterone receptors, or human epidermal growth factor receptor 2 (HER2). This means that the growth of the cancer is not supported by the hormones estrogen and progesterone, nor by the presence of too many HER2 receptors. Therefore, triple-negative breast cancer does not respond to hormonal therapy (such as tamoxifen or aromatase inhibitors) or therapies that target HER2 receptors, such as Herceptin (chemical name: trastuzumab). While these tumors are often treatable, the chemotherapy is not targeted, and response durations are short. For doctors and researchers, there is intense interest in finding new medications that can treat breast cancer.

The compounds described herein, which are based on a 2-diarylmethyl-4-dminotetrahydropyran scaffold, exhibit anti-proliferative effects by increasing PP2A activity in cells with suppressed or deficient phosphatase activity and are therefore useful as monotherapy in cancer treatment. Additionally, they can be used in combination with other drugs to restore sensitivity to chemotherapy where resistance has developed. The compounds may also be used in treatment of other diseases characterized by deficient PP2A activity, for example lung fibrosis and Alzheimer's Disease.

SUMMARY OF THE INVENTION

A genus of 2-diarylmethyl-4-dminotetrahydropyran amine derivatives and related compounds has now been found that modulate PP2A activity. The compounds deactivate pro-growth and pro-survival kinases such as phospo-ERK and phospho-AKT by promoting their deposphorylation by PP2A; they destabilize oncogenic MYC by promoting PP2A mediated dephoshorylation of MYC, and they promote RNAPII promoter proximal pausing during transcription. The compounds described herein exhibit anti-proliferative effects, and are useful in the treatment of a variety of disorders, including as a monotherapy in cancer treatment, or used in combination with other drugs to restore sensitivity to chemotherapy where resistance has developed.

In one aspect the invention relates to compounds of formula (I):

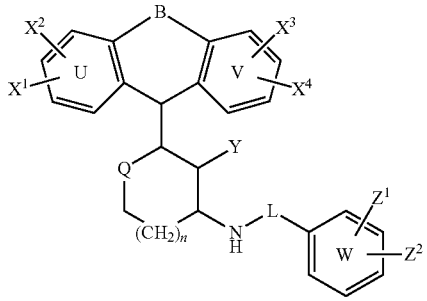

I wherein:

B (which may also be referred to herein as "$J^1$") is absent (that is, the rings U and V are substituted with hydrogen at the corresponding position where B is attached) or is selected from a direct bond, —$CH_2CH_2$—, —CH=CH—, O, S, or —$NR^B$—C(O)—;

Q (which may also be referred to herein as "$J^2$") is selected from —O— or $NR^Q$;

L (which may also be referred to herein as "$J^3$") is a group selected from:

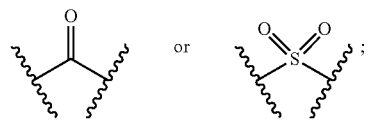

U (which may also be referred to herein as "$J^4$"), V (which may also be referred to herein as "$J^5$"), and W (which may also be referred to herein as "$J^6$") are independently carbocyclic aromatic (for example, an aryl ring, which includes ($C_6$-$C_{10}$)aryl, such as phenyl) or heteroaromatic (for example, a heteroaryl ring, which includes ($C_2$-$C_9$) heteroaryl that includes one or more ring heteroatoms selected, independently, from N, O, or S) rings; n=0 or 1;

$X^1$, $X^2$, $X^3$ and $X^4$ are independently selected in each instance from hydrogen, halogen, nitro, cyano, ($C_1$-$C_6$) alkyl optionally substituted with —OH, ($C_1$-$C_6$)haloalkyl, ($C_1$-$C_6$)haloalkoxy (i.e., O—($C_1$-$C_6$ haloalkyl)), ($C_1$-$C_6$)haloalkylthio (i.e., S—($C_1$-$C_6$ haloalkyl)), —$NR^1R^2$, —$OR^1$, —$C(O)R^1$, —$OC(O)R^1$, —$C(O)NR^1R^2$, —$C(O)OR^1$, —$SR^1$, —$SO^2R^1$, and —$SO^2NR^1R^2$;

Y (which may also be referred to herein as "$J^7$") is H or hydroxyl;

$Z^1$ and $Z^2$ are independently selected in each instance from hydrogen, halogen, nitro, cyano, azido, ($C_1$-$C_6$) alkyl, ($C_1$-$C_6$)haloalkyl, ($C_1$-$C_6$)haloalkoxy, ($C_1$-$C_6$) haloalkylthio, —$NR^1R^2$, —$NR^1C(O)R^2$, —$NR^1C(O)OR^3$, —$OR^1$, —$C(O)R^1$, —$OC(O)R^1$, —$C(O) NR^1R^2$, —$C(O)OR^1$, —$SR^1$, —$SO^2R^1$, —$SO_2NR^1R^2$, and five membered heterocyclyl (e.g., a heterocyclyl ring including five ring atoms, which ring atoms are selected, independently, from one or more of $C_1$-$C_4$, N, O, or S);

$R^B$ is selected from H, or lower alkyl (e.g., ($C_1$-$C_6$)alkyl);

$R^Q$ is selected from H, optionally substituted lower alkyl (e.g., ($C_1$-$C_6$)alkyl), or aryl (e.g., ($C_6$-$C_{10}$)aryl);

$R^1$ is H or ($C_1$-$C_6$)alkyl;

$R^2$ is H or ($C_1$-$C_6$)alkyl; and $R^3$ is H or ($C_1$-$C_6$)alkyl.

In another aspect, the invention relates to pharmaceutical compositions comprising the compounds described herein.

In another aspect, the invention relates to methods and uses of the above-described compounds in medicine, particularly for the treatment of a disease chosen from (a) cancer; (b) diabetes; (c) autoimmune disease; (d) age onset proteotoxic disease (particularly neurodegenerative disease); (e) mood disorder; (f) acne vulgaris; (g) solid organ transplant rejection (graft vs. host disease); (h) pulmonary disease (such as COPD or IPF); (i) cardiac hypertrophy and heart failure; (j) viral or parasitic infection; (k) inflammatory conditions (such as asthma) and (l) organ fibrosis (such as kidney fibrosis). These methods include administering to a patient a therapeutically effective amount of a compound described herein.

In another h aspect, the invention relates to a method for restoring sensitivity to one or more chemotherapeutic agents in the treatment of cancer. The method includes administering an effective amount of a compound described herein.

In another aspect, the invention relates to a method for treating a disease or disorder in a patient where the disease or disorder involves the dysregulation of PP2A influenced signaling cascades such as the PI3K-AKT and MAP kinase pathways. These methods include administering to a patient a therapeutically effective amount of a compound described herein.

In another aspect, the invention relates to a method for treating a disease or disorder in a patient where the disease or disorder involves the dysregulation of a Myc dependent signaling pathway. These methods include administering to a patient a therapeutically effective amount of a compound described herein.

In another aspect, the invention relates to a method for treating a metabolic disease or disorder in a patient where the disease or disorder involves the dysregulation of the mTOR-PP2A signaling axis. The method includes administering an effective amount of a compound described herein.

In another aspect, the invention relates to a method for treating disease or disorder in a patient where the disease or disorder involves cellular hyperproliferation and growth due to dysregulation of the PP2A-Integrator-RNAPII axis.

DETAILED DESCRIPTION OF THE INVENTION

Figure 1:
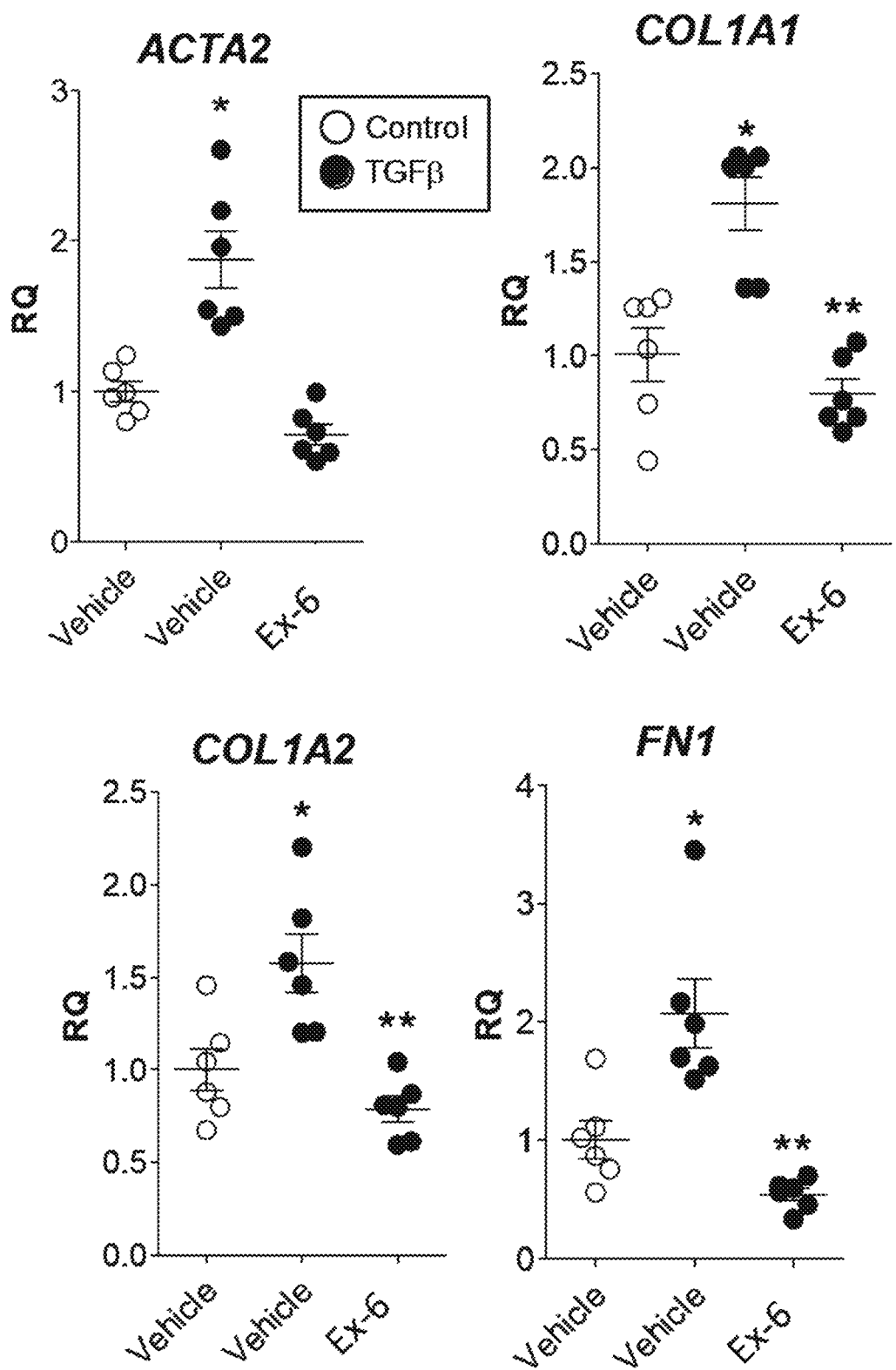
FIG. 1 shows expression of certain fibrosis associated genes in lung fibroblasts from healthy subjects following treatment with vehicle, TGF-β, or 1 μM Example 6 for 24 hours. Each dot represents cells from a different subject. Student t-tests or 2-way ANOVA were performed and a p-value >0.05 was denoted as * when comparing to the vehicle treated groups or ** when comparing to the TGF-β vehicle groups.

Substituents are generally defined when introduced and retain that definition throughout the specification and in all independent claims.

In a composition aspect, the invention relates to compounds of formula (I):

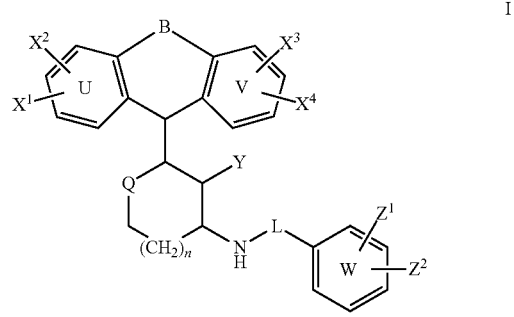

as described above.

In some embodiments, the Invention relates to compounds of formula IIa, IIb, IIc, or IId:

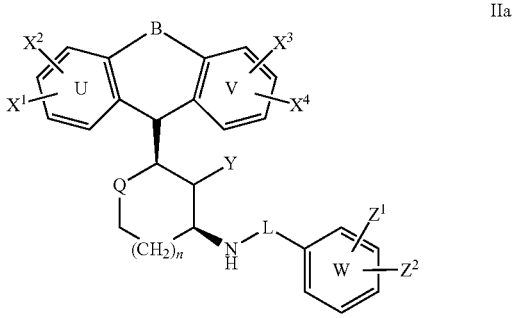

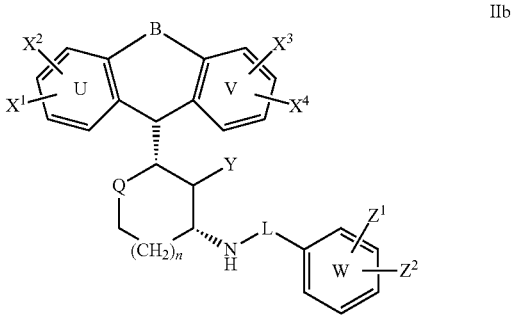

-continued

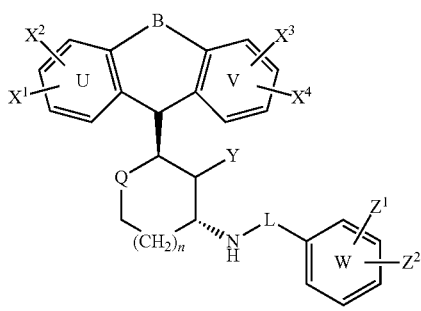

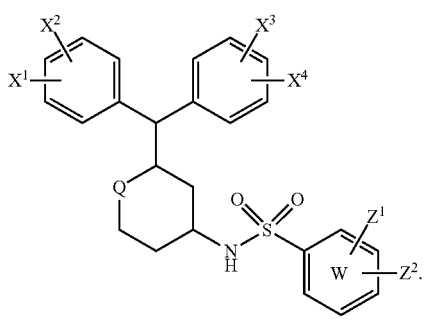

In the embodiments described herein, the compound may be of formula I, IIa, IIb, IIc, or IId, unless otherwise indicated.

In some embodiments Q is —O— with n=1, a tetrahydropyran

In some embodiments Q is —NR$^Q$— with n=1, a piperidine

In some embodiments U and V are carbocyclic aromatic

In some embodiments Q is —O— with n=1, L=—S(O)$_2$— and Y=H, where U and V are carbocyclic aromatic

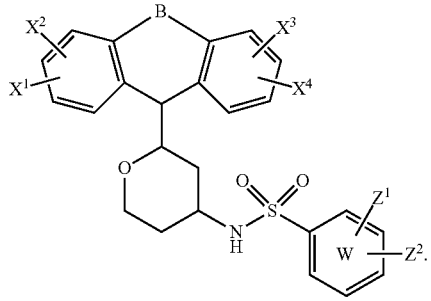

In some embodiments Q is —NH—, a piperidine:

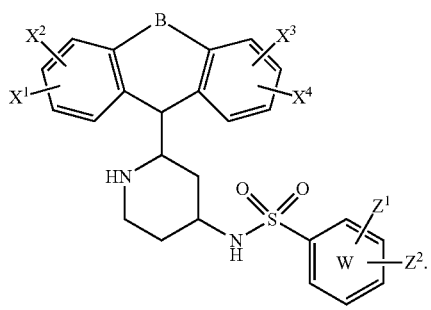

In some embodiments, B is absent. These embodiments include diarylmethyl compounds:

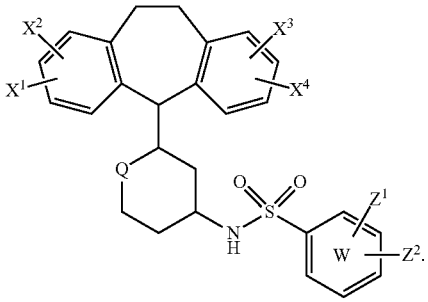

In other embodiments, B is —CH$_2$CH$_2$— to give dibenzocycloheptane compounds:

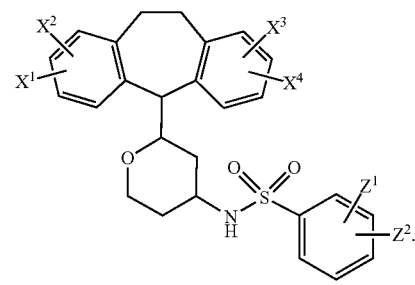

In still further embodiments where Q is —O—, B is —CH$_2$CH$_2$—, W is carbocyclic aromatic:

In some embodiments, X$^1$, X$^2$, X$^3$, and X$^4$ are independently selected in each instance from hydrogen, halogen, nitro, cyano, (C$_1$-C$_6$)alkyl optionally substituted with —OH, (C$_1$-C$_6$)haloalkyl, (C$_1$-C$_6$)haloalkoxy, (C$_1$-C$_6$)haloalkylthio, —NR$^1$R$^2$, —OR$^1$, —C(O)R$^1$, —OC(O)R$^1$, —C(O)NR$^1$R$^2$, —C(O)OR$^1$, —SR$^1$, —SO$_2$R$^1$, and —SO$^2$NR$^1$R$^2$. In other embodiments, X$^2$ and X$^4$ are each hydrogen. In still other embodiments, X$^2$ and X$^4$ are each hydrogen, and X$^1$ and X$^3$ are each chosen independently from —H, —F, —Cl, —CF$_3$, —C(CH$_3$)$_2$OH, or —C(O)NMe$_2$. In further embodiments, all of X$^1$, X$^2$, X$^3$ and X$^4$ are each hydrogen. In yet other embodiments, at least one of X$^1$, X$^2$, X$^3$ and X$^4$ is located at a carbon two positions away from a bridgehead carbon.

In some embodiments, Z$^1$ and Z$^2$ are independently selected in each instance from hydrogen, halogen, nitro, cyano, azido, (C$_1$-C$_6$)alkyl, (C$_1$-C$_6$)haloalkyl, (C$_1$-C$_6$)haloalkoxy, (C$_1$-C$_6$)haloalkylthio, —NR$^1$R$^2$, —NR$^1$C(O)R$^2$, —NR¹C(O)OR⁶, —OR¹, —C(O)R¹, —OC(O)R¹, —C(O) NR¹R², —C(O)OR¹, —SR¹, —SO²R¹, —SO₂NR¹R², and five membered heterocyclyl. In other embodiments, $Z^1$ is H. In still other embodiments, $Z^2$ is chosen from hydrogen, halogen, and $(C_1-C_6)$haloalkoxy. In yet other embodiments, $Z^2$ is chosen from hydrogen, F, Cl, and $OCF_3$. In further embodiments, $Z^2$ is in the para position.

In some embodiments:

B is absent or —CH₂CH₂—;

L is selected from

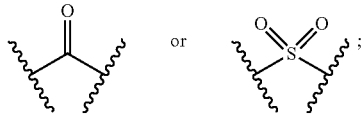

Q is selected from —O— with n=1 or 0;

U, V and W are carbocyclic aromatic;

$X^2$ and $X^4$ are each hydrogen, and $X^1$ and $X^3$ are each chosen independently from —H, —F, —Cl, —CF₃, —C(CH₃)₂OH, —C(O)NMe₂;

Y is H $Z^1$ is hydrogen; and $Z^2$ is selected in each instance from hydrogen, halogen, trifluoromethyl and $(C_1-C_6)$haloalkoxy.

In some embodiments, the compounds provided herein have the formula:

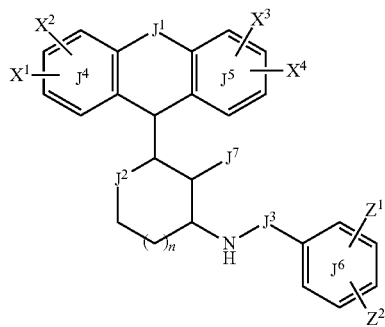

or a pharmaceutically acceptable salt thereof, wherein:

$J^1$ is absent, or $J^1$ is a direct bond, CH₂CH₂, CH=CH, O, S, or $N(R^B)C(O)$;

$J^2$ is selected from O or N ($R^Q$);

$J^3$ is

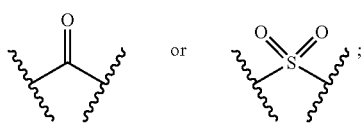

$J^4$, $J^5$, and $J^6$ are, independently, carbocyclic aromatic or heteroaromatic rings;

$J^7$ is H or OH;

n is 0 or 1;

$X^1$, $X^2$, $X^3$, and $X^4$ are, independently, hydrogen, halogen, nitro, cyano, $(C_1-C_6)$alkyl, $(C_1-C_6)$alkyl-OH, $(C_1-C_6)$haloalkyl, $(C_1-C_6)$haloalkoxy, $(C_1-C_6)$haloalkylthio, NR¹R², OR¹, C(O)R¹, OC(O)R¹, C(O)NR¹R², C(O) OR¹, SR¹, SO₂R¹, or SO₂NR¹R²;

$Z^1$ and $Z^2$ are, independently, hydrogen, halogen, nitro, cyano, azido, $(C_1-C_6)$alkyl, $(C_1-C_6)$haloalkyl, $(C_1-C_6)$haloalkoxy, $(C_1-C_6)$haloalkylthio, NR¹R², NR¹C(O) R², NR¹C(O)OR³, OR¹, C(O)R¹, OC(O)R¹, C(O) NR¹R², C(O)OR¹, SR¹, SO₂R¹, SO₂NR¹R², or five membered heterocyclyl;

$R^B$ is H or lower alkyl;

$R^Q$ is H, optionally substituted lower alkyl, or aryl;

$R^1$ is H or $(C_1-C_6)$alkyl;

$R^2$ is H or $(C_1-C_6)$alkyl; and $R^3$ is H or $(C_1-C_6)$alkyl.

In some embodiments, the compounds provided herein have the formula:

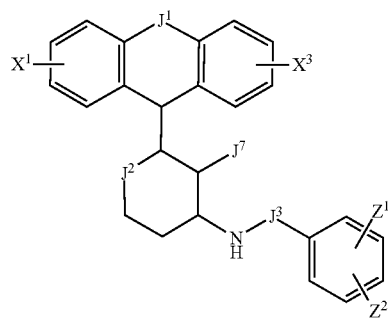

or a pharmaceutically acceptable salt thereof, wherein:

$J^1$ is absent or CH₂CH₂;

$J^2$ is O, NH, or NCH₃;

$X^1$ is H, F, Cl, Br, or I;

$X^2$ is H, F, Cl, Br, or I;

$Z^1$ is H, F, Cl, Br, I, $C_{1-3}$ alkyl, $C_{1-3}$ haloalkyl, $O(C_{1-3}$ alkyl), or $O(C_{1-3}$ haloalkyl); and $Z^2$ is F, Cl, Br, I, $C_{1-3}$ alkyl, $C_{1-3}$ haloalkyl, $O(C_{1-3}$ alkyl), or $O(C_{1-3}$ haloalkyl).

In some embodiments, the compounds provided herein have the formula:

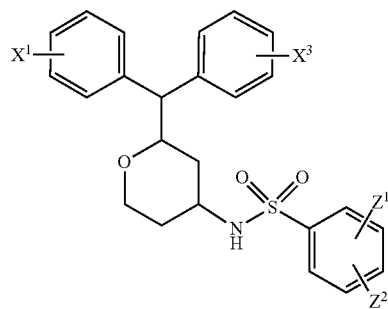

or a pharmaceutically acceptable salt thereof.

In some embodiments, the compounds provided herein have the formula:

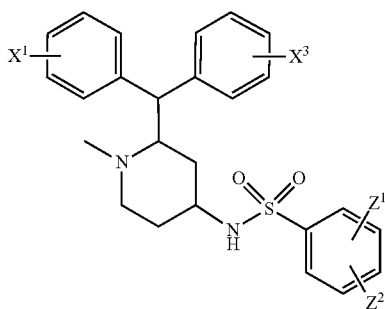

or a pharmaceutically acceptable salt thereof.

In some embodiments, the compounds provided herein have the formula:

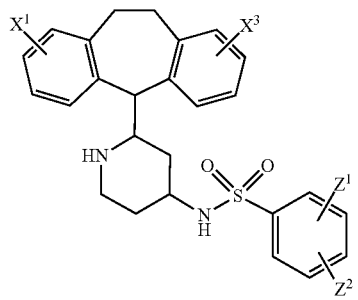

or a pharmaceutically acceptable salt thereof.

In some embodiments, the compounds provided herein have the formula:

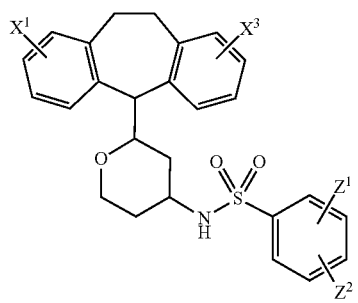

or a pharmaceutically acceptable salt thereof.

In some embodiments, the compounds provided herein have the formula:

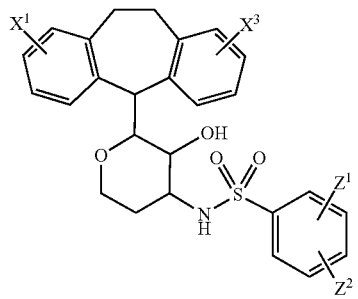

or a pharmaceutically acceptable salt thereof.

In some embodiments, the compounds provided herein have the formula:

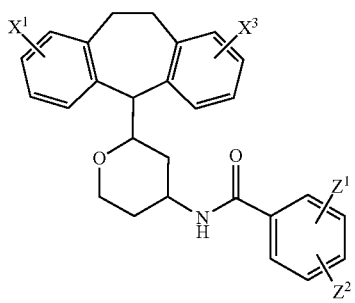

or a pharmaceutically acceptable salt thereof.

In some embodiments, the compounds provided herein have the formula:

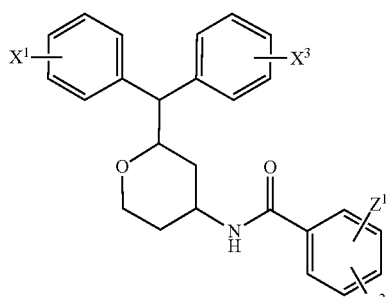

or a pharmaceutically acceptable salt thereof.

In some embodiments, the compounds provided herein have the formula:

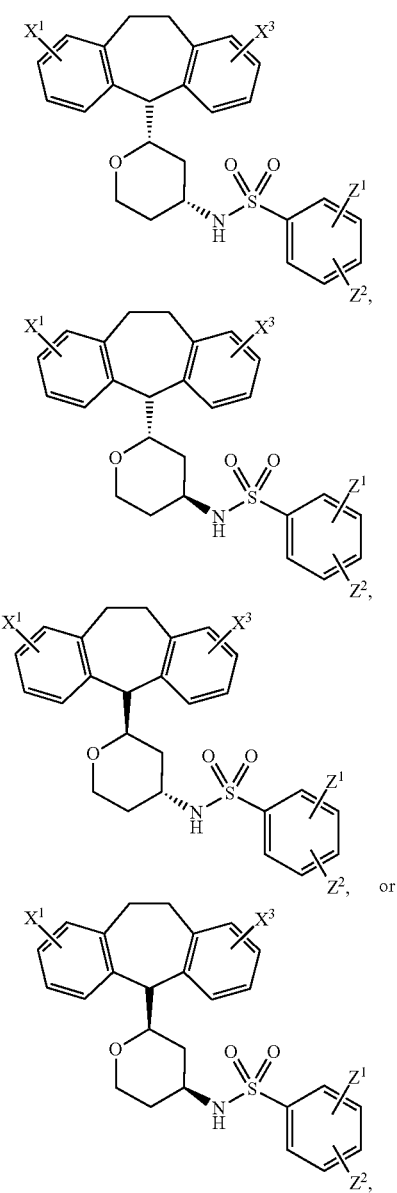

or a pharmaceutically acceptable salt thereof.

In some embodiments, the compounds provided herein have the formula:

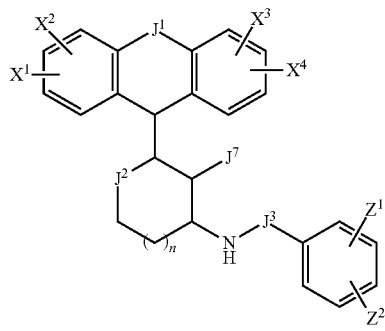

or a pharmaceutically acceptable salt thereof.

In some embodiments of the compounds provided herein, $J^1$ is absent or $CH_2CH_2$;
$J^2$ is O, NH, or $NCH_3$;
$X^1$ is H, F, Cl, Br, or I;
$X^2$ is H, F, Cl, Br, or I;
$Z^1$ is H, F, Cl, Br, I, $C_{1-3}$ alkyl, $C_{1-3}$ haloalkyl, $O(C_{1-3}$ alkyl), or $O(C_{1-3}$ haloalkyl); and
$Z^2$ is F, Cl, Br, I, $C_{1-3}$ alkyl, $C_{1-3}$ haloalkyl, $O(C_{1-3}$ alkyl), or $O(C_{1-3}$ haloalkyl).

In some embodiments of the compounds provided herein, $J^1$ is absent or $CH_2CH_2$;
$J^2$ is O, NH, or $NCH_3$;
$J^7$ is H or OH;
n is 1;
$X^1$ is H or F;
$X^2$ is H or F;
$X^3$ is H or F;
$X^4$ is H or F;
$Z^1$ is H, Cl, Br, $CH_3$, $CF_3$, or $OCF_3$;
$Z^2$ is Cl, Br, $CH_3$, $CF_3$, or $OCF_3$;
$R^B$ is H or $(C_1-C_6)$alkyl;
$R^Q$ is H or $(C_1-C_6)$alkyl;
$R^1$ is H or $(C_1-C_6)$alkyl;
$R^2$ is H or $(C_1-C_6)$alkyl; and
$R^3$ is H or $(C_1-C_6)$alkyl.

In some embodiments, the compounds provided herein have the formula:

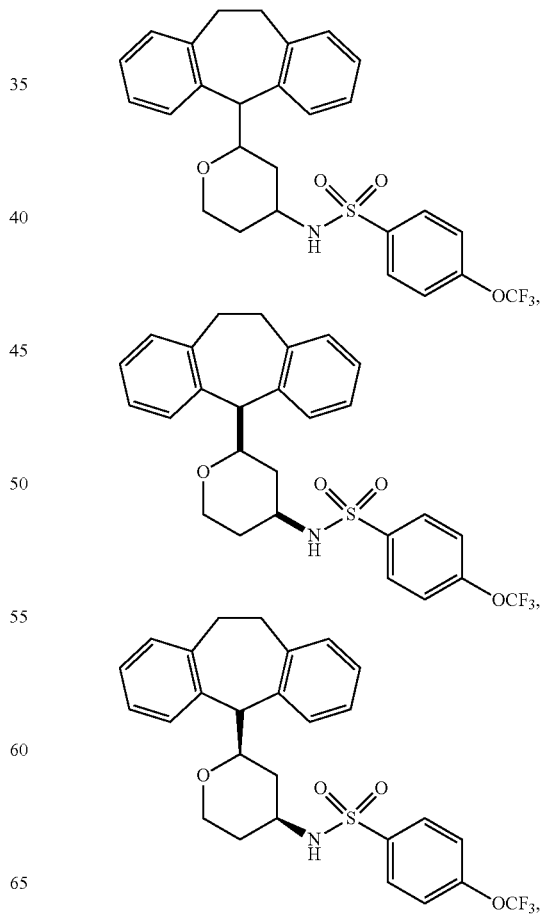

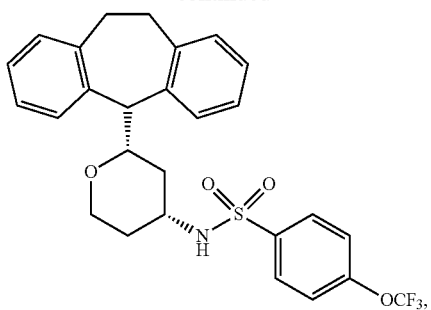
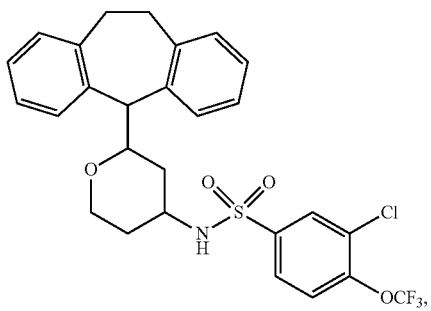
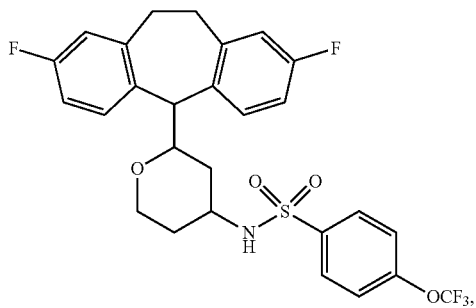
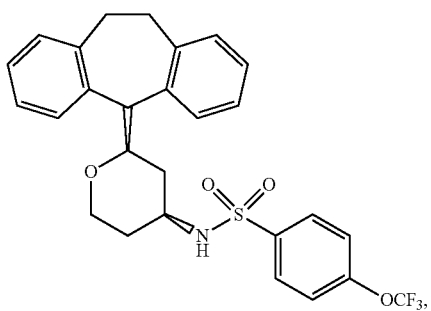
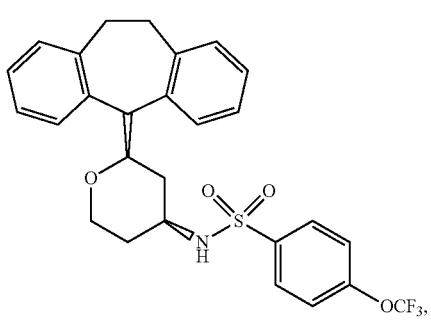
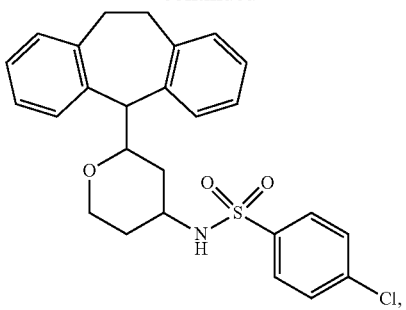
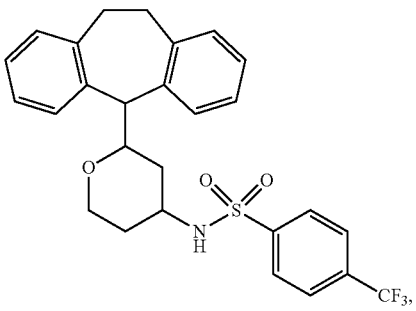
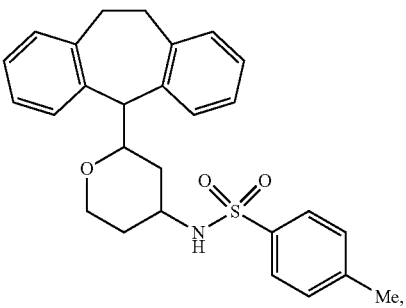
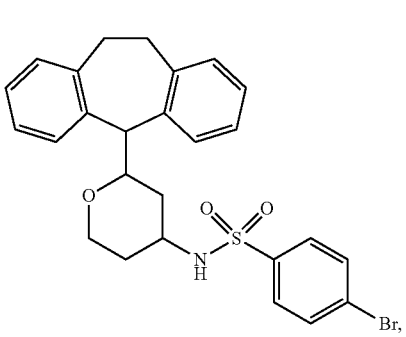
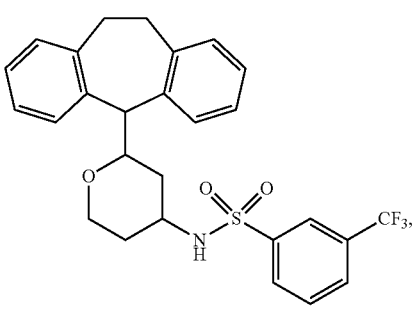

17
-continued
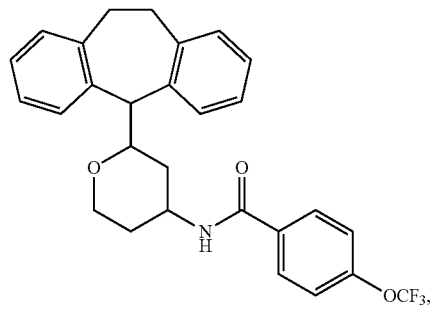
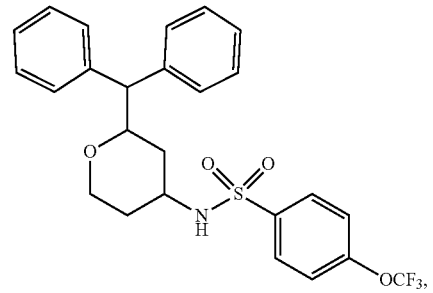
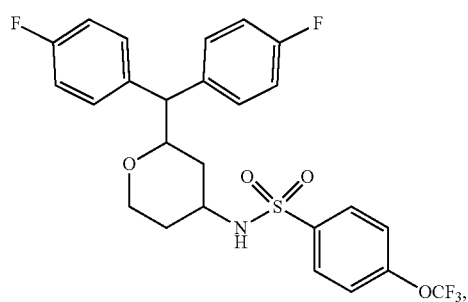
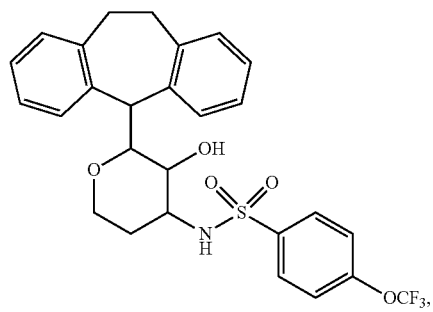
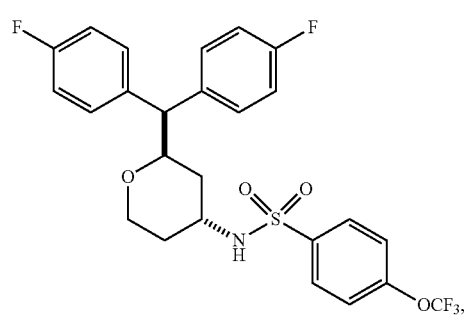
18
-continued
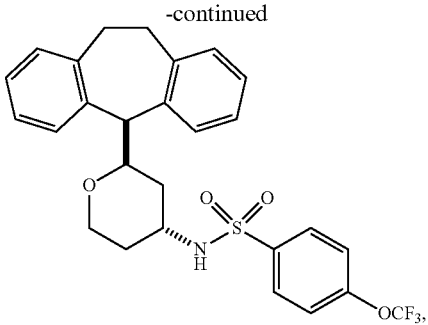
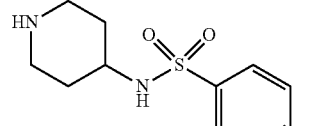
, or
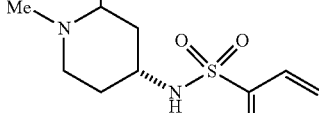
or a pharmaceutically acceptable salt thereof.
In some embodiments, the compounds provided herein have the formula:
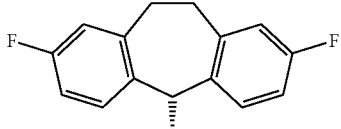
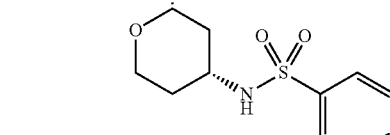
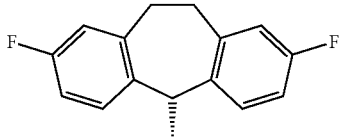
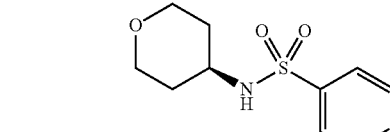

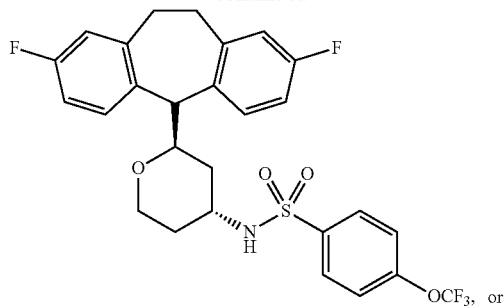
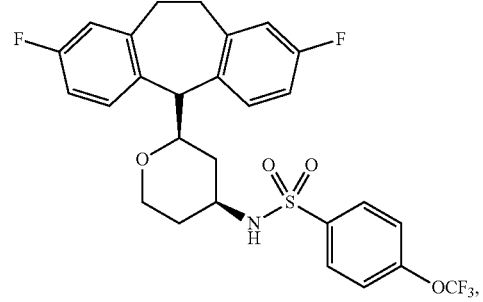
or a pharmaceutically acceptable salt thereof.
In some embodiments, the compounds provided herein have the formula:
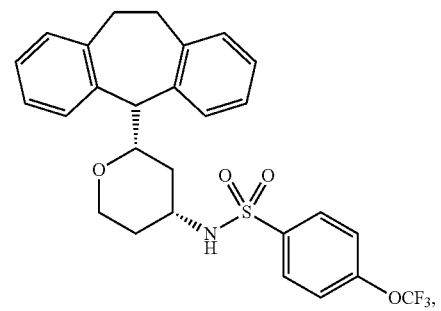
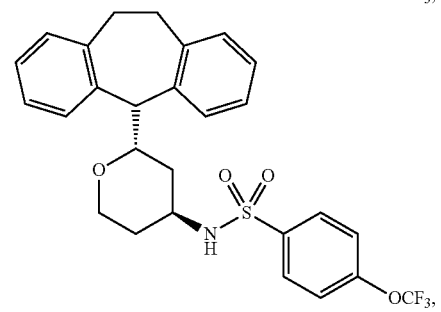
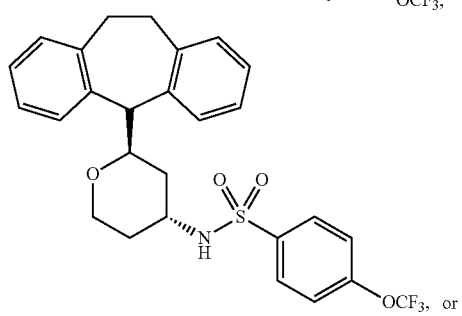
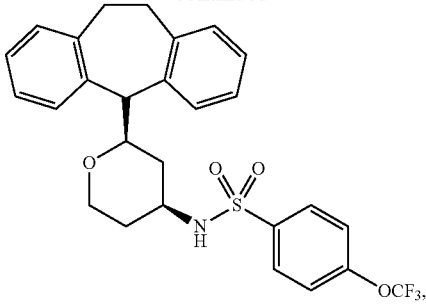
or a pharmaceutically acceptable salt thereof.
In some embodiments, the compounds provided herein have the formula:
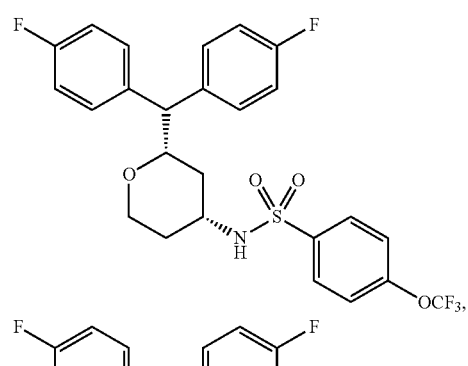
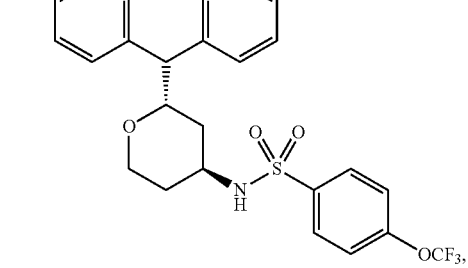
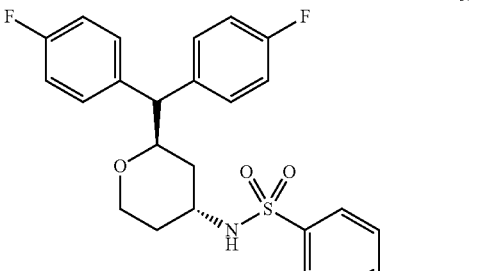
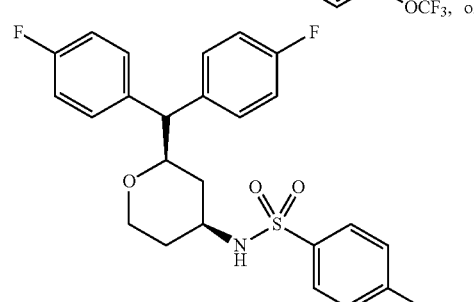
or a pharmaceutically acceptable salt thereof.

In some embodiments, the compounds provided herein have the formula:

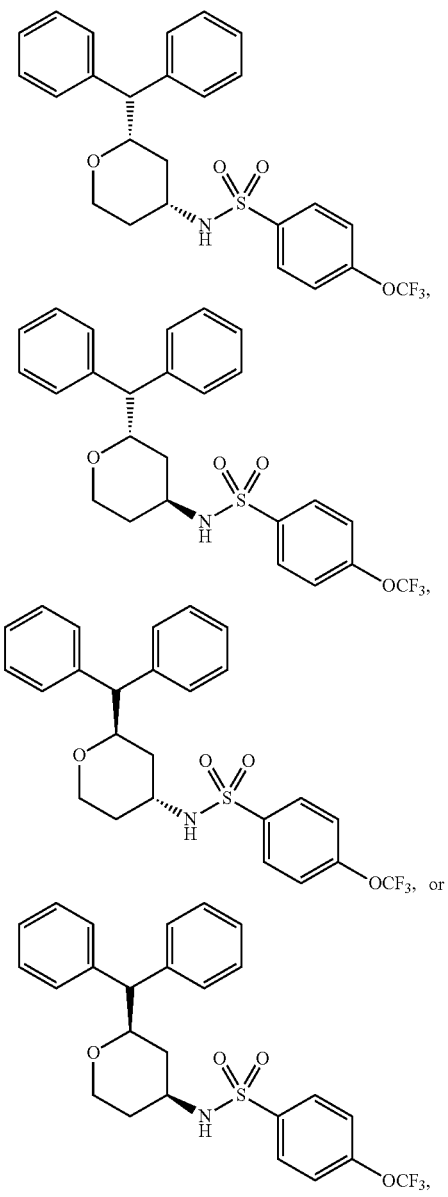

or a pharmaceutically acceptable salt thereof.

The compounds described herein contain asymmetric centers and may thus give rise to enantiomers, diastereomers, and other stereoisomeric forms which may be defined in terms of absolute stereochemistry as (R)— or(S)—. The present invention is meant to include all such possible diastereomers as well as their racemic and optically pure forms. Optically active (R)— and (S)— isomers may be prepared using homo-chiral synthons or homo-chiral reagents, or optically resolved using conventional techniques, including preparative chiral chromatography. When the compounds described herein contain olefinic double bonds or other centers of geometric asymmetry, and unless specified otherwise, it is intended to include both (E)— and (Z)— geometric isomers. Likewise, all tautomeric forms are intended to be included.

The graphic representations of racemic, ambiscalemic and scalemic or enantiomerically pure compounds used herein are a modified version of the denotations taken from Maehr J. Chem. Ed. 62, 114-120 (1985): simple lines provide no information about stereochemistry and convey only connectivity; solid and broken wedges are used to denote the absolute configuration of a chiral element; solid and broken bold lines are geometric descriptors indicating the relative configuration shown but not necessarily denoting racemic character; and wedge outlines and dotted or broken lines denote enantiomerically pure compounds of indeterminate absolute configuration. For example, the graphic representations:

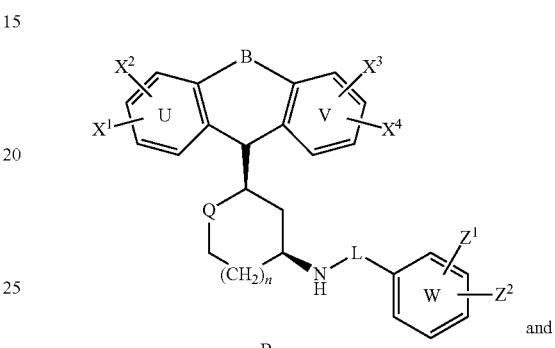

and

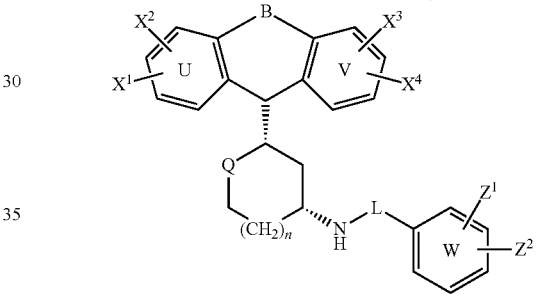

indicate each single enantiomer of known absolute stereochemistry, i.e., each of the two structures is a substantially pure single enantiomer. For the purpose of the present disclosure, a "pure" or "substantially pure" enantiomer is intended to mean that the enantiomer is at least 95% of the configuration shown and 5% or less of other enantiomers. The graphic representation:

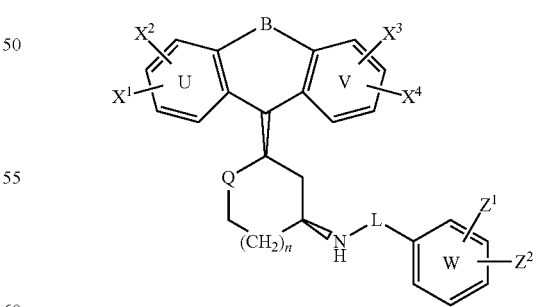

indicates a single enantiomer of unknown absolute stereochemistry, i.e., it could be either of the two structures shown above, as a substantially pure single enantiomer. The graphic representations with bold solid and broken lines represent relative stereochemistry in racemic compounds. Thus racemic cis diastereoisomer:

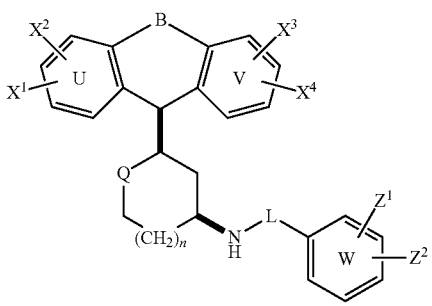

and racemic trans diastereoisomer:

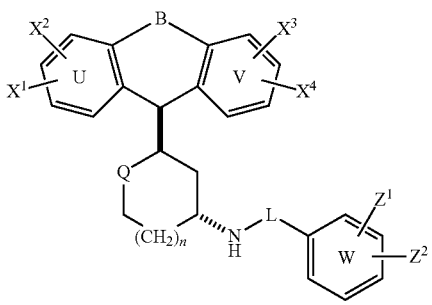

and, finally, the structure:

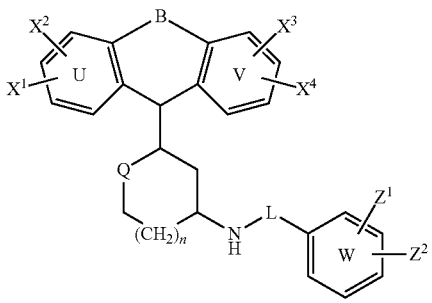

is generic regarding stereochemistry. This structure could be a single enantiomer or a mixture of enantiomers, including a racemic mixture, or mixture of diastereoisomers.

In any of these possibilities, compounds can be single cis enantiomers of formula IIa or formula IIb or single trans enantiomers formula IIc or formula IId, or a mixture of the two. If a mixture, the mixture will most commonly be racemic, but it need not be. Substantially pure single enantiomers of biologically active compounds such as those described herein often exhibit advantages over their racemic mixture.

All the members of the genus described above exhibit biological activity in screens that are predictive of utility. However, it may be found upon examination that certain species and genera are not patentable to the inventors in this application. In this case, the exclusion of species and genera in applicants' claims are to be considered artifacts of patent prosecution and not reflective of the inventors' concept or description of their invention, which encompasses all members of the genus I that are not in the public's possession.

Also provided herein is a pharmaceutical composition comprising a compound disclosed above, or a pharmaceutically acceptable salt form thereof, and a pharmaceutically acceptable carrier or diluent.

While it may be possible for the compounds of formula I to be administered as the raw chemical, it is preferable to present them as a pharmaceutical composition. According to a further aspect, the present invention provides a pharmaceutical composition comprising a compound of formula I or a pharmaceutically acceptable salt thereof, together with one or more pharmaceutically carriers thereof and optionally one or more other therapeutic ingredients. The carrier(s) must be "acceptable" in the sense of being compatible with the other ingredients of the formulation and not deleterious to the recipient thereof.

Formulations of the compounds and compositions described herein may be administered by a variety of methods: oral (including, but not limited to, capsules, cachets, tablets, powder, granules, solutions, suspensions, emulsions, tablets, or sublingual tablets), buccal, by inhalation (by using, for instance, an inhaler, a nebulizer, an aerosol, a gas, etc.), nasal, topical (including, but not limited to, lotions, creams, ointments, patches (i.e., transdermal), gels, liniments, pastes), ophthalmic, to the ear, rectal (for instance, by using a suppository or an enema), vaginal, or parenteral, depending on the severity and type of the disease being treated. In some embodiments, the compositions are administered orally or intravenously. The formulations include those suitable for oral, parenteral (including subcutaneous, intradermal, intramuscular, intracranial, intravenous and intraarticular), rectal, vaginal, nasal (inhalation), and topical (including dermal, buccal, sublingual and intraocular) administration. The most suitable route may depend upon the condition and disorder of the recipient. The formulations may conveniently be presented in unit dosage form and may be prepared by any of the methods well known in the art of pharmacy. All methods include the step of bringing into association a compound of formula (I) or a pharmaceutically acceptable salt thereof ("active ingredient") with the carrier which constitutes one or more accessory ingredients. In general, the formulations are prepared by uniformly and intimately bringing into association the active ingredient with liquid carriers or finely divided solid carriers or both and then, if necessary, shaping the product into the desired formulation.

Formulations of the present invention suitable for oral administration may be presented as discrete units such as capsules, cachets or tablets each containing a predetermined amount of the active ingredient; as a powder or granules; as a solution or a suspension in an aqueous liquid or a non-aqueous liquid; or as an oil-in-water liquid emulsion or a water-in-oil liquid emulsion. The active ingredient may also be presented as a bolus, electuary or paste.

A tablet may be made by compression or molding, optionally with one or more accessory ingredients. Compressed tablets may be prepared by compressing in a suitable machine the active ingredient in a free-flowing form such as a powder or granules, optionally mixed with a binder, lubricant, inert diluent, lubricating, surface active or dispersing agent. Molded tablets may be made by molding in a suitable machine a mixture of the powdered compound moistened with an inert liquid diluent. The tablets may optionally be coated or scored and may be formulated so as to provide sustained, delayed or controlled release of the active ingredient therein.

Formulations for parenteral administration include aqueous and non-aqueous sterile injection solutions which may contain anti-oxidants, buffers, bacteriostats and solutes which render the formulation isotonic with the blood of the intended recipient. Formulations for parenteral administration also include aqueous and non-aqueous sterile suspensions, which may include suspending agents and thickening agents. The formulations may be presented in unit-dose of multi-dose containers, for example sealed ampoules and vials, and may be stored in a freeze-dried (lyophilized) condition requiring only the addition of a sterile liquid carrier, for example saline, phosphate-buffered saline (PBS) or the like, immediately prior to use. Extemporaneous injection solutions and suspensions may be prepared from sterile powders, granules and tablets of the kind previously described.

It will be recognized that the compounds of this invention can exist in radiolabeled form, i.e., the compounds may contain one or more atoms containing an atomic mass or mass number different from the atomic mass or mass number usually found in nature. Radioisotopes of hydrogen, carbon, phosphorous, fluorine, and chlorine include $^2H$, $^3H$, $^{13}C$, $^{14}C$, $^{15}N$, $^{35}S$, $^{18}F$, and $^{36}Cl$, respectively. Compounds that contain those radioisotopes and/or other radioisotopes of other atoms are within the scope of this invention. Tritiated, i.e. $^3H$, and carbon-14, i.e., $^{14}C$, radioisotopes are particularly preferred for their ease in preparation and detectability. Compounds that contain isotopes $^{11}C$, $^{13}N$, $^{15}O$ and $^{18}F$ are well suited for positron emission tomography. Radiolabeled compounds of formula I of this invention and prodrugs thereof can generally be prepared by methods well known to those skilled in the art. Conveniently, such radiolabeled compounds can be prepared by carrying out the procedures disclosed in the Examples and Schemes by substituting a readily available radiolabeled reagent for a non-radiolabeled reagent.

The compounds provided herein can be used for treating cancer in a patient, the method comprising administering to the patient a therapeutically effective amount of a compound of formula I. In some embodiments, the cancer is characterized by dysregulation of the PI3K-AKT-FOXO signaling pathway. For example, the cancer can be selected from the group consisting of: ovarian, pancreatic, renal cell, breast, prostate, lung, hepatocellular carcinoma, glioma, leukemia, lymphoma, colorectal cancers, and sarcomas.

In some embodiments, the cancer is chemotherapy resistant cancer. In some embodiments, the method further comprises administering one or more cancer chemotherapeutic agents. In some embodiments, the one or more cancer chemotherapeutic agents are EGFR inhibitors.

In some embodiments, the cancer is chemotherapy resistant cancer. In some embodiments, the method further comprises administering one or more cancer chemotherapeutic agents targeting transcriptional dysregulation. In some embodiments, the one or more cancer chemotherapeutic agents are CDK inhibitors, particularly CDK9 and/or CDK7 inhibitors.

In some embodiments, the cancer is chemotherapy resistant cancer. In some embodiments, the method further comprises administering one or more cancer chemotherapeutic agents. In some e embodiments, the one or more cancer chemotherapeutic agents are mTOR inhibitors.

Certain cancers are characterized by dysregulation and overactivation of cellular transcription carried out by RNA polymerase II (RNAPII) as described in *Transcriptional Addiction in Cancer*. Bradner, J. E., Hnisz, D. and Young, R. A. February 2017, Cell, Vol. 168, pp. 629-643. BRD4, a member of the bromodomain and extra-terminal domain (BET) family of epigenetic readers, occupies super-enhancers co-opted in transcriptionally addicted cancer cells, and recruits pTEFb to RNAPII to enable promoter proximal pause release and maintain productive elongation (see, for example, *Control of Embryonic Stem Cell Identity by BRD4-Dependent Transcriptional Elongation of Super-Enhancer-Associated Pluripotency Genes*. Di Micco, R., et al. October 2014, Cell Reports, Vol. 9, pp. 234-247). Therefore BRD4 inhibitor (BRD4i) treatment synergizes with PP2A activation in two ways, first by suppressing BRD4 mediated recruitment of pTEFb to paused RNAPII. A second mode of synergy with BRD4i treatment is by reversing the activating phosphorylation of BRD4 itself by PP2A complexes (see *Phospho-BRD4: transcription plasticity and drug targeting*. Chiang, C. 2016, Drug Discov Today: Technol, http://dx-.doi.org/10.1016). The compounds provided herein can be used for treating cancer in a patient where there is transcriptional dysregulation, the method comprising administering to the patient a therapeutically effective amount of a compound of formula I and a BRD4 inhibitor. Cancers characterized by transcriptional addiction include Breast Cancer, Osteosarcoma, Endometrial Cancer, Acute Myeloid Leukemia, Lung Cancer, Prostate Cancer, Melanoma and Ovarian Cancer.

In some embodiments, administration of a compound of formula I can restore sensitivity to one or more chemotherapeutic agents in a patient wherein the patient has developed a resistance to the one or more chemotherapeutic agents. More particularly, cancers that may be treated by the compounds, compositions and methods described herein include, but are not limited to, the following:

cardiac cancers, including, for example sarcoma, e.g., angiosarcoma, fibrosarcoma, rhabdomyosarcoma, and liposarcoma; myxoma; rhabdomyoma; fibroma; lipoma and teratoma;

lung cancers, including, for example, bronchogenic carcinoma, e.g., squamous cell, undifferentiated small cell, undifferentiated large cell, and adenocarcinoma; alveolar and bronchiolar carcinoma; bronchial adenoma; sarcoma; lymphoma; chondromatous hamartoma; and mesothelioma;

gastrointestinal cancer, including, for example, cancers of the esophagus, e.g., squamous cell carcinoma, adenocarcinoma, leiomyosarcoma, and lymphoma; cancers of the stomach, e.g., carcinoma, lymphoma, and leiomyosarcoma; cancers of the pancreas, e.g., ductal adenocarcinoma, insulinoma, glucagonoma, gastrinoma, carcinoid tumors, and vipoma; cancers of the small bowel, e.g., adenocarcinoma, lymphoma, carcinoid tumors, Kaposi's sarcoma, leiomyoma, hemangioma, lipoma, neurofibroma, and fibroma; cancers of the large bowel, e.g., adenocarcinoma, tubular adenoma, villous adenoma, hamartoma, and leiomyoma;

genitourinary tract cancers, including, for example, cancers of the kidney, e.g., adenocarcinoma, Wilm's tumor (nephroblastoma), lymphoma, and leukemia; cancers of the bladder and urethra, e.g., squamous cell carcinoma, transitional cell carcinoma, and adenocarcinoma; cancers of the prostate, e.g., adenocarcinoma, and sarcoma; cancer of the testis, e.g., seminoma, teratoma, embryonal carcinoma, teratocarcinoma, choriocarcinoma, sarcoma, interstitial cell carcinoma, fibroma, fibroadenoma, adenomatoid tumors, and lipoma;

liver cancers, including, for example, hepatoma, e.g., hepatocellular carcinoma; cholangiocarcinoma; hepatoblastoma; angiosarcoma; hepatocellular adenoma; and hemangioma;

bone cancers, including, for example, osteogenic sarcoma (osteosarcoma), fibrosarcoma, malignant fibrous histiocytoma, chondrosarcoma, Ewing's sarcoma, malignant lymphoma (reticulum cell sarcoma), multiple myeloma, malignant giant cell tumor chordoma, osteochrondroma (osteocartilaginous exostoses), benign chondroma, chondroblastoma, chondromyxofibroma, osteoid osteoma and giant cell tumors;

nervous system cancers, including, for example, cancers of the skull, e.g., osteoma, hemangioma, granuloma, xanthoma, and osteitis deformans; cancers of the meninges, e.g., meningioma, meningiosarcoma, and gliomatosis; cancers of the brain, e.g., astrocytoma, medulloblastoma, glioma, ependymoma, germinoma (pinealoma), glioblastoma multiform, oligodendroglioma, schwannoma, retinoblastoma, and congenital tumors; and cancers of the spinal cord, e.g., neurofibroma, meningioma, glioma, and sarcoma;

gynecological cancers, including, for example, cancers of the uterus, e.g., endometrial carcinoma; cancers of the cervix, e.g., cervical carcinoma, and pre tumor cervical dysplasia; cancers of the ovaries, e.g., ovarian carcinoma, including serous cystadenocarcinoma, mucinous cystadenocarcinoma, unclassified carcinoma, granulosa thecal cell tumors, Sertoli Leydig cell tumors, dysgerminoma, and malignant teratoma; cancers of the vulva, e.g., squamous cell carcinoma, intraepithelial carcinoma, adenocarcinoma, fibrosarcoma, and melanoma; cancers of the vagina, e.g., clear cell carcinoma, squamous cell carcinoma, botryoid sarcoma, and embryonal rhabdomyosarcoma; and cancers of the fallopian tubes, e.g., carcinoma;

hematologic cancers, including, for example, cancers of the blood, e.g., acute myeloid leukemia, chronic myeloid leukemia, acute lymphoblastic leukemia, chronic lymphocytic leukemia, myeloproliferative diseases, multiple myeloma, and myelodysplastic syndrome, Hodgkin's lymphoma, non Hodgkin's lymphoma (malignant lymphoma) and Waldenstrom's macroglobulinemia;

skin cancers, including, for example, malignant melanoma, basal cell carcinoma, squamous cell carcinoma, Kaposi's sarcoma, moles dysplastic nevi, lipoma, angioma, dermatofibroma, keloids, psoriasis; and adrenal gland cancers, including, for example, neuroblastoma.

Cancers may be solid tumors that may or may not be metastatic. Cancers may also occur, as in leukemia, as a diffuse tissue.

The compounds described herein can also be administered in combination with existing methods of treating cancers, for example by chemotherapy, irradiation, or surgery. Thus, there is further provided a method of treating cancer comprising administering an effective amount of a compound according to formula I to a patient, wherein a therapeutically effective amount of one or more additional cancer chemotherapeutic agents are administered to the patient.

Also provided herein is a method for treating diabetes in a patient, the method comprising administering to the patient a therapeutically effective amount of a compound of formula I.

Further provided herein is a method for treating an autoimmune disease in a patient, the method comprising administering to the patient a therapeutically effective amount of a compound of formula I. The autoimmune disease can be, for example, inflammatory bowel disease (IBD). Immune responses are constantly and tightly regulated and one important cellular component in maintaining self tolerance (i.e., prevention of autoimmunity) and tolerance of benign commensal gut flora are regulatory T cells (Treg). Treg can be subdivided into multiple phenotypes, but the most common are CD4+CD25+ T cells that express the transcription factor Foxp3. Foxp3 is a direct transcriptional target of FOXO proteins, particularly FOXO1 and FOXO3. Thus activation of FOXO proteins in naïve T-cells promotes and directs differentiation to maintain a population of Treg cells.

Acute immune mediated rejection and chronic immune mediated rejection are key obstacles to successful solid organ transplantation. It is believed that these forms of rejection can be prevented/overcome by amplifying Treg number and or function. Similarly, a common and morbid complication of allogeneic hematopoietic cell transplants (Allo-HCT) used to treat various malignant and non-malignant conditions, is graft versus host disease, in which the transplanted immune cells from the donor damage multiple organs in the recipient (most notably skin, gut, and liver). Increasing experimental and clinical data indicate that Tregs can be harnessed to prevent and or treat this disease process.

Thus compounds of the present invention are useful in treatment of autoimmune and related diseases, by activating FOXO proteins and inducing T cell differentiation to Tregs. Compounds may be administered therapeutically to subjects directly, or alternatively, T cells may be collected from a subject and differentiated ex vivo to Tregs as described by Taylor et al. [*Blood* 99, 3493-3499 (2002)].

Aspects of the invention include methods for treatment of autoimmune disease characterized by deficiency in Treg function comprising administering a therapeutically useful amount of compound of formula I. The method can also include extraction of naïve T-cells from a patient, differentiation of T-cells to Tregs ex vivo by treatment with a compound of formula I, optionally supplemented with an HDACi, followed by administration of Tregs to patient with optional separation of compound of formula I from Tregs prior to their administration. As stated above, autoimmune diseases that can be so treated include IBD, solid organ transplant rejection, and GvHD in allo-HCT.

In some embodiments, the compounds can be administered to a patient to treat an autoimmune disorder, for example, Addison's disease, Amyotrophic Lateral Sclerosis, celiac disease, Crohn's disease, diabetes, eosinophilic fasciitis, Guillain-Barre syndrome (GBS), Graves' disease, Lupus erythematosus, Miller-Fisher syndrome, psoriasis, rheumatoid arthritis, ulcerative colitis, and vasculitis. In some embodiments, the compound provided herein can be used for treating a disease or disorder in a patient wherein the disease or disorder involves excessive or unregulated cellular proliferation, the method comprising administering to the patient a therapeutically effective amount of a compound of formula I. Also provided herein is a method for treating a disease or disorder in a patient where the disease or disorder involves the dysregulation of the PI3K-AKT-FOXO signaling pathway, the method comprising administering to the patient a therapeutically effective amount of a compound of formula I.

Further provided herein is a method for treating a disease in a patient wherein the disease is characterized by proteotoxicity, including age onset proteotoxicity leading to neurodegeneration, the method comprising administering to the patient a therapeutically effective amount of a compound of formula I. Hyperphosphorylated Tau has been implicated as the pathogenic protein in several neurodegenerative diseases and furthermore PP2A has been shown to be an important phosphatase in reversing aberrant phosphorylation of Tau; see for example Ludovic Martin et al., Tau protein phosphatases in Alzheimer's disease: The leading role of PP2A in Ageing Research Reviews 12 (2013) 39-49; Miguel Medina and Jesus Avila, Further understanding of tau phosphorylation: implications for therapy in Expert Rev. Neurotherapy, 15 (1), 115-112 (2015) and Michael Voronkov et al., Phosphoprotein phosphatase 2A: a novel druggable target for Alzheimer's disease in Future Med Chem. 2011 May 3(7) 821-833. Hyperphosphorylated alpha-Synuclein is a second exemplar of a toxic protein, and again PP2A has been shown to reverse its aberrantly phosphorylated state; see for example Kang-Woo Lee et al., Enhanced Phosphatase Activity Attenuates alpha-Synucleinopathy in a Mouse Model in Neurobiology of Disease, May 11, 2011, 31(19) 6963-6971. In some embodiments, the disease is selected from the group consisting of: Alzheimer's disease, Parkinson's disease, Huntington's disease, amyotrophic lateral sclerosis, frontotemporal dementia, progressive supranuclear palsy, corticobasal degeneration and Pick's disease.

A second feature of Alzheimer's disease is deposition of amyloid plaques and phosphorylation of Amyloid Precursor Protein (APP) at threonine-668 in the cytoplasmic domain of APP is involved in it's processing to generate toxic amyloid-beta (see T. Zhang et al, Int. J. Mol. Sci. 2020, 21, 209). Activation of PP2A by treatment with compounds of the present invention decreases threonine-668 phosphorylation and suppresses pathological amyloidogenesis contributing to the development of Alzheimer's disease.

The compounds provided herein may further be used in a method for treating a mood disorder in a patient by administering to the patient a therapeutically effective amount of a compound of formula I. In some embodiments, the mood disorder is stress-induced depression.

Also provided herein is a method for treating acne vulgaris in a patient by administering to the patient a therapeutically effective amount of a compound of formula I.

Further provided herein is a method for treating pulmonary disease such as COPD. Protein phosphatase 2A (PP2A) is a primary serine-threonine phosphatase that modulates inflammatory responses in asthma and COPD. PP2A has shown to be dysregulated in mouse models of COPD, and inhibiting PP2A activity exacerbated inflammatory responses in the lung. Conversely, increasing PP2A activity via PP2A protein transfection down regulated cytokine expression and prevented the induction of proteases following cigarette smoke extract (CSE) treatment. Thus, increasing PP2A activity by treatment with compounds of the present invention may ameliorate or reverse the pathology underlying lung diseases such as COPD.

Idiopathic Pulmonary Fibrosis is a fatal lung disease in which there is progressive and irreversible scaring of the lung associated with changes to alveolar epithelial cells and aberrant fibroblast proliferation and activation. The underlying causative agent in IPF is usually unknown (hence idiopathic) and the prognosis after diagnosis is dismal with a median survival time of three years. IPF is characterized by a continuous expansion of the fibroblast population and excessive deposition of collagen in the alveolar wall leading to scarred, non-functional airspaces progressive hypoxia and death by asphyxiation. In normal lung tissue fibroblasts interact with the extracellular matrix (ECM) and signaling via integrins activates PP2A and this suppresses fibroblast growth and proliferation. In IPF fibroblasts this signaling is defective and PP2A activation is muted; in these aberrant cells, uncontrolled fibroblast proliferation and collagen secretion occurs. Similarities between the defective cellular signaling in lung cancer and IPF are outlined in Ballester et al, "Idiopathic Pulmonary Fibrosis", Internationl Journal of Molecular Sciences, 2019, 20, 593; doi:10.3390/ijms20030593 and Vancheri, "Idiopathic Pulmonary Fibrosis. An Altered Fibroblast Proliferation Linked to Cancer Biology", Proc Am Thorac Soc Vol 9, Iss. 3, pp 153-157, Jul. 15, 2012. Diminished PP2A signaling in PP2A fibroblasts has several consequences: 1. Excessive phosphorylation of the transcription factor FOXO3a, which leads to exit of phospho-FOXO3a from the nucleus to the cytoplasm where it is sequestered by 14-3-3 proteins. PP2A is known to be the phosphatase responsible for dephosphorylating cytoplasmic FOXO3a and promoting it's nuclear translocation. Activated, phospho-Akt is a major kinase responsible for phosphorylation of FOXO3a and PP2A is the phosphatase responsible for dephosphorylating and deactivating Akt. Thus, PP2A activation promotes FOXO3a activity in two ways, by suppressing the activity of a major kinase, Akt, that inactivates it, and second by dephosphorylating cytoplasmic phospho-FOXO3a directly to cause nuclear translocation. Deficient nuclear FOXO3 protects IPF fibroblasts from polymerized collagen matrix induced apoptosis, therefore PP2A activation will suppress growth of, and will induce apoptosis of IPF fibroblasts. 2. Low PP2A activity in IPF fibroblasts results in HDAC4 hyperphosphorylation and decreases it's nuclear localization, thus the histones of it's target genes remain acetylated and transcriptionally active which drives excessive collagen secretion from IPF fibroblasts. Therefore, PP2A activation, by promoting HDAC4 nuclear translocation, will suppress excessive the excessive collagen secretion characteristic of IPF and other systemic fibrotic diseases. 3. Activated phospho-ERK is a direct target of PP2A, which it dephosphorylates and deactivates. In scleroderma fibroblasts TGFb reduces PP2A activity and promotes ERK signaling and excessive collagen production. Activation of PP2A will suppress this signaling pathway from TGFb, a known and important pro-fibrotic cytokine. It is reasonable to conjecture that a similar pathway is operative in lung fibroblasts in IPF, thus PP2A activation should be useful there also. 4. PP2A negatively regulates Wnt/b-catenin signaling. Wnt3a induces lung epithelial cell proliferation, fibroblast activation and collagen synthesis in IPF. PP2A activation will suppress these processes and thus exert a therapeutic benefit in lung fibrosis and IPF. 5. Promotion of RNAPII pausing in hyperactivated lung fibroblasts in IPF by PP2A activation suppresses the expression of fibrosis related genes such as smooth muscle actin (ACTA2), collagen genes (COL1A1, COL1A2 and COL3A1) and fibronectin (FN1) (see Sattar et al, Chemical Activation of Protein Phosphatase 2A Counters TGFB-Dependent Induction of Extracellular Matrix Proteins in Fibroblasts, Am J Respir Crit Care Med 2022; 205: A1941, poster presented PULMONARY FIBROSIS: ANIMAL AND CELL CULTURE MODELS/Thematic Poster Session/Sunday, May 15, 2022, San Francisco ATS meeting). Therefore, compounds of the present invention exert a useful therapeutic effect in IPF by suppression of these genes and reducing excessive collagen deposition and scarring in IPF. In summary, PP2A is involved in several major signaling pathways implicated in the pathogenesis of lung fibrosis and IPF and in all the cases cited above PP2A activation is likely to exert a beneficial therapeutic effect. This implies that a well tolerated, effective, small molecule PP2A activator would constitute a novel therapeutic for lung fibrosis.

Impaired PP2A/AKT signaling has been observed in cellular models of idiopathic pulmonary hypertension, where it causes obstructive hyperproliferation and apoptosis resistance of distal pulmonary artery smooth muscle cells. Increasing PP2A activity may reverse this, thus, treatment with compounds of the present invention may be an effective treatment for pulmonary hypertension.

Further provided herein is a method for treating cardiac hypertrophy in a patient by administering to the patient a therapeutically effective amount of a compound of formula I. In some embodiments, the cardiac hypertrophy is associated with a disease selected from hypertension, myocardial infarction, heart failure, and valvular heart disease. Cardiac physiology and hypertrophy are regulated by the phosphorylation status of many proteins, including receptors and ion channels, which is partly controlled by a PP2A-alpha4 intracellular signalling axis. Studies indicate that the type 2A protein phosphatases are differentially regulated in both the healthy and hypertrophied myocardium. The data suggest that pressure overload-induced hypertrophy is associated with (1) altered expression of type 2A protein phosphatases and their regulatory subunits and (2) an increase in expression of their non-catalytic inhibitor protein alpha4. Thus, treatment with compounds of the present invention may ameliorate cardiac hypertrophy. Also, significant reduction in endosomal PP2A activity has been observed in heart failure samples versus controls, suggesting that inhibited resensitization of beta-adrenergic receptors occurs in human heart failure. These studies suggest that resensitization of beta adrenergic receptors is inhibited in human heart failure and targeting the PP2A inhibitor SET to derepress and activate PP2A may provide preservation of receptor function and beneficial cardiac remodeling. Thus, treatment with compounds of the present invention may have a beneficial effect in heart failure.

Further provided herein is a method for treating a parasitic infection in a patient by administering to the patient a therapeutically effective amount of a compound of formula I. Examples of parasites that may cause parasitic infections to be treated include, but are not limited to, *Plasmodium* and *Theileria*.

Further provided herein is a method for treating inflammatory conditions. Reduced PP2A activity occurs in animal models of allergic airway disease and patients with severe asthma. Treatment with small molecule activators of PP2A such as fingolimod (FTY720) or 2-amino-4-(4-(heptyloxy)phenyl)-2-methylbutan-1-ol (AAL(S)) inhibited the development of inflammation, airway hyperreactivity in mouse models of allergic airway disease. Thus, compounds of the present invention may be useful in the treatment of asthma. Dephosphorylation of tristetraprolin (TTP) functions as an "off-switch" in inflammatory responses, and it's activity can be promoted by compounds that stimulate PP2A activity. Therapeutic efficacy of PP2A activating drugs, to target tristetraprolin (TTP), in models of rheumatoid arthritis has been demonstrated in vitro and in vivo. Thus, treatment with compounds of the present invention may be useful in chronic inflammatory conditions such as rheumatoid arthritis.

PP2A enzymes are involved in the regulation of cell transcription, cell cycle, and viral transformation. Many viruses, including cytomegalovirus, parainfluenza, DNA tumor viruses, and HIV-1, utilize different approaches to exploit PPA2 in order to modify, control, or inactivate cellular activities of the host [Garcia et al., Microbes and Infection, 2, 2000, 401-407]. Therefore, the compounds provided herein may further be used in a method for treating a viral infection in a patient by administering to the patient a therapeutically effective amount of a compound of formula I. Examples of viruses that may cause viral infections to be treated include, but are not limited to: a polyomavirus, such as John Cunningham Virus (JCV), Simian virus 40 (SV40), or BK Virus (BKV); influenza, Human Immunodeficiency Virus type 1 (HIV-1), Human Papilloma Virus (HPV), adenovirus, Epstein-Barr Virus (EBV), Hepatitis C Virus (HCV), Molluscum contagiosum virus (MCV); Human T-lymphotropic virus type 1 HTLV-1), Herpes Simplex Virus type 1 (HSV-1), cytomegalovirus (CMV), hepatitis B virus, Bovine papillomavirus (BPV-1), human T-cell lymphotropic virus type 1, Japanese encephalitis virus, respiratory syncytial virus (RSV), and West Nile virus.

Serine/Threonine phosphatases, including PP2A, are involved in modulation of synaptic plasticity (D. G. Winder and J. D. Sweatt, Nature Reviews Neuroscience, vol 2, July 2001, pages 461-474). Persistently decreased PP2A activity is associated with maintenance of Long Term Potentiation (LTP) of synapses, thus treatment PP2A activators such as those described here may reverse synaptic LTP. Psychostimulant drugs of abuse such as cocaine and methamphetamine are associated with deleterious synaptic LTP (L. Mao et al, Neuron 67, Sep. 9, 2010 and A. Stipanovich et al, Nature vol 453, 2008, pages 879-884), which may underlie the pathology of addiction and relapse therefore PP2A activators described here may be useful as treatments for psychostimulant abuse.

Abnormalities in synaptic structure and signaling are linked to autistic spectrum disorder, see for example, Y Chen et al., CTTNBP2, but not CTTNBP2NL, regulates dendritic spinogenesis and synaptic distribution of the striatin-PP2A complex, Molecular Biology of the Cell, 23, Nov. 15, 2012, 4383-4392. PP2A has been shown to be important in normal development of dendritic spines, and treatment with compounds of the present invention may ameliorate or reverse autistic spectrum disorder.

Further provided herein is a method for treating a disease or disorder in which the disease or disorder involves the dysregulation of the mTOR-PP2A signaling axis. Mammalian target of rapamycin (mTOR) is a serine/threonineprotein kinase that regulates cell growth, proliferation, and survival: mTOR is frequently activated in human cancers and is a commonly sought anticancer therapeutic target. PP2A is a key element in mTOR-AKT signaling during nutritional deprivation, and it has important implications in cell cycle progression and quiescence. Dysregulation of cellular metabolism is a feature of cancer, with nutrient transport defects, nutrient sensing defects, dysregulated autophagy and constitutive anabolism being common in tumors; aberrant activation of mTOR is implicated in all of these processes and PP2A activation has been demonstrated to modulate them in vivo. PP2A has been shown to be involved in regulatory feedback loops with mTOR, and PP2A activators of the present invention would be expected to affect these processes directly by interacting with mTOR complexes, or indirectly by counterbalancing mTOR's effects by dephosphorylating its targets. Perturbation of the mTOR signaling cascade appears to be a common pathophysiological feature of human neurological disorders, including mental retardation syndromes and autism spectrum disorders, and neurodegenerative conditions such as Alzhiemer's disease. Activation of PP2A has been shown to be effective in animal models of neurodegenerative disease by modulating the PP2A mTOR axis; thus, molecules of the present invention will be useful in treatment of these conditions. PP2A activators of the present invention are likely to be useful in the treatment of diseases in which mTOR signaling is dysregulated; these include cancer, diabetes and neurodegenerative conditions. Compounds of the present invention may also promote innate immunity to infection and promote healthy aging.

Definitions

Unless defined otherwise, all technical and scientific terms used herein have the same meaning as is commonly understood by one of ordinary skill in the art to which this disclosure belongs. A comprehensive list of abbreviations utilized by organic chemists (i.e. persons of ordinary skill in the art) appears in the first issue of each volume of the Journal of Organic Chemistry. The list, which is typically presented in a table entitled "Standard List of Abbreviations" is incorporated herein by reference. In the event that there is a plurality of definitions for terms cited herein, those in this section prevail unless otherwise stated.

The following abbreviations and terms have the indicated meanings throughout:
Ac=acetyl
Aq=aqueous
Boc=t-butyloxy carbonyl
Bu=butyl
c-=cyclo
cat=catalyst
Cbz=carboxybenzyl
DBA=dibenzylideneacetone
DCM=dichloromethane=methylene chloride=$CH_2Cl_2$
DMF=N,N-dimethylformamide
eq. or equiv.=equivalent(s)
Et=ethyl
GC gas chromatography
h=hour(s)
KHMDS=Potassium bis(trimethylsilyl)amide
Lg=leaving group
Ln=chiral ligands
mCPBA=meta-Chloroperoxybenzoic acid
Me=methyl
mesyl=methanesulfonyl
min.=minute(s)
Ms=mesylate
NMO or NMMO=N-methylmorpholine oxide
Pg=protecting group
Ph=phenyl
RT=room temperature
sat'd or sat.=saturated
t-or tert=tertiary
Tf=triflate
TFA=trifluoroacetic acid
THF=tetrahydrofuran
tosyl=p-toluenesulfonyl Throughout this specification the terms and substituents retain their definitions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or composition that "comprises", "has", "includes" or "contains" one or more steps or elements possesses those one or more steps or elements, but is not limited to possessing only those one or more steps or elements. Likewise, a step of a method or an element of a composition that "comprises", "has", "includes" or "contains" one or more features possesses those one or more features, but is not limited to possessing only those one or more features. The terms "comprising" and "including" or grammatical variants thereof are to be taken as specifying the stated features, integers, steps or components but do not preclude the addition of one or more additional features, integers, steps, components or groups thereof. For example, "X includes a, b and c" means that X includes, but is not limited to, a, b and c. This term encompasses the terms "consisting of" and "consisting essentially of".

The phrase "consisting essentially of" or grammatical variants thereof when used herein are to be taken as specifying the stated features, integers, steps or components but do not preclude the addition of one or more additional features, integers, steps, components or groups thereof, but only if the additional features, integers, steps, components or groups thereof do not materially alter the basic and novel characteristics of the claimed composition or method.

Unless otherwise specified, the phrase "such as" is intended to be open-ended. For example, "X can be a halogen, such as fluorine or chlorine" means that X can be, but is not limited to, fluorine or chlorine.

As used herein, and as would be understood by the person of skill in the art, the recitation of "a compound"-unless expressly further limited-is intended to include salts of that compound. In a particular embodiment, the term "compound of formula" refers to the compound or a pharmaceutically acceptable salt thereof.

The term "pharmaceutically acceptable salt" refers to salts prepared from pharmaceutically acceptable non-toxic acids or bases including inorganic acids and bases and organic acids and bases. When the compounds of the present invention are basic, salts may be prepared from pharmaceutically acceptable non-toxic acids including inorganic and organic acids. Suitable pharmaceutically acceptable acid addition salts for the compounds of the present invention include acetic, adipic, alginic, ascorbic, aspartic, benzenesulfonic (besylate), benzoic, boric, butyric, camphoric, camphorsulfonic, carbonic, citric, ethanedisulfonic, ethanesulfonic, ethylenediaminetetraacetic, formic, fumaric, glucoheptonic, gluconic, glutamic, hydrobromic, hydrochloric, hydroiodic, hydroxynaphthoic, isethionic, lactic, lactobionic, laurylsulfonic, maleic, malic, mandelic, methanesulfonic, mucic, naphthylenesulfonic, nitric, oleic, pamoic, pantothenic, phosphoric, pivalic, polygalacturonic, salicylic, stearic, succinic, sulfuric, tannic, tartaric acid, teoclatic, p-toluenesulfonic, and the like. When the compounds contain an acidic side chain, suitable pharmaceutically acceptable base addition salts for the compounds of the present invention include, but are not limited to, metallic salts made from aluminum, calcium, lithium, magnesium, potassium, sodium and zinc or organic salts made from lysine, arginine, N,N'-dibenzylethylenediamine, chloroprocaine, choline, diethanolamine, ethylenediamine, meglumine (N-methylglucamine) and procaine. Further pharmaceutically acceptable salts include, when appropriate, nontoxic ammonium cations and carboxylate, sulfonate and phosphonate anions attached to alkyl having from 1 to 20 carbon atoms.

The terms "subject" or "subject in need thereof" or "patient" are used interchangeably herein. These terms refer to a patient who has been diagnosed with the underlying disorder to be treated. The subject may currently be experiencing symptoms associated with the disorder or may have experienced symptoms in the past. Additionally, a "subject in need thereof" may be a patient at risk of developing a particular disease, or to a patient reporting one or more of the physiological systems of a disease, even though a diagnosis of this disease may not have been made. As a non-limiting example, a "subject in need thereof", for purposes of this application, may include a male who is currently diagnosed with prostate cancer or was diagnosed with prostate cancer in the past, regardless of current symptomatology.

A "patient," as used herein, includes both humans and other animals, particularly mammals. Thus the methods are applicable to both human therapy and veterinary applications. In some embodiments, the patient is a mammal, for example, a primate. In some embodiments, the patient is a human.

As used herein, the terms "treatment" or "treating" are used interchangeably. These terms refer to an approach for obtaining beneficial or desired results including, but not limited to, therapeutic benefit. Therapeutic benefit includes eradication or amelioration of the underlying disorder being treated; it also includes the eradication or amelioration of one or more of the symptoms associated with the underlying disorder such that an improvement is observed in the patient, notwithstanding that the patient may still be afflicted with the underlying disorder.

Treatment can involve administering a compound described herein to a patient diagnosed with a disease, and may involve administering the compound to a patient who does not have active symptoms. Conversely, treatment may involve administering the compositions to a patient at risk of developing a particular disease, or to a patient reporting one or more of the physiological symptoms of a disease, even though a diagnosis of this disease may not have been made.

The terms "administer", "administering" or "administration" in reference to a dosage form of the invention refers to the act of introducing the dosage form into the system of subject in need of treatment. When a dosage form of the invention is given in combination with one or more other active agents (in their respective dosage forms), "administration" and its variants are each understood to include concurrent and/or sequential introduction of the dosage form and the other active agents. Administration of any of the described dosage forms includes parallel administration, co-administration or sequential administration. In some situations, the therapies are administered at approximately the same time, e.g., within about a few seconds to a few hours of one another.

A "therapeutically effective" amount of the compounds described herein is typically one which is sufficient to achieve the desired effect and may vary according to the nature and severity of the disease condition, and the potency of the compound. It will be appreciated that different concentrations may be employed for prophylaxis than for treatment of an active disease. A therapeutic benefit is achieved with the amelioration of one or more of the physiological symptoms associated with the underlying disorder such that an improvement is observed in the patient, notwithstanding that the patient may still be afflicted with the underlying disorder.

The term modulate with respect to PP2A refers to activation or potentiation of phosphatase activity by three general effects 1. direct allosteric activation of catalytic activity in PP2A complexes. 2. By promotion of assembly of heterotrimeric B-subunit containing trimers, or recruitment of PP2A AC heterodimers to the Integrator-RNAPII complex. 3. By displacement of endogenous PP2A inhibitors or chaparones, thereby derepressing PP2A activity. These effects are not mutually exclusive though their relative importance may depend on cell or tissue type and specific disease state or pathology.

The term "modulate" with respect to a FOXO transcription factor protein refers to activation of the FOXO transcription factor protein and its biological activities associated with the FOXO pathway. Modulation of FOXO transcription factor proteins includes up-regulation (i.e., agonizing, activation or stimulation). The mode of action of a FOXO modulator can be direct, e.g., through binding to the FOXO transcription factor protein as a ligand. The modulation can also be indirect, e.g., through binding to and/or modifying another molecule which otherwise binds to and activates the FOXO transcription factor protein.

"Hydrocarbon" (e.g., ($C_1$-$C_5$) hydrocarbon) includes alkyl, cycloalkyl, polycycloalkyl, alkenyl, alkynyl, aryl and combinations thereof. Examples include benzyl, phenethyl, cyclohexylmethyl, adamantyl, norbornyl, and naphthylethyl. Hydrocarbyl (or hydrocarbon) refers to any substituent comprised of hydrogen and carbon as the only elemental constituents. Aliphatic hydrocarbons are hydrocarbons that are not aromatic; they may be saturated or unsaturated, cyclic, linear or branched. Examples of aliphatic hydrocarbons include isopropyl, 2-butenyl, 2-butynyl, cyclopentyl, norbornyl, etc. Aromatic hydrocarbons include benzene (phenyl), naphthalene (naphthyl), anthracene, etc.

Unless otherwise specified, alkyl (or alkylene) is intended to include linear or branched saturated hydrocarbon structures and combinations thereof. Alkyl refers to alkyl groups from 1 to 20 carbon atoms, preferably 1 to 10 carbon atoms, more preferably 1 to 6 carbon atoms. Examples of alkyl groups include methyl, ethyl, propyl, isopropyl, n-butyl, s-butyl, t-butyl and the like.

Cycloalkyl is a subset of hydrocarbon and includes cyclic hydrocarbon groups of from 3 to 8 carbon atoms. Examples of cycloalkyl groups include cy-propyl, cy-butyl, cy-pentyl, norbornyl and the like.

Alkoxy or alkoxyl refers to groups of from 1 to 20 carbon atoms, preferably 1 to 10 carbon atoms, more preferably 1 to 6 carbon atoms of a straight or branched configuration attached to the parent structure through an oxygen. Examples include methoxy, ethoxy, propoxy, isopropoxy and the like. Lower-alkoxy refers to groups containing one to four carbons. For the purpose of this application, alkoxy and lower alkoxy include methylenedioxy and ethylenedioxy.

The term "halogen" means fluorine, chlorine, bromine or iodine atoms. In one embodiment, halogen may be a fluorine or chlorine atom.

The terms "haloalkyl," "haloalkoxy," or "haloalkylthio" mean alkyl, alkoxy, or alkylthio, respectively, substituted with one or more halogen atoms.

Heterocycle means an aliphatic or aromatic carbocycle residue in which from one to four carbons is replaced by a heteroatom selected from the group consisting of N, O, and S. The nitrogen and sulfur heteroatoms may optionally be oxidized, and the nitrogen heteroatom may optionally be quaternized. Unless otherwise specified, a heterocycle may be non-aromatic (heteroaliphatic) or aromatic (heteroaryl). Examples of heterocycles include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, tetrahydrofuran and the like. Examples of heterocyclyl residues include piperazinyl, piperidinyl, pyrazolidinyl, imidazolyl, imidazolinyl, imidazolidinyl, pyrazinyl, oxazolidinyl, isoxazolidinyl, thiazolidinyl, isothiazolyl, quinuclidinyl, isothiazolidinyl, benzimidazolyl, thiadiazolyl, benzopyranyl, benzothiazolyl, tetrahydrofuryl, tetrahydropyranyl, thienyl (also historically called thiophenyl), benzothienyl, thiamorpholinyl, oxadiazolyl, triazolyl and tetrahydroquinolinyl. Examples of heteroaryls include imidazole, pyridine, indole, thiophene, benzopyranone, thiazole, furan, benzimidazole, quinoline, isoquinoline, quinoxaline, pyrimidine, pyrazine, tetrazole and pyrazole. In some embodiments, examples of heteroaryls include imidazole, pyridine, thiophene, thiazole, furan, pyrimidine, pyrazine, tetrazole and pyrazole.

As used herein, the term "optionally substituted" may be used interchangeably with "unsubstituted or substituted". The term "substituted" refers to the replacement of one or more hydrogen atoms in a specified group with a specified radical. "Oxo" may also be included among the substituents referred to in "optionally substituted"; it will be appreciated by persons of skill in the art that, because oxo is a divalent radical, there are circumstances in which it will not be appropriate as a substituent (e.g. on phenyl). In one embodiment, 1, 2, or 3 hydrogen atoms are replaced with a specified radical. In the case of alkyl and cycloalkyl, more than three hydrogen atoms can be replaced by fluorine; indeed, all available hydrogen atoms could be replaced by fluorine.

EXAMPLES

| Example Number | Structure | Synthesis Scheme and Characterization |
|---|---|---|
| 1 | | Scheme 1 |
| 2 | | Cis diastereoisomer |
| 3 | | (2R,4S) absolute stereochemistry |

-continued

| Example Number | Structure | Synthesis Scheme and Characterization |
|---|---|---|
| 4 | | (2S,4R) absolute stereochemistry |
| 5 | | Scheme 2 |
| 6 | | Scheme 4 |
| 7 | | $a_D^{20}$ = 26.7 (c = 1, EtOH) |
| 8 | | $a_D^{20}$ = −27.8 (c = 1, EtOH) |

-continued

| Example Number | Structure | Synthesis Scheme and Characterization |
|---|---|---|
| 9 | | |
| 10 | | |
| 11 | | |
| 12 | | |
| 13 | | |

-continued

| Example Number | Structure | Synthesis Scheme and Characterization |
|---|---|---|
| 14 | | |
| 15 | | |
| 16 | | |
| 17 | | Silyl-Prins |
| 18 | | Via amine inversion |

| Example Number | Structure | Synthesis Scheme and Characterization |
|---|---|---|
| 19 | | Via amine inversion |
| 20 | | Aza-Prins-Ritter |
| 21 | | Aza-Prins-Ritter |

Preparation of compounds can involve the protection and deprotection of various chemical groups. The need for protection and deprotection, and the selection of appropriate protecting groups, can be readily determined by one skilled in the art. Suitable groups for that purpose are discussed in standard textbooks in the field of chemistry, such as Protective Groups in Organic Synthesis by T.W. Greene and P.G.M. Wuts [John Wiley & Sons, New York, 1999], in Protecting Group Chemistry, 1$^{st}$ Ed., Oxford University Press, 2000; and in *March's Advanced Organic chemistry: Reactions, Mechanisms, and Structure,* 5$^{th}$ Ed., Wiley-Interscience Publication, 2001.

General synthesis. The key reaction step is construction of the central tetrahydropyran ring by a modification of the Prins-Ritter conditions reported by Subba Reddy and Ghanty in Synthetic Communications, 2014, 44:17, pages 2545-2554. The main modifications are 1. Use of methyl enol ether as an aldehyde equivalent, 2. microwave heating and 3. Stoichiometric benzenesulfonimide acid catalyst. The reaction is reported to give cis-relative stereochemistry as the major product, as depicted for Example 2.

Synthesis Scheme 1. Example 1: Synthetic route to N-(2-(10,11-dihydro-5H-dibenzo[a,d][7]annulen-5-yl)tetrahydro-2H-pyran-4-yl)-4-(trifluoromethoxy)benzenesulfonamide is shown in Scheme 1 below:

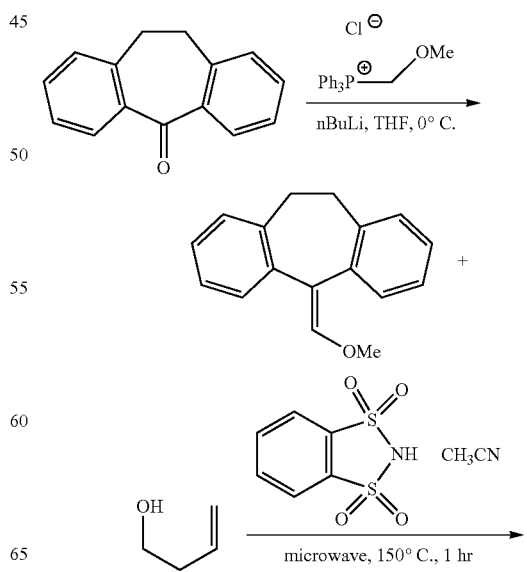

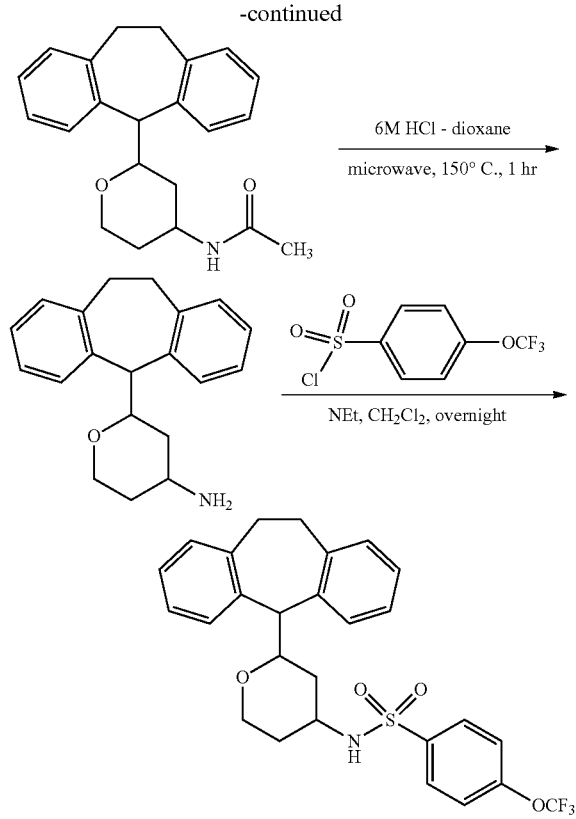

An oven dried two-neck round bottomed flask equipped with a pressure equalizing addition funnel was cooled to room temperature while flushing with argon and (methoxymethyl) triphenylphosphonium chloride, 34.3 g (100 mmole, 2 equivalents) was added, and the solid suspended in 200 mL dry THF. The suspension was stirred and cooled to 0° C. in ice, then 40 mL of 2.5M n-butyllithium solution (100 mmole, 2 equivalents) in hexanes was added dropwise. The deep red solution was stirred at 0° C. for 10 minutes, then a solution of dibenzosuberone, 10.4 g (50 mmole, 1 equivalent) in 50 mL dry THF was added from the addition funnel and the solution was stirred at 0° C. for 5 hours, then at room temperature overnight. White precipitate forms after about five hours. The reaction was cooled in ice then quenched with aqueous ammonium chloride (2.6 g, 50 mmole in 10 ml water), stirred briefly, then filtered through a pad of Celite to remove bulk of precipitate, which was washed with 50 mL ethyl acetate. The filtrate was evaporated to give an orange oil. 100 mL ethyl acetate was added, then 50 mL hexanes (till solution was slightly cloudy) and the mixture was left to stand in a fridge at 4° C. overnight. The mixture was filtered through a 2 cm pad of silica gel, which was washed with ethyl acetate. The filtrate was evaporated to give a pale yellow oil which was purified by flash chromatography eluting with 2% ethyl acetate in hexane, to give 4.87 g (41%) of the product, 5-(methoxymethylene)-10,11-dihydro-5H-dibenzo[a,d][7]annulene, as a colorless oil. 300 MHz $^1$H NMR in CDCl$_3$ 7.46-7.11 (overlapping m, 8H), 6.37 (s, 1H), 3.73 (s, 3H), 3.16 (br s, 4H). TLC-MS ESI +ve ion, 278.9 [M+CH$_3$CN+H]$^+$.

5-(Methoxymethylene)-10,11-dihydro-5H-dibenzo[a,d][7]annulene, 1.26 g (5 mmole, 1 equivalent), 3-buten-1-ol, 0.53 mL (0.46 g, 6.4 mmole, 1.2 equivalent), and 1,3,2-Benzodithiazole-1,1,3,3-tetraoxide, 1.1 g (5 mmole, 1 equivalent) were placed in a 30 mL CEM microwave vial. Dry acetonitrile, 15 mL, was added and the mixture was stirred briefly at room temperature to give a clear homogeneous solution. The mixture was stirred and heated at 150° C. for 1 hour. Reaction was diluted into 100 mL ethyl acetate and the organic was washed once with 1M aqueous potassium carbonate, once with saturated brine then dried over anhydrous sodium sulfate. Filtration and evaporation gives crude product which was purified by flash chromatography, eluting with 60 to 70% ethyl acetate hexane. The product, N-(2-(10,11-dihydro-5H-dibenzo[a,d][7]annulen-5-yl)tetrahydro-2H-pyran-4-yl)acetamide, is a colorless oil that crystallizes to give a white solid on pumping in vacuo: 0.73 g (2.3 mmole, 45%). 300 MHz $^1$H NMR in CDCl$_3$ 7.21-7.05 (overlapping m, 8H), 5.32 (br d, 1H), 4.11 (m, 1H), 3.98-3.90 (overlapping m, 2H), 3.83 (m, 1H), 3.50-3.33 (overlapping m, 3H), 2.98-2.81 (overlapping m, 2H) 1.89 (s, 3H), 1.85 (m, 1H), 1.63 (m, 1H), 1.35 (m, 1H), 1.02 (m, 1H). TLC-MS ESI +ve ion, 336.2 [M+H]$^+$.

N-(2-(10,11-dihydro-5H-dibenzo[a,d][7]annulen-5-yl) tetrahydro-2H-pyran-4-yl) acetamide, 0.86 g (2.6 mmole, 1 equivalent) was placed in a 30 mL CEM microwave vial and dissolved in 15 mL dioxane. 5 mL of 6M hydrochloric acid was added and the mixture stirred briefly at room temperature, then heated in microwave at 150° C. for 1 hour. The reaction was cooled and made basic by adding 2 g solid potassium hydroxide, then stirred at room temperature for 30 min as two phases form. The reaction was diluted into 100 ml ethyl actate, washed with water once, then saturated brine and dried over anhydrous sodium sulfate. Filtration and evaporation gives the crude intermediate amine, 2-(10, 11-dihydro-5H-dibenzo[a,d][7]annulen-5-yl)tetrahydro-2H-pyran-4-amine, which was carried into the next step without further purification. The crude amine was dissolved in 10 mL dry methylene chloride and 0.54 mL triethylamine (0.49, 4 mmole, 1.5 equivalent) was added, followed by 0.54 mL 4-trifluoromethoxybenzenesulfonyl chloride (0.813 g, 3.1 mmole, 1.2 equivalent). The mixture was stirred at room temperature overnight then diluted with 100 mL ethyl acetate and wash with 1M hydrochloric acid once and saturated aqueous brine once and the organic was dried over anhydrous sodium sulfate. Filtration and evaporation gives the crude sulfonamide which was purified by flash chromatography, eluting with 15-20% ethyl acetate hexane. Product, N-(2-(10,11-dihydro-5H-dibenzo[a,d][7]annulen-5-yl) tetrahydro-2H-pyran-4-yl)-4-(trifluoromethoxy) benzenesulfonamide, is a clear viscous oil that crystallizes on tituration with methylene chloride-hexane: 0.984 g of white solid, 1.9 mmole, 73% over two steps. 300 MHz $^1$H NMR in CDCl$_3$ 7.83 (m, 2H), 7.28 (m, 2H), 7.20-7.00 (overlapping m 8H), 4.47 (d, 1H), 4.00-3.91 (overlapping m, 2H), 3.76 (m, 1H), 3.48-3.24 (overlapping m, 4H), 2.99-2.80 (overlapping m, 2H) 1.72 (m, 1H), 1.49-1.35 (overlapping m, 2H), 1.01 (m, 1H). TLC-MS ESI-ve ion, 516.2 [M−H]$^-$.

The above synthesis affords predominantly one diastereoisomer with cis relative stereochemistry, shown as Example 2 as a racemic mixture. This maybe resolved into the separate enantiomers, shown as Examples 3 and 4 below:

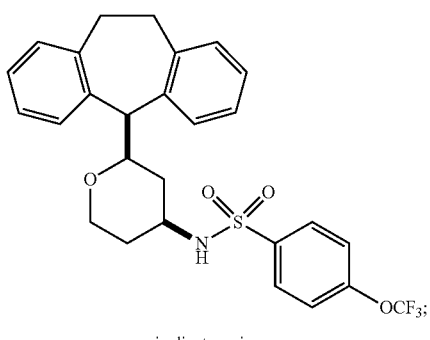

cis diastereoisomer
Example 2

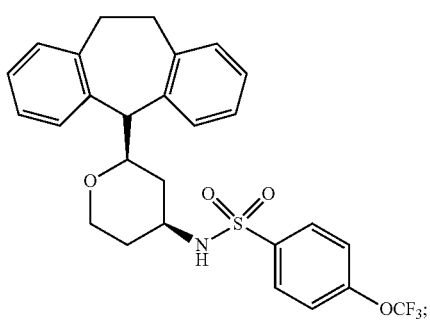

(2R,4S) absolute stereochemistry
Example 3

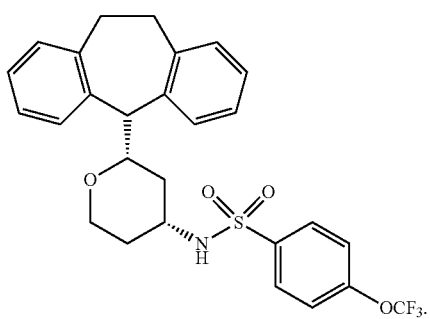

(2S,4R) absolute stereochemistry
Example 4

Synthesis Scheme 2. Example 5: synthesis of 3-chloro-N-(2-(10,11-dihydro-5H-dibenzo[a,d][7]annulen-5-yl)tetrahydro-2H-pyran-4-yl)-4-(trifluoromethoxy)benzenesulfonamide:

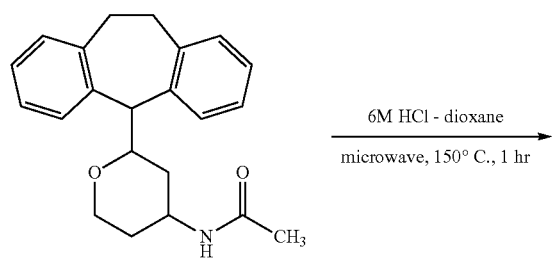

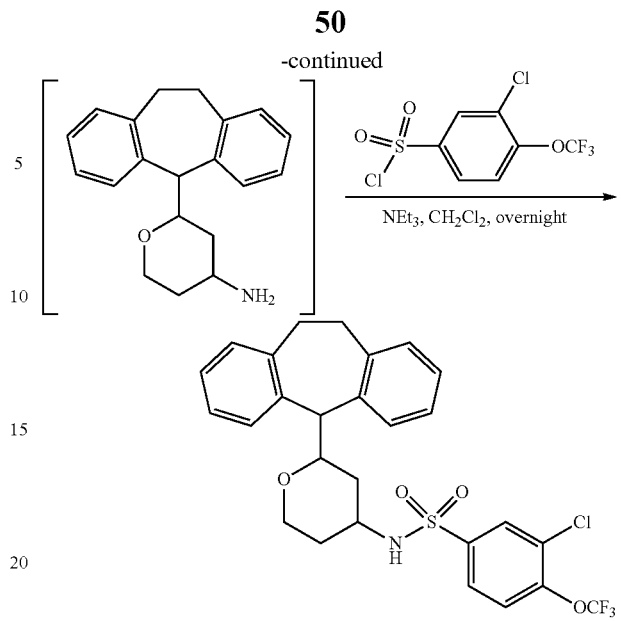

N-(2-(10,11-dihydro-5H-dibenzo[a,d][7]annulen-5-yl)tetrahydro-2H-pyran-4-yl)acetamide, 0.34 g (1 mmole, 1 equivalent) was placed in a 30 mL CEM microwave vial and dissolved in 5 mL dioxane. 2 mL of 6M hydrochloric acid was added and the mixture stirred briefly at room temperature, then heated in microwave at 150° C. for 1 hour. The reaction was cooled and made basic by adding 1.2 g solid potassium hydroxide, then stirred at room temperature for 30 min as two phases form. The reaction was diluted into 100 mL ethyl actate, washed with water once, then saturated brine and dried over anhydrous sodium sulfate. Filtration and evaporation gives the crude intermediate amine, 2-(10,11-dihydro-5H-dibenzo[a,d][7]annulen-5-yl)tetrahydro-2H-pyran-4-amine, which was carried into the next step without further purification. The crude amine was dissolved in 10 mL dry methylene chloride and 0.17 mL triethylamine (0.12 g, 1.2 mmole, 1.2 equivalent) was added, followed by 0.356 3-chloro-4-trifluoromethoxybenzenesulfonyl chloride (1.2 mmole, 1.2 equivalent). The mixture was stirred at room temperature overnight then diluted with 100 mL ethyl acetate and wash with 1M hydrochloric acid once and saturated aqueous brine once and the organic was dried over anhydrous sodium sulfate. Filtration and evaporation gives the crude sulfonamide which was purified by flash chromatography, eluting with 15-20% ethyl acetate hexane. Product, 3-chloro-N-(2-(10,11-dihydro-5H-dibenzo[a,d][7]annulen-5-yl)tetrahydro-2H-pyran-4-yl)-4-(trifluoromethoxy) benzenesulfonamide, is a clear viscous oil that gives a foam on pumping in vacuo. 300 MHz $^1$H NMR in CDCl$_3$ 7.95 (d, 1H), 7.71 (dd, 1H), 7.38 (m, 1H), 7.21-7.02 (overlapping m 8H), 4.58 (d, 1H), 4.00-3.94 (overlapping m, 2H), 3.79 (m, 1H), 3.49-3.26 (overlapping m, 4H), 3.00-2.85 (overlapping m, 2H) 1.77 (m, 1H), 1.53-1.39 (overlapping m, 2H), 1.03 (m, 1H). TLC-MS ESI-ve ion, 550.1 [M−H]$^-$.

Scheme 3: synthesis of 2,8-difluoro-10, 11-dihydro-5H-dibenzo[a,d][7]annulen-5-one, a known compound, is via adaptation of reported route shown below, and by related routes as reported in US2015/0072982 and US 2005/0165012:

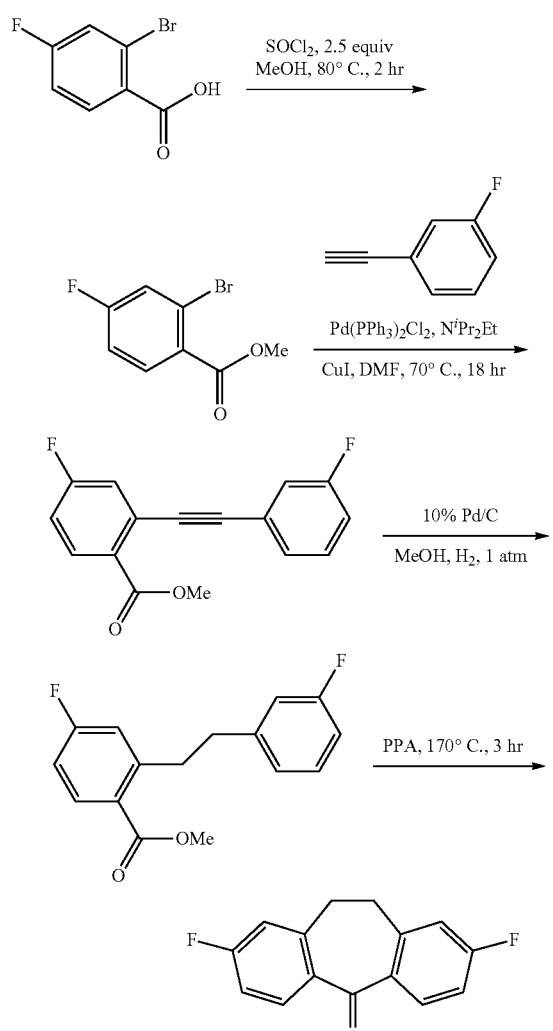

2,8-difluoro-10,11-dihydro-5H-dibenzo[a,d][7]annulen-5-one

Scheme Example 6: synthetic route to N-(2-(2,8-difluoro-10,11-dihydro-5H-dibenzo[a,d][7]annulen-5-yl)tetrahydro-2H-pyran-4-yl)-4-(trifluoromethoxy)benzenesulfonamide is shown in Scheme 4 below:

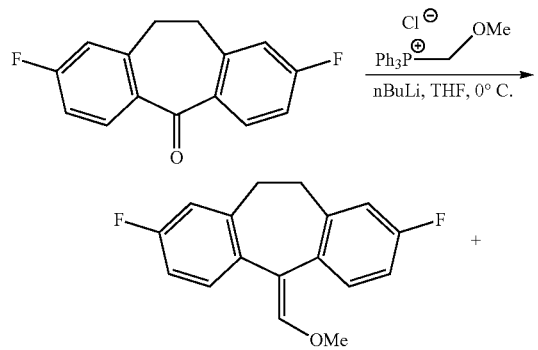

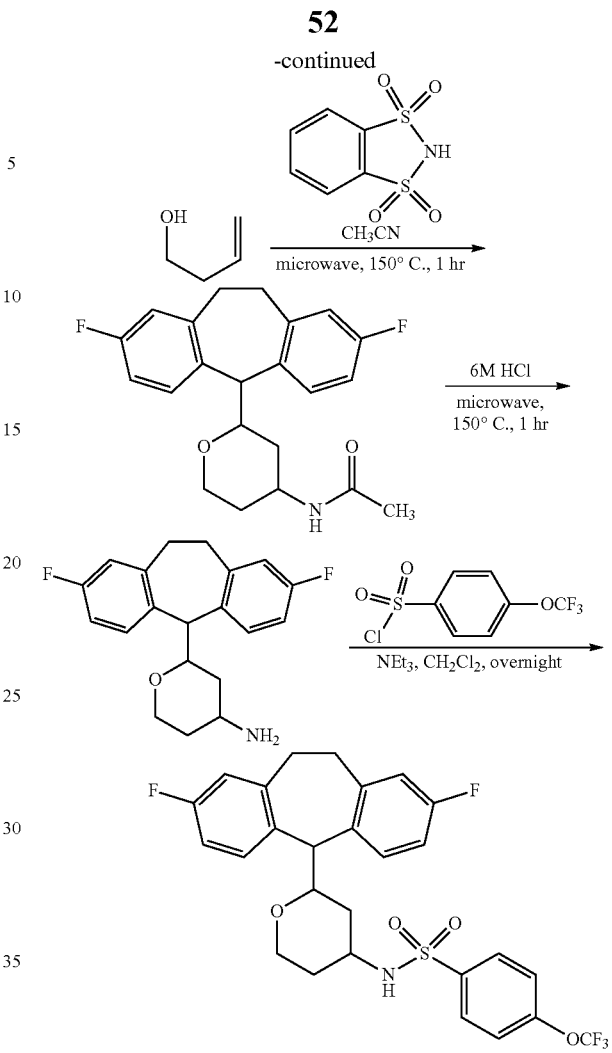

An oven dried two-neck round bottomed flask equipped with a pressure equalizing addition funnel was cooled to room temperature while flushing with argon and (methoxymethyl) triphenylphosphonium chloride, 22 g (64 mmole, 2 equivalents) was added, and the solid suspended in 150 mL dry THF. The suspension was stirred and cooled to 0° C. in ice, then 40 mL of 1.6M n-butyllithium solution (64 mmole, 2 equivalents) in hexanes was added dropwise. The deep red solution was stirred at 0° C. for 15 minutes, then a solution of dibenzosuberone, 7.8 g (32 mmole, 1 equivalent) in 30 mL dry THF was added over 30 minutes from the addition funnel at 0° C. The reaction was stirred at room temperature overnight and remains dark red with no precipitate. The reaction was cooled in ice then quenched with aqueous ammonium chloride (1.71 g, 32 mmole in 5 ml water), stirred briefly, then filtered through a pad of Celite, which was washed with 50 mL ethyl acetate. The filtrate was evaporated to give a brown oil. 100 mL ethyl acetate was added and crystalline precipitate forms on standing at room temperature for one hour. The solution was filtered through a pad of silica gel and washed with ethyl acetate and the filtrate was evaporated to give a brown oil. 100 ml of ethyl acetate was added, then 50 mL hexanes (till solution was slightly cloudy) and the mixture was left to stand at room temperature overnight. The mixture was filtered through a 2 cm pad of silica gel, which was washed with ethyl acetate. The filtrate was evaporated to give a pale brown oil which was purified by flash chromatography eluting with 2% ethyl acetate in hexane, to give 8.1 g (30 mmole, 93%) of the product, 2,8-difluoro-5-(methoxymethylene)-10, 11-dihydro-5H-dibenzo[a,d][7]annulene, as a pale yellow oil which crystallizes on standing in freezer overnight. 300 MHz $^1$H NMR in CDCl$_3$ 7.41-7.35 (m, 1H), 7.20-7.15 (m, 1H), 6.90-6.80 (overlapping m, 4H), 6.31 (s, 1H), 3.73 (s, 3H), 3.11 (s, 4H).

In three identical batches: 2,8-difluoro-5-(methoxymethylene)-10,11-dihydro-5H-dibenzo[a,d][7]annulene, 2.72 g (10 mmole, 1 equivalent), 3-buten-1-ol, 1.02 mL (0.86 g, 12 mmole, 1.2 equivalent), and 1,3,2-Benzodithiazole-1,1,3,3-tetraoxide, 2.2 g (10 mmole, 1 equivalent) were placed in a 30 mL CEM microwave vial. Dry acetonitrile, 15 mL, was added and the mixture was stirred briefly at room temperature to give a clear homogeneous solution. The mixture was stirred and heated at 150° C. for 1 hour. Three combined reactions were diluted into 150 mL ethyl acetate and the organic was washed once with 2M aqueous sodium hydroxide, once with saturated brine, then dried over anhydrous sodium sulfate. Filtration and evaporation gives crude product which was purified by flash chromatography, eluting with 60 to ethyl 70% acetate hexane. The product, N-(2-(2, 8-difluoro-10, 11-dihydro-5H-dibenzo[a,d][7]annulen-5-yl)tetrahydro-2H-pyran-4-yl) acetamide, is a colorless oil that crystallizes on pumping in vacuo: 4.82 g (13 mmole, 43%). 300 MHz $^1$H NMR in CDCl$_3$ 7.16-7.04 (overlapping m, 2H), 6.84-6.75 (overlapping m, 4H), 5.32 (br d, 1H), 4.05-3.93 (overlapping m, 3H), 3.80 (m, 1H), 3.48-3.28 (overlapping m, 3H), 2.98-2.81 (overlapping m, 2H) 1.91 (s, 3H), 1.83 (m, 1H), 1.63 (m, 1H), 1.35 (m, 1H), 0.97 (m, 1H).

In two identical batches: N-(2-(2,8-difluoro-10, 11-dihydro-5H-dibenzo[a,d][7]annulen-5-yl)tetrahydro-2H-pyran-4-yl) acetamide, 1.85 g (5 mmole, 1 equivalent) was placed in a 30 mL CEM microwave vial and dissolved in 15 mL dioxane. 5 mL of 6M hydrochloric acid was added and the mixture stirred briefly at room temperature, then heated in microwave at 150° C. for 1 hour. The reaction was cooled and made basic by adding 2 g solid potassium hydroxide, then stirred at room temperature for 30 min as two phases form. The two combined reactions reactions were diluted into 150 mL ethyl acetate, washed with water once, then saturated brine and dried over anhydrous sodium sulfate. Filtration and evaporation gives the crude intermediate amine, which was carried into the next step without further purification. The crude amine was dissolved in 30 mL dry methylene chloride and 1.7 mL triethylamine (1.2 g, 12 mmole, 1.2 equivalent) was added, followed by 2 mL 4-trifluoromethoxybenzenesulfonyl chloride (3.13 g, 12 mmole, 1.2 equivalent). The mixture was stirred at room temperature overnight then diluted with 100 mL methylene chloride and washed with 1M hydrochloric acid once and saturated aqueous brine once and the organic was dried over anhydrous sodium sulfate. Filtration and evaporation gives the crude sulfonamide which was purified by flash chromatography, eluting with 15-20% ethyl acetate hexane. Product, N-(2-(2,8-difluoro-10,11-dihydro-5H-dibenzo[a,d][7]annulen-5-yl)tetrahydro-2H-pyran-4-yl)-4-(trifluoromethoxy)benzenesulfonamide, is a clear viscous oil that gives foam on pumping in vacuo: 3.1 g of white solid, 5.6 mmole, 56% over two steps. 300 MHz $^1$H NMR in CDCl$_3$ 7.83 (m, 2H), 7.28 (m, 2H), 7.11 (m, 1H), 6.98 (m, 1H), 6.86-6.73 (overlapping m 4H), 4.59 (d, 1H), 3.95-3.85 (overlapping m, 2H), 3.75 (m, 1H), 3.45-3.21 (overlapping m, 4H), 2.95-2.82 (overlapping m, 2H) 1.70 (m, 1H), 1.48-1.35 (overlapping m, 2H), 0.96 (m, 1H). TLC-MS ESI-ve ion, 552.2 [M–H]$^-$.

Example 6, N-(2-(2,8-difluoro-10, 11-dihydro-5H-dibenzo[a,d][7]annulen-5-yl)tetrahydro-2H-pyran-4-yl)-4-(trifluoromethoxy)benzenesulfonamide, was analyzed by chiral HPLC and it was found that it was readily resolved into its enantiomers by a CHIRALPAK® AD-H column (250×4.6 mm i.d., 50 m), eluting with hexane/isopropanol (85/15) at 1 mL/min flow rate at room temperature. Enantiomer 1, Peak 1, eluted at 9.0 min and enantiomer 2, Peak 2 eluted at 12.5 min. These conditions are readily scaleable for gram or kilo scale preparations.

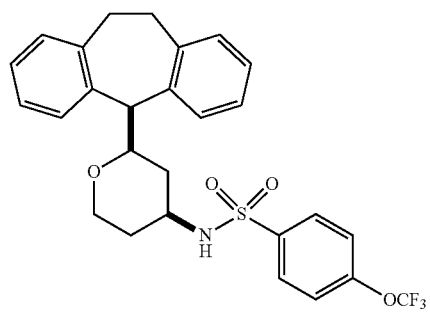

racemic cis diastereoisomer
Example 2

Chiral Technologies Inc.

Column size: 30 mm x 250 mm
Stationary phase: CHIRALPAK ADH
Mobile phase: Hexane/$^i$PrOH, 90/10
Flow rate: 40 mL/min
UV detection at 265 nm
Room temperature.

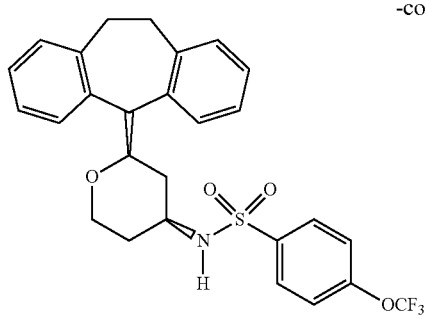

Peak 1. Single enantiomer
Example 7

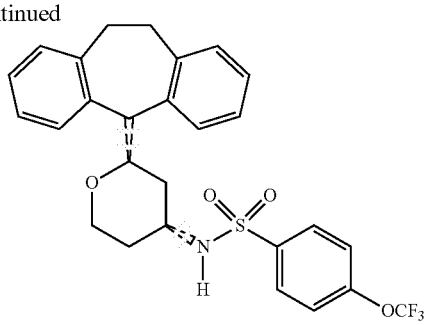

Peak 2. Single enantiomer
Example 8

Example 2, prepared as described above was resolved into it's enantiomers by preparative chiral chromatography. 1.2 g of Example 2 was loaded onto a 30×250 mm CHIRALPAK ADH column and eluted with 90:10 hexane: isopropanol with a flow rate of 40 mL/min. Detection was via in-line UV detector measuring absorbance at 265 nm and two peaks were collected. Peak 1, Example 7, eluted at 9.71 minutes and 0.527 g (87.9% of theoretical yield) material was obtained as a white solid after evaporation. Peak 2, Example 8, eluted at 13.20 minutes and 0.573 g (95.5% of theoretical yield) material was obtained as a white solid after evaporation. Jugded from analytical chiral HPLC using CHIRALPAK ADH, 4.6 mm×250 mm column, 1 mL/min, room temperature, detection by UV at 230 nm versus Example 2 (racemate), the enantiomeric purity of Example 7 (Peak 1) was 99.4% ee. The enantiomeric purity of Example 8 (Peak 2) was 98.8% ee. Optical rotation was measured in a Jasco P2000 polarimeter using a 3.5 mm×100 mm cell at concentration 1 g/100 mL, at 20° C. with 589 nm (Na, D line) light source. The specific rotation of Example 7 was $\alpha_D^{20}$=26.7 (c=1, EtOH). The specific rotation of Example 8 was $\alpha_D^{20}$=−27.8 (c=1, EtOH). NMR of Example 8 is identical to that reported for Example 2 and MS (PE-SCIEX API-150, ionization by ESI) gives [M+Na]$^+$ at 540.0 in +ve ion detection and [M−H]$^−$ at 516.1 in −ve ion detection. NMR of Example 7 is identical to that reported for Example 2 and MS (PE-SCIEX API-150, ionization by ESI) gives [M+Na]$^+$ at 540.0 in +ve ion detection and [M−H]$^−$ at 516.2 in −ve ion detection.

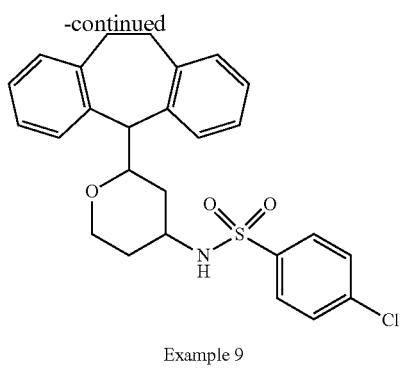

Example 9

Synthesis of Example 9, 4-chloro-N-(2-(10,11-dihydro-5H-dibenzo[a,d][7]annulen-5-yl)tetrahydro-2H-pyran-4-yl) benzenesulfonamide was synthesized as follows. 0.29 g, 1 mmole (1 equiv) of (10,11-dihydro-5H-dibenzo[a,d][7]annulen-5-yl)tetrahydro-2H-pyran-4-amine, prepared as described above (see paragraph 103), was dissolved in 10 mL dry acetonitrile and 0.2 mL, 1.2 mmole (1.2 euiv) Hunig's base was added. 4-Chlorobenzene sulfonamide, 0.25 g, 1.2 mmole (1.2 equiv) was added as a solid and the mixture was stirred at room temperature over night. The mixture was diluted with 100 ml ethyl acetate and washed with 1M HCl(aq), 1×50 mL, water 1×50 mL and the organic dried over magnesium sulfate. Filtration and evaporation gives the crude product as a mobile pale yellow oil which was purified by flash chromatography eluting with 15-20% ethylacetate in hexane. Evaporation and pumping on residue gives a white solid. 300 MHz $^1$H NMR in CDCl$_3$ 7.68 (m, 2H), 7.37 (m, 2H), 7.18-6.96 (overlapping m, 8H), 4.39 (d, 1H), 3.93-3.87 (overlapping m, 2H), 3.71 (m, 1H), 3.39-3.19 (overlapping m, 4H), 2.93-2.80 (overlapping m, 2H) 1.70 (m, 1H), 1.43-1.35 (overlapping m, 2H), 0.93 (m, 1H). TLC-MS APCI −ve ion, 466.1 [M−H]$^−$ and 933.3 [2M−H]$^−$.

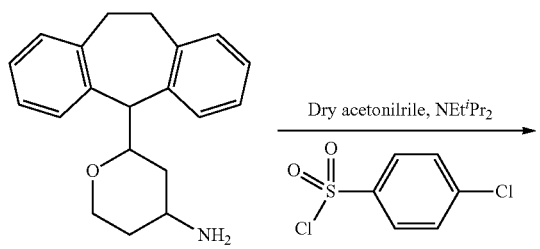

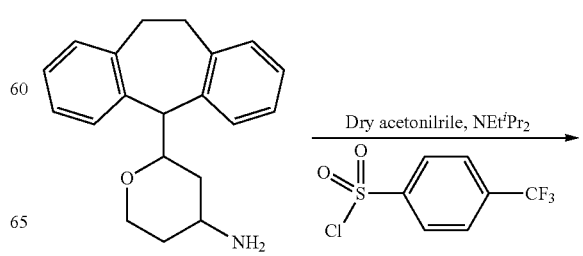

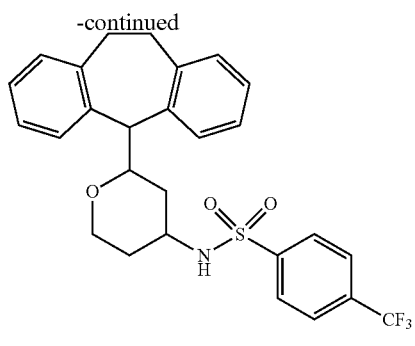

Example 10

Example 10, N-(2-(10,11-dihydro-5H-dibenzo[a,d][7]annulen-5-yl)tetrahydro-2H-pyran-4-yl)-4-(trifluoromethyl)benzenesulfonamide, was prepared in the same way as Example 9. White solid: 300 MHz ¹H NMR in CDCl₃ 7.70 (d, 2H), 7.69 (m, 2H), 7.16-7.05 (overlapping m, 8H), 4.50 (d, 1H), 3.97-3.88 (overlapping m, 2H), 3.72 (m, 1H), 3.44-3.20 (overlapping m, 4H), 2.93-2.80 (overlapping m, 2H) 1.68 (m, 1H), 1.47-1.33 (overlapping m, 2H), 1.00 (m, 1H). TLC-MS APCI −ve ion, 500.1 [M−H]⁻ and 1001.5 [2M−H]⁻.

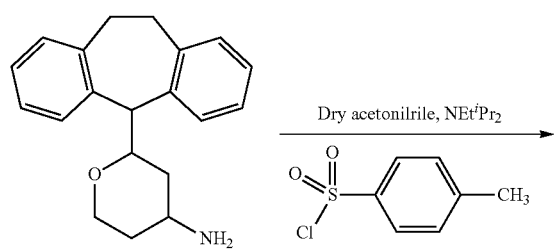

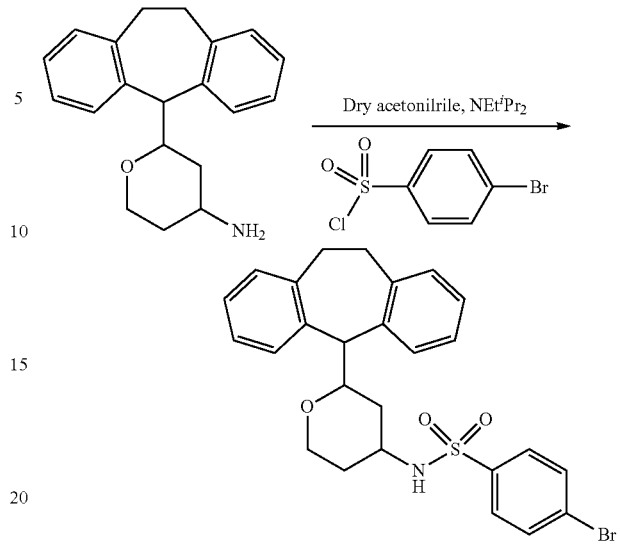

Example 12

Example 12, 4-bromo-N-(2-(10,11-dihydro-5H-dibenzo[a,d][7]annulen-5-yl)tetrahydro-2H-pyran-4-yl)benzenesulfonamide, was prepared in the same way as Example 9. White solid: 300 MHZ ¹H NMR in CDCl₃ 7.62-7.52 (m, 4H), 7.21-6.97 (overlapping m, 8H), 4.39 (d, 1H), 4.09-3.87 (overlapping m, 2H), 3.71 (m, 1H), 3.43-3.19 (overlapping m, 4H), 2.97-2.79 (overlapping m, 2H), 1.69 (m, 1H), 1.45-1.32 (m, 2H), 0.93 (m, 1H). TLC-MS APCI −ve ion, 509.0 and 512.0 [M−H]⁻ (Br isotopes) and +ve ion 514.0 and 511.9 [M+H]⁺ (Br isotopes).

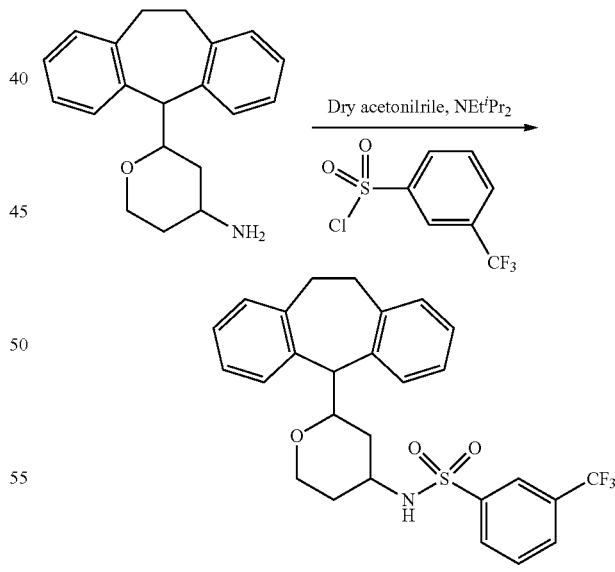

Example 13

Example 11, N-(2-(10,11-dihydro-5H-dibenzo[a,d][7]annulen-5-yl)tetrahydro-2H-pyran-4-yl)-4-methylbenzenesulfonamide, was prepared in the same way as Example 9. White solid: 300 MHz ¹H NMR in CDCl₃ 7.64 (m, 2H), 7.20 (m, 2H), 7.15-6.98 (overlapping m, 8H), 4.29 (d, 1H), 3.99-3.84 (overlapping m, 2H), 3.73 (m, 1H), 3.49-3.19 (overlapping m, 4H), 2.95-2.80 (overlapping m, 2H), 2.43 (s, 3H), 1.64 (m, 1H), 1.48 (m, 1H), 1.34 (m, 1H), 0.96 (m, 1H). TLC-MS APCI −ve ion, 446.1 [M−H]⁻ and 893.4 [2M−H]⁻ and +ve ion 448.2 [M+H]⁺.

N-(2-(10,11-dihydro-5H-dibenzo[a,d][7]annulen-5-yl)tetrahydro-2H-pyran-4-yl)-3-(trifluoromethyl)benzenesulfonamide, was prepared in the same way as Example 9. White solid: 300 MHz ¹H NMR in CDCl₃ 8.06 (br s, 1H), 7.93 (br d, 1H), 7.77 (br d, 1H), 7.54 (br t, 1H), 7.15-6.95 (overlapping m, 8H), 4.49 (d, 1H), 3.98-3.87 (overlapping m, 2H), 3.73 (m, 1H), 3.43-3.20 (overlapping m, 4H), 2.99-2.79 (overlapping m, 2H), 1.69 (m, 1H), 1.47-1.33 (m, 2H), 1.01 (m, 1H). TLC-MS APCI −ve ion, 500.2 [M−H]⁻ and 1001.6 [2M−H]⁻ and +ve ion 502.2 [M+H]⁺.

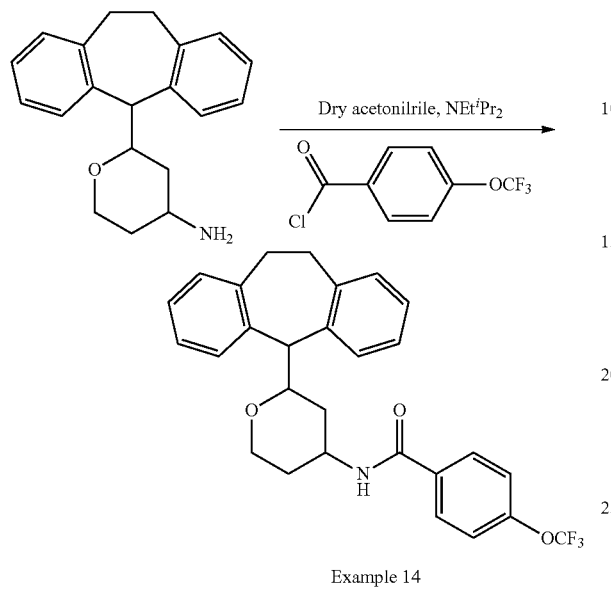

Example 14

Example 14, N-(2-(10,11-dihydro-5H-dibenzo[a,d][7]an-nulen-5-yl)tetrahydro-2H-pyran-4-yl)-4-(trifluoromethoxy)benzamide wherein L is carbonyl, was prepared by dissolving 0.29 g, 1 mmole (1 equiv) of (10,11-dihydro-5H-dibenzo[a,d][7]annulen-5-yl)tetrahydro-2H-pyran-4-amine in 10 ml dry acetonitrile and 0.2 mL (1.2 mmole, 1.2 euiv) Hunig's base was added. 0.2 mL (0.27 g, 1.2 mmole, 1.2 equiv) of 4-trifluoromethoxybenzoyl chloride was added and the mixture was stirred overnight. The reaction was diluted into 100 mL ethyl acetate and the mixture was washed with 50 mL 1M HCl (aq) then 50 ml water. The organic was dried over magnesium sulfate, filtered and evaporated to give crude product as an oil. Flash chromatography eluting with 15 to 20% ethyl acetate in hexane gives Example 14 as a white solid. 300 MHz ¹H NMR in CDCl₃ 7.74 (m, 2H), 7.25-7.07 (overlapping m, 10H), 5.85 (d, 1H), 4.22-4.13 (overlapping m, 2H), 4.03 (m, 1H), 3.86 (m, 1H), 3.54-3.35 (overlapping m, 2H), 2.93 (overlapping m 2H), 1.67 (m, 1H), 1.73 (m, 1H), 1.47 (m, 1H) 1.15 (m, 1H). TLC-MS APCI +ve ion 482.2 [M+H]⁺ and 963.3 [2M+H]⁺.

Example 15, N-(2-benzhydryltetrahydro-2H-pyran-4-yl)-4-(trifluoromethoxy)benzenesulfonamide, was prepared from commercially available 2,2-diphenylacetaldehyde. The key Prins-Ritter cyclization uses conditions adapted from Yadav et al, Tetrahedron Letters 48 (2007) 4903-4906, with microwave heating.

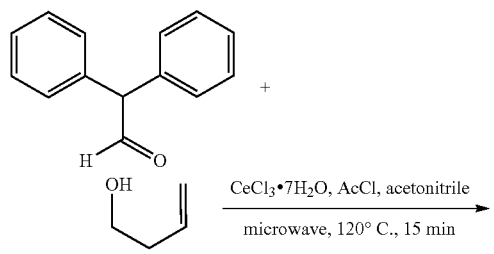

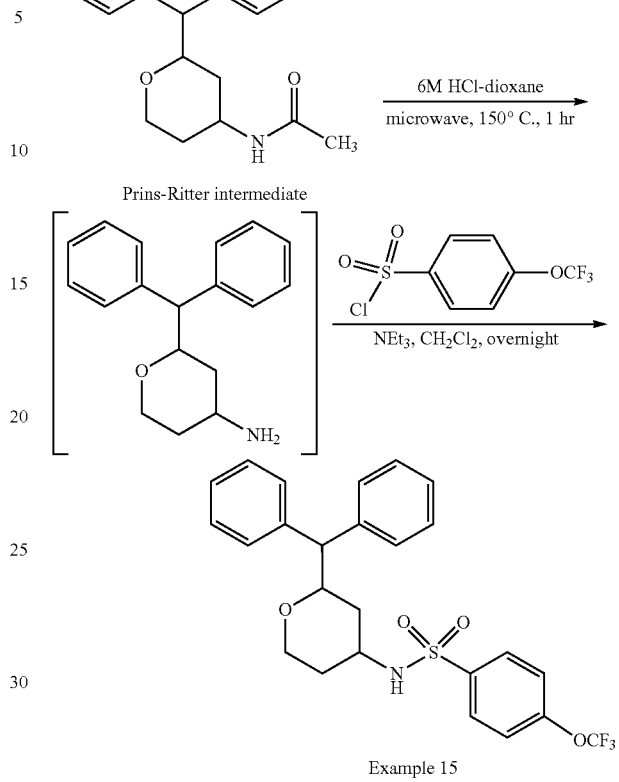

Example 15

A microwave vial was charged with 1.8 mL (1.96 g, 10 mmole, 1 equiv) 2,2-diphenylacetaldehyde, 1.0 mL (0.86 g, 12 mmole, 1.2 equiv) but-3-en-1-ol, 0.372 g (1 mmole, 0.1 equiv) cerium (III) chloride heptahydrate and 1.1 mL (1.2 g, 15 mmole, 1.5 equiv) acetyl chloride in 15 mL dry acetonitrile. The mixture was stirred and heated in microwave at 75° C. for 15 minutes. Thin layer chromatography (t.l.c.) shows slight conversion to the Prins-Ritter intermediate. The mixture was heated for a further 15 minutes at 120° C. The reaction was partitioned between 100 mL ethyl acetate and 100 ml saturated aqueous sodium bicarbonate. The aqueous layer was back extracted with 50 mL ethyl acetate and the combined organic was dried over magnesium sulfate, fileterd and evaporated to give a crude mixture. Flash chromatography gives a by-product which elutes first with 20-30% ethyl acetate hexane, then the Prins-Ritter intermediate which elutes with 60-70% ethyl acetate hexane. Evaporation gave a white solid: 300 MHz ¹H NMR in CDCl₃ 7.34-7.14 (overlapping m, 10H), 5.35 (d, 1H), 4.14-3.98 (overlapping m, 3H), 3.88 (d, 1H), 3.48 (dt, 1H), 1.91-1.85 (m, 1H), 1.88 (s, 3H), 1.77 (m, 1H), 1.29 (m, 1H), 1.07 (m, 1H). TLC-MS ESI +ve ion 310.7 [M+H]⁺. 0.3 g (~1 mmole) of the Prins-Ritter intermediate was placed in a microwave vial and dissolved 5 mL dioxane then 1 mL 6M HCl (aq) was added to give a homogeneous clear solution. The mixture was microwaved at 120° C. for one 1 hour and t.l.c. showed starting material remaining. The mixture was microwaved at 120° C. for an additional 1 hour. The reaction was made basic by adding 0.5 g solid potassium hydroxide and stirring for 30 min. The mixture was partitioned between 75 mL ethyl acetate and 50 ml water and the organic layer was separated and dried over anhydrous sodium sulfate.

Filtration and evaporation gave crude 2-benzhydryltetrahydro-2H-pyran-4-amine as clear oil which was used without further purification: the crude amine was dissolved in 5 mL dry methylene chloride, then 0.3 mL (2 mmole) triethylamine was added, followed by 0.2 mL (1.2 mmole) 4-trifluoromethoxybenzenesulfonyl chloride. The mixture was stirred overnight the diluted with 75 mL ethyl acetate and the organic was washed with 1×50 ml 1M HCl (aq), 1×50 mL saturated brine, the dried over magnesium sulfate. Filtration and evaporation gave the crude product with was purified by flash chromatography, eluting with 15-20% ethyl acetate in hexane. Purified N-(2-benzhydryltetrahydro-2H-pyran-4-yl)-4-(trifluoromethoxy)benzenesulfonamide, Example 15, is a white solid: 300 MHz $^1$H NMR in CDCl$_3$ 7.81 (m, 2H), 7.27-7.10 (overlapping m, 12H), 4.41 (d, 1H), 3.98-3.90 (overlapping m, 2H), 3.81 (d, 1H), 3.50-3.342 (overlapping m, 2H), 1.74 (m, 1H), 1.58 (m, 1H), 1.39 (m, 1H), 1.04 (m, 1H). TLC-MS APCI –ve ion 490.1 [M−H]$^-$ and 981.5 [2M−H]$^-$.

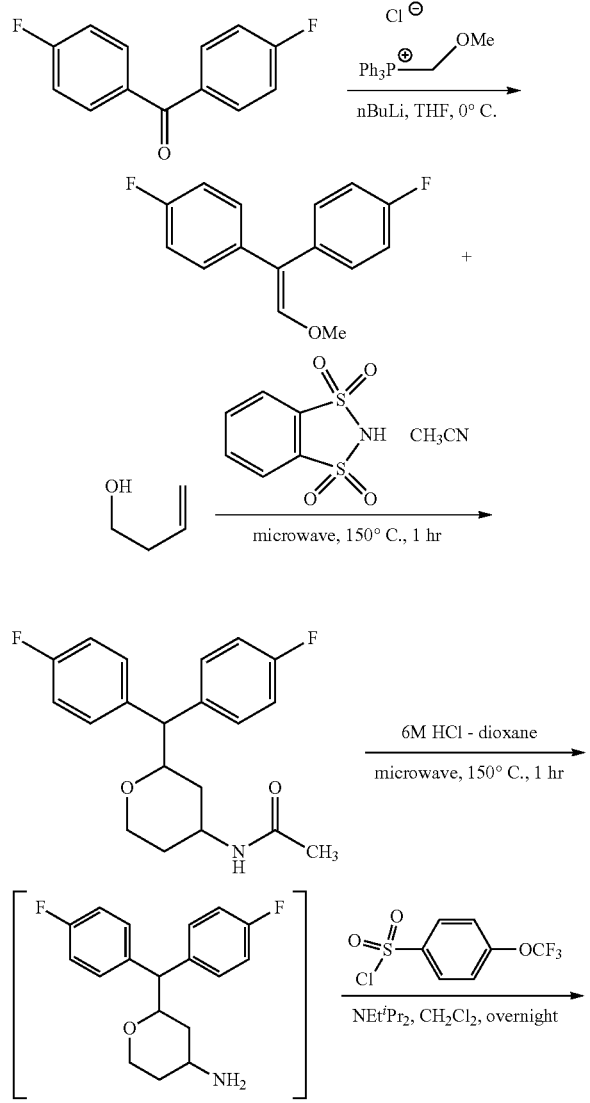

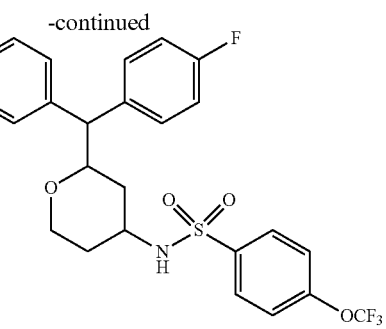

Example 16

Example 16, N-(2-(bis(4-fluorophenyl)methyl)tetrahydro-2H-pyran-4-yl)-4-(trifluoromethoxy)benzenesulfonamide was prepared as shown above. An oven dried two-neck round bottomed flask equipped with a pressure equalizing addition funnel was cooled to room temperature while flushing with argon and (methoxymethyl) triphenylphosphonium chloride, 21.4 g (62.5 mmole, 2 equiv) was added, and the solid suspended in 100 mL dry THF which was added via cannula. The suspension was cooled to 0° C. and stirred vigorously while 25 ml of a 2.5M n-butyllithium (62.5 mmole, 2 equiv) solution was added via cannula over about 5 minutes. The mixture was stirred at 0° C. during which time a deep red color develops and all of the suspended phosphonium salt dissolves. A solution of 4,4'-difluorobenzophenone was added as solution in 25 mL dry THF via the addition funnel over 10 minutes with stirring at 0° C. and the mixture was stirred for an additional 15 minutes at 0° C., then warmed to room temperature. T.l.c. indicated that all 4,4'-difluorobenzophenone was consumed after 90 minutes at room temperature. The reaction was poured onto 200 mL ethyl acetate and 100 mL 20% citric acid (cold, prepared in ice water) and shaken in a separatory funnel. The organic layer was washed with 1×100 ml water then 1×100 ml saturated aqueous sodium bicarbonate and dried over anhydrous sodium sulfate. Filtration and evaporation gave a pale yellow mobile oil to which 50 mL heptane was added and a white precipitate formed. 30 mL ethyl acetate was added and the mixture was warmed and stirred. The suspension was cooled to room temperature and allowed to stand overnight, then filtered through celite and the filter cake was washed with 30 mL heptane. The filtrate was evaporated and residue was taken up in 50 mL heptane and this solution was filtered through a 1 cm pad of flash silca between celite layers. The filtrate was evaporated to give a clear mobile oil and no further precipitate formed. The crude product was purified by flash chromatography eluting with 1% ethyl acetate in hexane. The purified material was a nearly colorless mobile oil which crystallized on standing to give 2.68 g (10.9 mmole, 35% yield) of 4,4'-(2-methoxyethene-1,1-diyl)bis(fluorobenzene): 300 MHz $^1$H NMR in CDCl$_3$ 7.34 (m, 2H), 7.15 (m, 2H), 6.99 (m, 4H), 6.38 (s, 1H), 3.77 (s, 3H). TLC-MS APCI +ve ion 247.2 [M+H]$^+$, 263.3 [M+NH$_4$]$^+$. 4,4'-(2-methoxyethene-1,1-diyl)bis(fluorobenzene), 1.23 g (5 mmole, 1 equiv) and 3-buten-1-ol 0.52 mL (0.44 g, 6 mmole, 1.2 equiv) were dissolved in 15 mL dry acetonitrile then 1.1 g (5 mmole, 1 equiv) of 2H-benzo[d][1,3,2] dithiazole 1,1,3,3-tetraoxide was added and the mixture was stirred briefly to give a colorless homogeneous solution. The mixture was microwaved at 150° C. for 1 hour then the pale yellow solution was diluted into 100 mL ethyl acetate. The organic was washed with 50 mL 1M NaOH (aq), then 50 mL water and the organic was dried over anhydrous magnesium sulfate. Filtration and evaporation gave the crude Prins-Ritter product, N-(2-(bis(4-fluorophenyl)methyl)tetrahydro-2H-pyran-4-yl) acetamide as pale yellow oil which was purified by flash chromatography, eluting with 60% ethyl acetate in hexane. The purified material is a white solid, 0.768 g (2.2 mmole), 44.5% yield. 300 MHz $^1$H NMR in CDCl$_3$ 7.24 (m, 2H), 7.15 (m, 2H), 6.96 (m, 4H), 5.21 (d, 1H), 4.08-3.95 (overlapping m, 3H), 3.86 (d, 1H), 3.49 (dt, 1H), 1.91-1.85 (m, 1H), 1.92 (s, 3H), 1.77 (m, 1H), 1.34 (m, 1H), 1.04 (m, 1H). TLC-MS ESI +ve ion 346.4 [M+H]$^+$. 0.7 g (~2 mmole) of N-(2-(bis(4-fluorophenyl)methyl)tetrahydro-2H-pyran-4-yl) acetamide was dissolved in 10 mL dioxane and 5 mL 6M HCl (aq) was added and the mixture stirred briefly. The clear, homogeneous, solution was microwaved at 150° C. with stirring for 1 hour. The reaction was cooled and 2 g of solid KOH was added and the mixture stirred for 1 hour (exotherm on adding KOH, and two phases form). The mixture is partitioned between 100 mL ethyl acetate and 50 ml water. The organic layer is washed with water, 1×50 mL, then dried over anhydrous sodium sulfate. Filtration and evaporation gives 2-(bis(4-fluorophenyl)methyl)tetrahydro-2H-pyran-4-amine as an oil which is used directly in the next step. The amine was dissolved in 10 mL methylenechloride and 0.41 ml (2.4 mmole, 1.2 equiv) of Hunigs base was added followed by 0.41 ml (0.63 g, 2.4 mmol, 1.2 equiv) of 4-trifluoromethoxybenzenesulfonyl chloride. The mixture was stirred at room temperature overnight then diluted into 100 mL ethyl acetate and the organic was washed with 1M HCl (aq), 1×50 mL, followed by water, 1×50 ml then dried over anhydrous magnesium sulfate. Filtration and evaporation give crude Example 16, which was purified by flash chromatography eluting with 20% ethylacetate in hexane. Example 16, N-(2-(bis(4-fluorophenyl)methyl)tetrahydro-2H-pyran-4-yl)-4-(trifluoromethoxy)benzenesulfonamide, is a white solid: 400 MHZ $^1$H NMR in CDCl$_3$ 7.84 (m, 2H), 7.27 (m, 2H), 7.17 (m, 2H), 7.07 (m, 2H), 6.93 (m, 4H), 4.62 (d, 1H), 3.96 (m, 1H), 3.84 (m, 1H), 3.78 (m, 1H), 3.42 (m, 1H), 3.36 (m, 1H), 1.72 (m, 1H), 1.58 (m, 1H), 1.37 (m, 1H), 1.04 (m, 1H). TLC-MS APCI -ve ion 526.5 [M-H]$^-$.

All NMR signals for hydrogen on sp$^3$ carbons of Example 16 are resolved and assigned at 400 MHZ. Nuclear Overhauser Effect (NOE) experiments confirm cis relative stereochemistry: thus irradiation at 3.84 (axial H at C2) shows NOE enhancement at 3.42 (axial H at C4). Conversely irradiation at 3.42 (axial H at C4) shows NOE enhancement at 3.84 (axial H at C$_2$). This confirms a 1,3-diaxial stereochemistry for the hydrogens at C$_2$ and C$_4$ on the pyran, and thus cis relative stereochemistry for the diarylmethyl and NHSO$_2$Ar substituents on the pyran ring.

The Prins-Ritter reaction used in the synthesis of Examples 1 through 16 gives mainly 2,4-cis relative stereochemistry across the central tetrahydropyran ring, see Subba Reddy and Ghanty in Synthetic Communications, 2014, 44:17, pages 2545-2554 and Yadav et al, Tetrahedron Letters 48 (2007) pages 4903-4906. Compounds with 2,4-trans stereochemistry may be accessed by inversion of the 4-amino stereocenter on the tetrahydropyran using one of the several methods developed by Fiksdahl, see for example Sørbye et al, Tetrahedron: Asymmetry 9 (1998) pages 681-689, or Said and Fiksdahl, Tetrahedron: Asymmetry 12 (2001) 1947-1951 and examples of the synthetic route are shown in the schemes below.

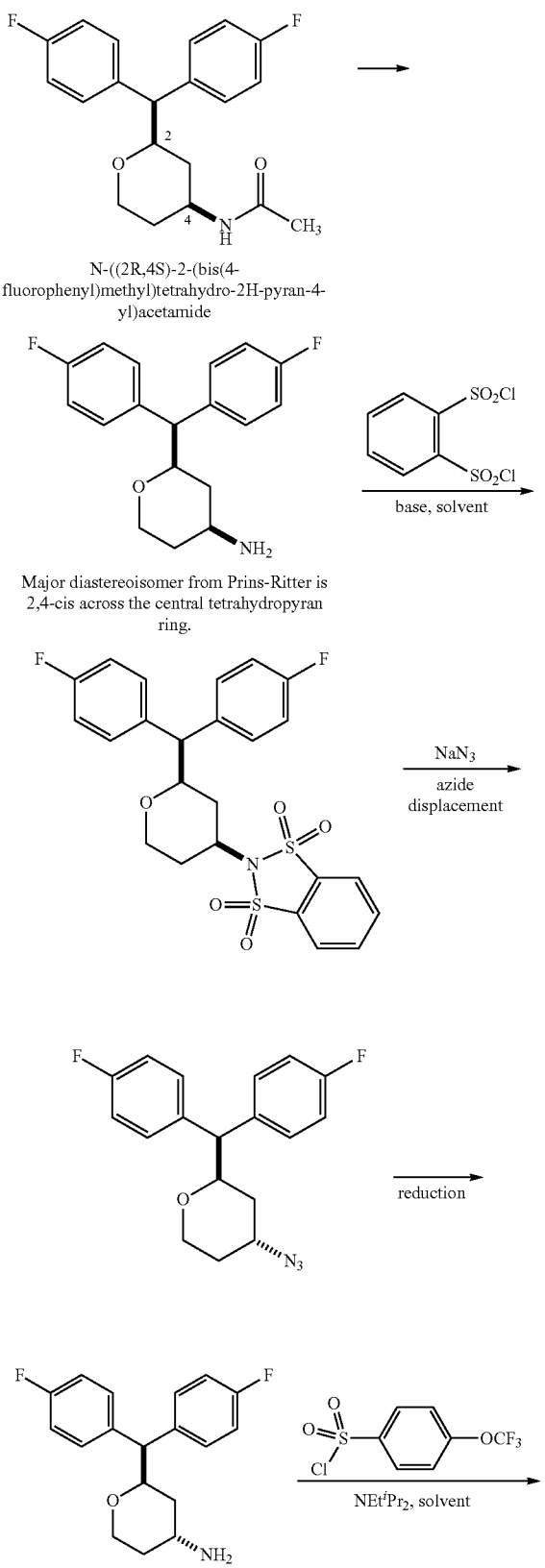

-continued

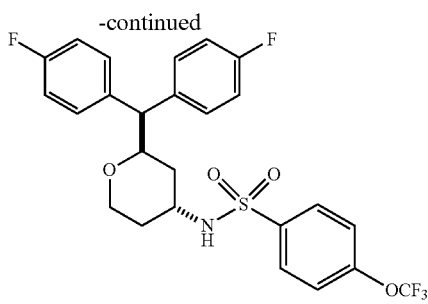

Example 18
N-((2R,4R)-2-(bis(4-fluorophenyl)methyl)tetrahydro-
2H-pyran-4-yl)-4-(trifluoromethoxy)benzenesulfonamide Synthesis of Example 18, N-((2R,4R)-2-(bis(4-fluorophenyl)methyl)tetrahydro-2H-pyran-4-yl)-4-(trifluoromethoxy)benzenesulfonamide. 2-(bis(4-fluorophenyl)methyl)tetrahydro-2H-pyran-4-amine is prepared as described above. The amine is reacted with benzene-1,2-disulfonyl dichloride under the conditions described in Sørbye et al or alternatively higher boiling solvents such as 1,2-dichloroethane, dioxane or acetonitrile maybe used to allow higher reaction temperatures and microwave conditions. The intermediate 2-((2R,4S)-2-(bis(4-fluorophenyl)methyl)tetrahydro-2H-pyran-4-yl)-2H-benzo[d][1,3,2] dithiazole 1,1,3,3-tetraoxide is solated and purified if necessary, then dissolved in a solvent such as DMF or DMSO and treated with an excess of sodium azide and then heated as required (including microwave conditions) to effect azide displacement of the sulfonyl diimide with inversion of confiruration as described in Sørbye et al. The intermediate (2R,4R)-4-azido-2-(bis(4-fluorophenyl)methyl)tetrahydro-2H-pyran is isolated and purified as required. There are many good methods to reduce the azide to and amine, on a small scale treatment with triphenylphosphine in THF-water may be convenient. Or on a larger scale catalytic hydrogenation with $H_2$ or transfer hydrogenation with ammonium formate or cyclohaxadiene may be used with commonly used catalysts such as palladium on carbon. The product of the reduction, (2R,4R)-2-(bis(4-fluorophenyl)methyl)tetrahydro-2H-pyran-4-amine, is isolated and purified as required. The amine is converted to the target compound, Example 18, by treatment with 4-trifluoromethoxybenzenesulfonyl chloride using the methods and purification conditions described above.

Alternate conditions may also be appropriate. A synthesis of Example 19, N-((2R,4R)-2-(10,11-dihydro-5H-dibenzo[a,d][7]annulen-5-yl)tetrahydro-2H-pyran-4-yl)-4-(trifluoromethoxy)benzenesulfonamide, using the steps in Said and Fiksdahl is shown in the scheme below.

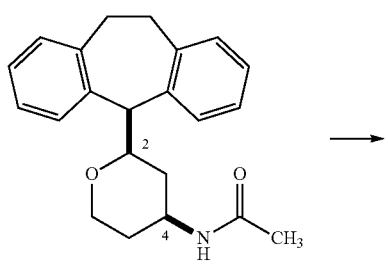

N-((2R,4S)-2-(10,11-dihydro-5H-dibenzo[a,d][7]annulen-5-yl)tetrahydro-2H-pyran-4-yl)acetamide

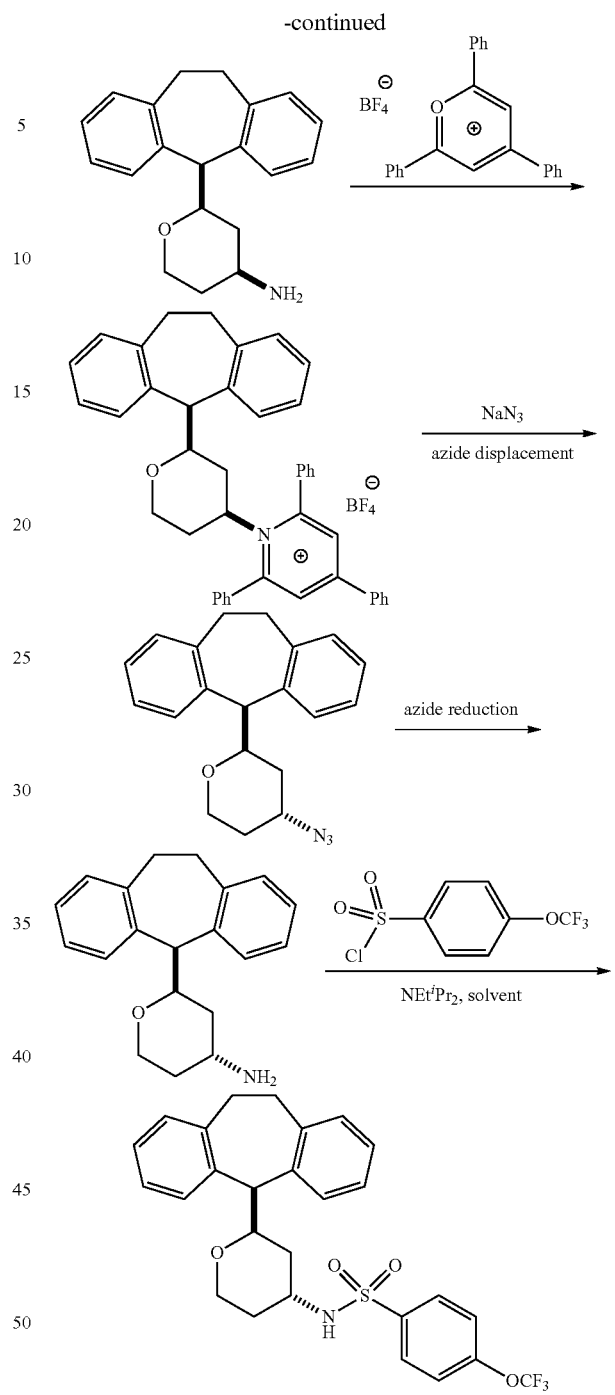

Example 19
N-((2R,4R)-2-(10,11-dihydro-5H-dibenzo[a,d][7]annulen-5-yl)tetrahydro-
2H-pyran-4-yl)-4-(trifluoromethoxy)benzenesulfonamide 2-(10,11-dihydro-5H-dibenzo[a,d][7]annulen-5-yl)tetrahydro-2H-pyran-4-amin e was prepared as described above and is treated with 2,4,6-triphenylpyrylium tetrafluoroborate in dichloromethane with h a base such as triethylamine or diisopropylethylamine and the mixture is stirred for 15 minutes to 1 hour. The mixture is treated with acetic acid and stirred for 6 to 24 hours to effect closure to the pyridinium intermediate which is isolated purified by flash chromatography, eluting with 0-5% methanol in dichloromethane. The intermediate pyridinium salt is dissolved in DMF then treated with an excess of sodium azide to effect conversion to the intermediate (2R,4R)-4-azido-2-(10,11-dihydro-5H-dibenzo[a,d][7]annulen-5-yl)tetrahydro-2H-pyran with inversion of stereochemistry. The azide is reduced as to the trans-amine and converted to the target compound, Example 19, as described elsewhere in the specification.

Compounds wherein Y=OH may be accessed by modification of the synthetic routes described above using a silyl-Prins (see Dobbs and Martinovic, Tetrahedron Letters 43 (2002) pages 7055-7057) approach to produce a dihydropyran which is subsequently functionalized to introduce the hydroxyl and sulfonamide moieties. Synthetic routes to Example 17 are presented in the scheme below.

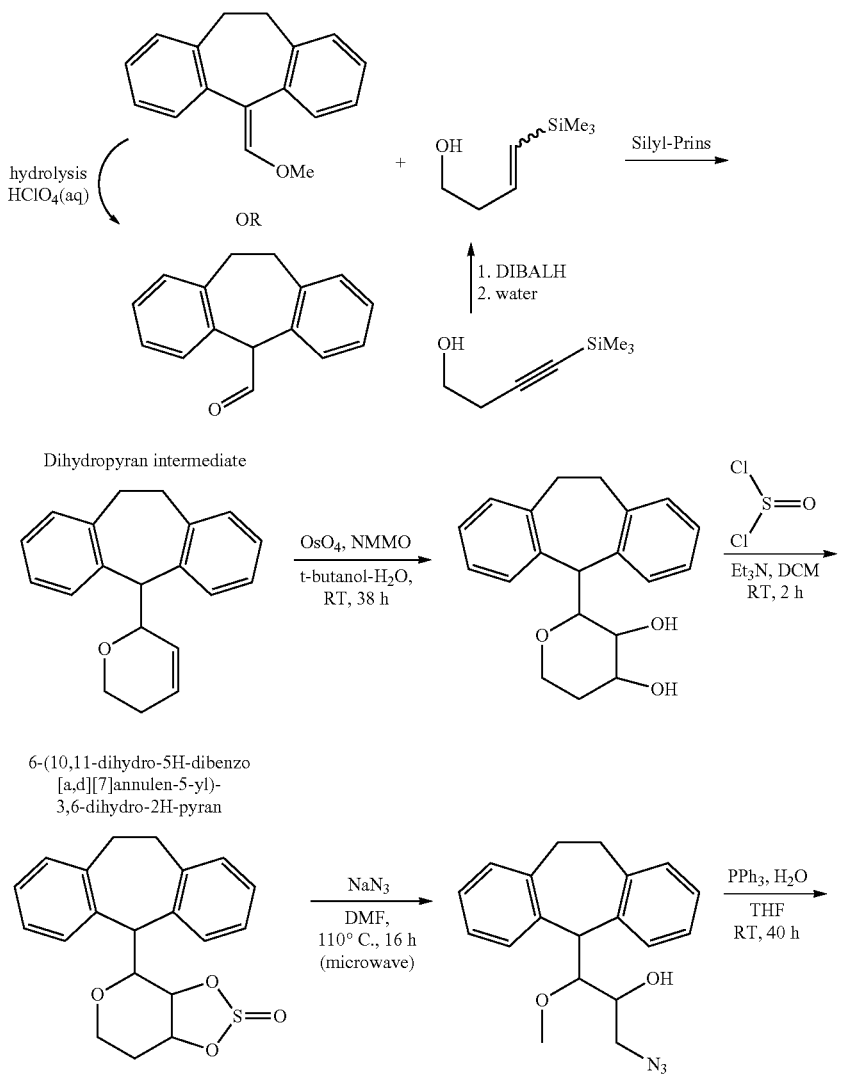

-continued

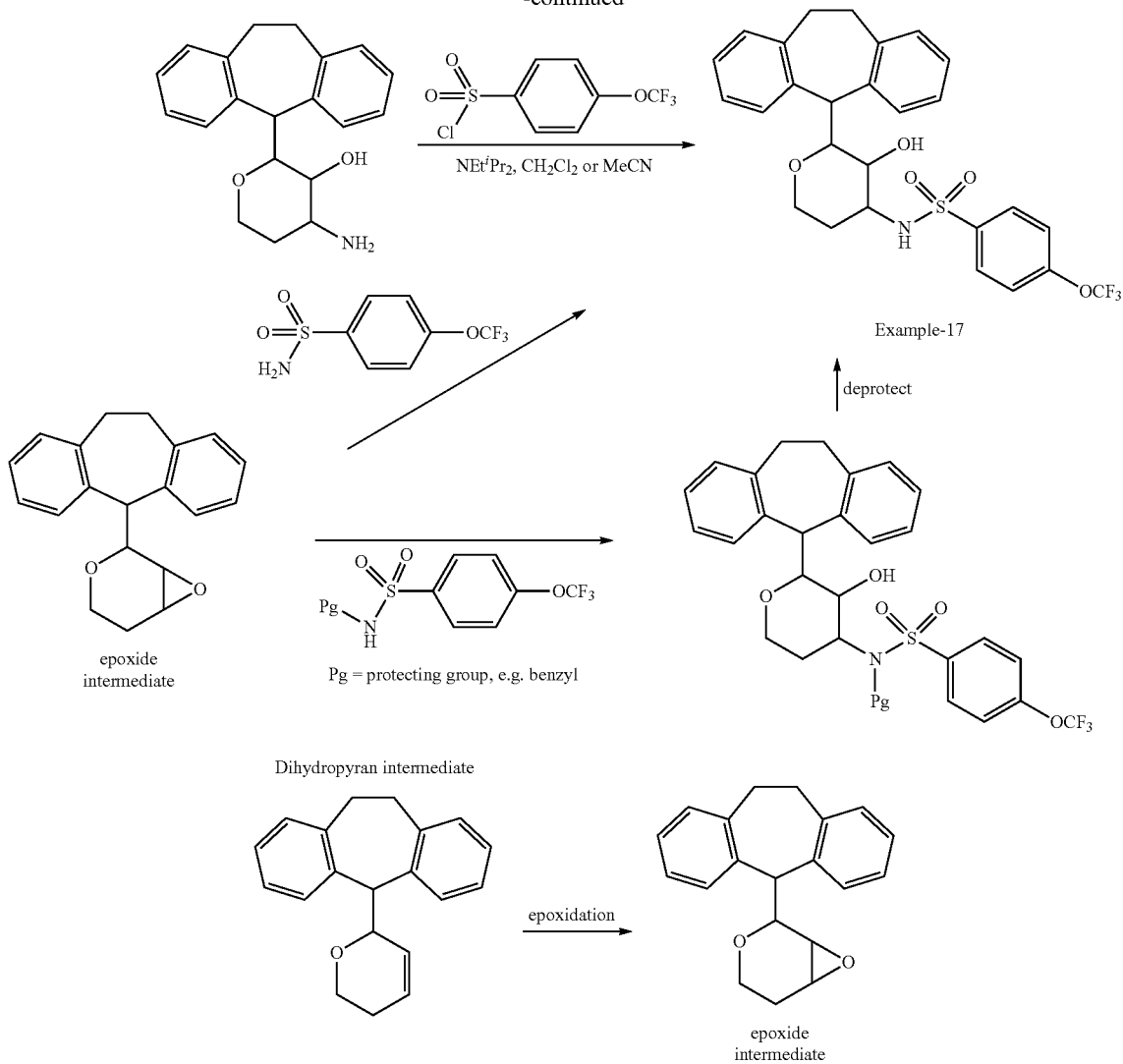

4-(trimethylsilyl) but-3-en-1-ol is a known compound, readily prepared by hydroalumination with DIBALH, then protonation with water, of commercially available 4-(trimethylsilyl) but-3-yn-1-ol. A silyl-Prins reaction reaction maybe run using literature conditions (e.g. See Dobbs and Martinovic or Chio et al, Tetrahedron 67 (2011) pages 5107-5124) with the aldehyde, 10,11-dihydro-5H-dibenzo[a,d][7]annulene-5-carbaldehyde, to give the key dihydropyran intermediate, 6-(10,11-dihydro-5H-dibenzo[a,d][7]annulen-5-yl)-3,6-dihydro-2H-pyran. 10,11-dihydro-5H-dibenzo[a,d][7]annulene-5-carbaldehyde is a known compound and it, and methods for the synthesis of aldehyde reagents useful for synthesis of compounds in the present invention, are disclosed in Hendricks et al, US Patent Application Publication US 2015/0072982. Alternatively the modified Prins conditions described here using 5-(methoxymethylene)-10,11-dihydro-5H-dibenzo[a,d][7]annulene as an aldehyde equivalent maybe employed.

The dihydropyran, 6-(10,11-dihydro-5H-dibenzo[a,d][7]annulen-5-yl)-3,6-dihydro-2H-pyran, is converted to Example 17 using the sequence of reactions shown in the scheme above. This sequence has been used successfully in multiple syntheses including on substituted dihydropyrans, see for example Ohlmeyer and Zaware, WO 2017/044567. Briefly the dihydropyran intermediate is dihydroxylated using osmium tetroxide with N-methylmorpholine-N-oxide as co-oxidant. The diol is converted to a cyclic sulfite using thionyl chloride. The cyclic sulfite is opened regiospecifically in the sense shown with azide using microwave heating. The azide is then reduced with triphenylphosphine in THF-water to give the primary amine. Treatment with an arylsulfonyl gives compounds of the present invention, and specifically Example 17 when 4-trifluoromethoxybenzenesulfonyl chloride is used.

Shorter routes to Example 17 may be envisaged: thus the dihydropyran may be epoxidized with mCPBA and the epoxide opened directly with 4-(trifluoromethoxy)benzenesulfonamide to give Example 17. Use of aryl sulfonamides to open epoxides has been described in Huang and O'Brien, SYNTHESIS 2006, No. 3, pp 425-0434. Briefly, the expoxide is dissolved in dioxane with 4-(trifluoromethoxy)benzenesulfonamide (1.2 equiv), a catalytic base (0.1 equiv) such as potassium or cesium carbonate and a phase transfer catalyst (0.1 equiv) such as benzyltriethylammonium chloride and the mixture is heated at between 100° and 200° C. for 1 hour to three days. Microwave heating maybe usefully employed to shorten reaction times and increase yields. Homogeneous conditions using protected aryl sulfonamides, such as N-benzyl-4-(trifluoromethoxy)benzenesulfonamide may also be used with bases such as potassium t-butoxide solution or potassium bis(trimethylsilyl)amide solution. The protecting group is then removed to give the target compounds. In the case of benzyl as protecting group catalytic reduction will be a suitable method to give the final compounds.

Example 20 may be prepared as shown in the scheme below.

Example 21 may be prepared as shown in the scheme below.

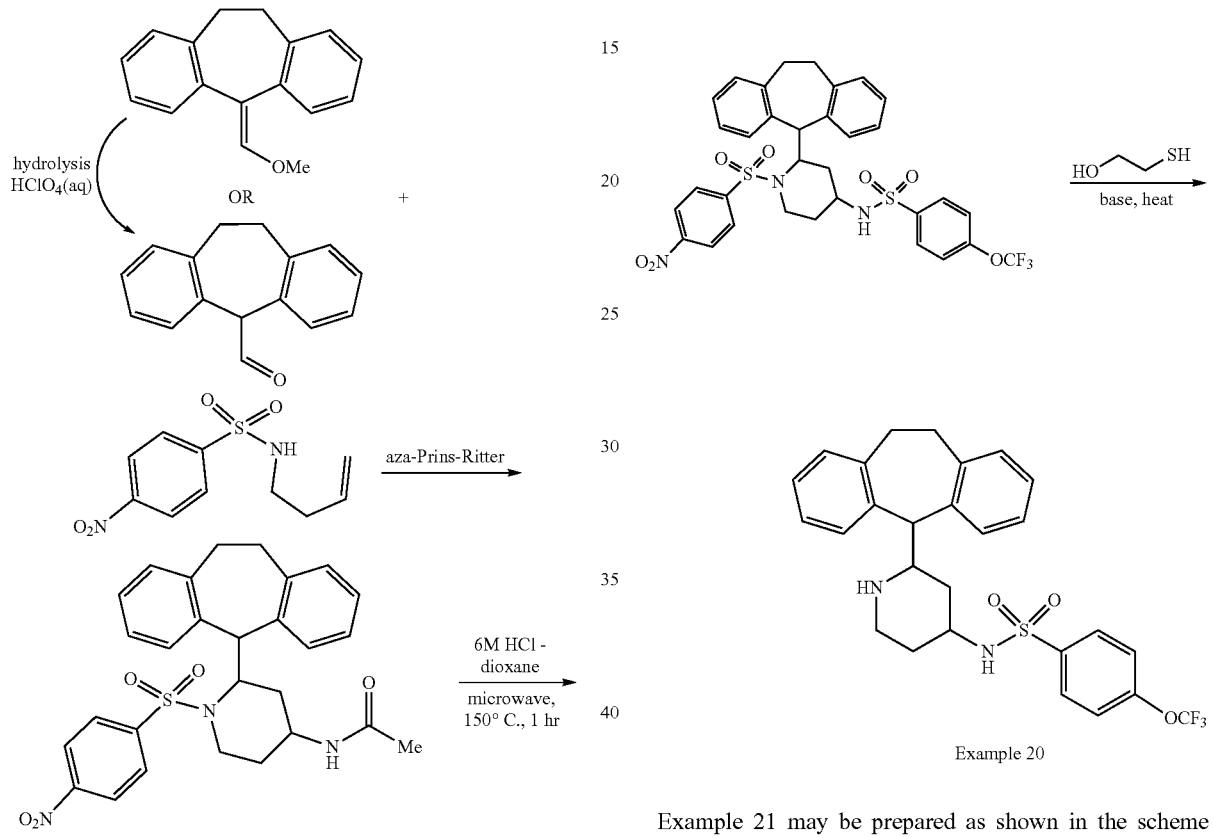

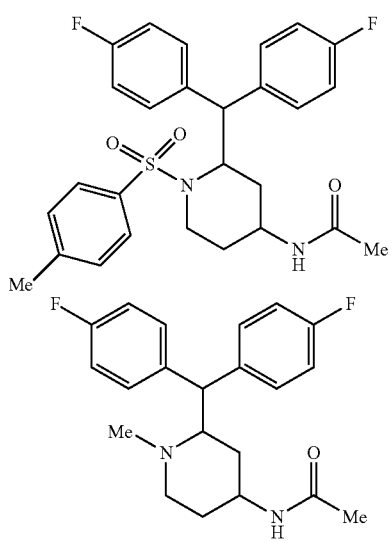
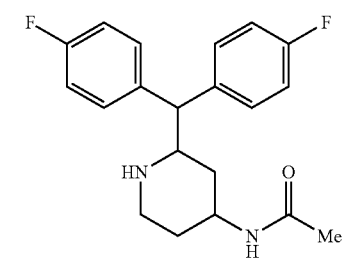
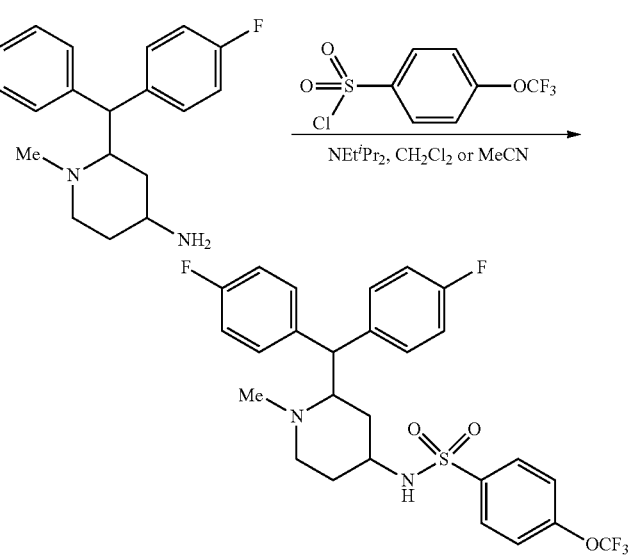

Example 21

Cancer Cell Viability Inhibition

D425 medulloblastoma cells were purchased from SigmaAldrich. D425 meduloblastoma cells were cultured in improved Dulbecco's modified Eagle's medium (DMEM) Richter's modification supplemented with 20% fetal bovine serum and 1% Penicillin-streptomycin. Incubation was performed at 37° C. and 5% $CO_2$.

D425 cells were seeded at 3000-3500 cells/90 ul growth medium per well on 96-well tissue culture plates. Cells were incubated overnight to allow them to recover. Next day cells were treated with tested compounds and incubated for 48 hours.

Cell Proliferation assays in triplicate were performed at each concentration. Compounds test range was 1-30 µM (0, 5, 10, 15, 20, 25, and 30). The compounds were dissolved in DMSO. A series of dilutions were made in 1% DMSO in growth medium so that the final concentration of DMSO is 0.1% in all of treatments.

After treatment, cells were allowed to equilibrate at room temperature for one hour. Cell proliferation was measured by Luminescence quantification using Promega CellTiter-Glo Luminescent Cell Viability Assay. To perform the assay, 90 ul of Celltiter-Glo substrate was added to each well, plates were shake for 2 minutes and allowed to equilibrate for 10 minutes at room temperature. Luminescence intensity was measured using the Spectramax i3x plate reader.

The Luminescence intensity data were analyzed using the computer software Graphpad Prism. In the absence of the compound, the luminescence intensity ($L_t$) in each data set was defined as 100% cell viability. The percent cell in the presence of each compound was calculated according to the following equation: % Cell=$L/L_t$, were L=the luminescence intensity in the presence of the compound.

The values of % cell versus a series of compound concentrations (0, 5, 10, 15, 20, 25, and 30 µM) were then plotted using Nonlinear regression analysis of Sigmoidal dose-response curve. $IC_{50}$ value was determined by the concentration causing a half-maximal percent activity.

$IC_{50}$ for example compounds, determined by the method above are given in the table below:

| Example | $IC_{50}$ for D425 cell growth (µM) | Sample Size |
| --- | --- | --- |
| 2 | 10.3 | N = 5 |
| 6 | 5.8 | N = 12 |
| 7 | 5.3 | N = 7 |
| 8 | 4.4 | N = 7 |
| 9 | 6.6 | N = 8 |
| 10 | 6.0 | N = 7 |
| 11 | 9.5 | N = 7 |
| 12 | 6.2 | N = 4 |
| 13 | 5.1 | N = 4 |
| 14 | ~50% @ 30 µM | N = 2 |
| 15 | 11.2 | N = 10 |
| 16 | 7.3 | N = 10 |

A172 glioblastoma cells were cultured in Dulbecco's modified Eagle's medium (DMEM) supplemented with 10% fetal bovine serum and 1% Penicillin-streptomycin. Incubation was performed at 37° C. and 5% $CO_2$.

A172 cells were seeded at 3000-3500 cells/90 µL growth medium per well on 96-well tissue culture plates. Cells were incubated overnight to allow them to recover and reattach. Next day cells were treated with tested compounds and incubated for 48-72 hours.

Cell Proliferation assays in triplicate were performed at each concentration. Compounds test range was 1-30 UM (0, 5, 10, 15, 20, 25, and 30). The compounds were dissolved in DMSO. A series of dilutions were made in 1% DMSO in growth medium so that the final concentration of DMSO is 0.1% in all of treatments.

After treatment, cells were allowed to equilibrate at room temperature for 1/2 to one hour. Cell proliferation was measured by Luminescence quantification using Promega CellTiter-Glo Luminescent Cell Viability Assay. To perform the assay, 100 µl of Celltiter-Glo substrate was added to each well, plates were shake for 2 minutes and allowed to equilibrate for 10 minutes at room temperature. Luminescence intensity was measured using the Spectramax i3× plate reader.

The Luminescence intensity data were analyzed using the computer software Graphpad Prism. In the absence of the compound, the luminescence intensity ($L_t$) in each data set was defined as 100% cell viability. The percent cell in the presence of each compound was calculated according to the following equation: % Cell=$L/L_t$, were L=the luminescence intensity in the presence of the compound.

The values of % cell versus a series of compound concentrations (0, 5, 10, 15, 20, 25, and 30 µM) were then plotted using Nonlinear regression analysis of Sigmoidal dose-response curve. $IC_{50}$ value was determined by the concentration causing a half-maximal percent activity.

$IC_{50}$ for example compounds, determined by the method above are given in the table below:

| Example | $IC_{50}$ for A172 cell growth (µM) | Sample Size |
|---|---|---|
| 2 | 14.7 | N = 13 |
| 6 | 9.9 | N = 9 |

Cellular in vitro phosphatase activation assay was performed using the method of Theendakara et al, Molecular and Cellular Neuroscience, 83 (2017), pages 83-91 which is described below:

A172 glioblastoma cells were cultured in Dulbecco's modified Eagle's medium (DMEM) supplemented with 10% fetal bovine serum and 1% Penicillin-streptomycin. Incubation was performed at 37° C. and 5% $CO_2$.

A172 cells were seeded at 5×105 cells/2.5 ml growth medium (without antibiotics) per well on 6-well tissue culture plates. Cells were incubated overnight to allow them to recover and reattach. Next day, when the cells were at about 75% confluence, transfection was performed with 2-2.5 ug of ApoE cDNA following the manufacture's protocol: Lipofectamine 2000 from Invitrogen (Cat #12566014) or Neuroporter transfection kit form Sigma (Cat #NPT01). After 24 hrs. the cells were treated with 5 µM test compounds and incubated for an additional 24 hours.

After 24 hrs, cells were washed twice with imidazole buffer and lysed using NP-40 Lysis buffer. The lysate was cleared up from small molecules including endogenous phosphates using desalting spin columns. Malachite Green Phosphatase assays were performed in triplicate using 5 ug of total protein per assay and following the manufacture's protocol (Sigma cat #MAK307). The amount of phosphate release in the assay was determined by measuring absorbance at 620 nm using the Spectramax i3x plate reader.

The absorbance intensity data were analyzed using the computer software Graphpad Prism. The phosphate concentration for each sample was determined from the standard curve using phosphate standard concentrations. In order to compare samples, the first set (column A) were there was no transfection performed and no compound added, was designated a baseline; the absorbance measurement in this column was set as 100% phosphatase activity.

Phosphatase activation, determined by the method above are given in the table below:

| Example | % increase from ApoE transfected cell at 5 µM test compound concentration | Sample Size |
|---|---|---|
| 2 | 7.2 | N = 5 |
| 6 | 6.8 | N = 3 |

Bleomycin exposure reproducibly induces lung fibrosis in mice and bleomycin induced lung fibrosis is commonly used as an animal model to assess the efficacy of experimental therapeutics for idiopathic pulmonary fibrosis, see for example Tashiro et al, "Exploring Animal Models that Resemble Idiopathic Pulmonary Fibrosis", Front. Med. 4:118 (2017). doi: 10.3389/fmed.2017.0018. Herein presented are data on the efficacy of Example 6 (Ex-6) in cellular models of lung fibrosis and in a mouse bleoycin induced lung fibrosis model, see FIGS. 1 through 8.

In brief, the animal model consisted of bleomycin administration using a combined protocol previously described by Wyman et al (Wyman, A. E., et al., "Sirtuin 7 is decreased in pulmonary fibrosis and regulates the fibrotic phenotype of lung fibroblasts". Am J Physiol Lung Cell Mol Physiol, 2017. 312 (6): p. L945-L958.) and Geraghty et al (Geraghty, P. and Foronjy, R. 'Protein Transfection of Mouse Lung'. J Vis Exp, (75), e50080 2013 May 15). After sedation was achieved (87.5 mg/kg Ketamine/12.5 mg/kg xylazine), mice were suspended from their upper incisors (see Geraghty et al. for visual publication of intratracheal delivery). The oropharynx was opened so that a catheter/Penn Century MicroSprayer (Penn-Century, Wyndmoor, Philadelphia, PA) can be introduced into the trachea. The vocal cords and trachea were visualized by placing a light source against the trachea of the mouse. The MicroSprayer was inserted intratracheally, and the bleomycin solution (0.075 U/mouse) was instilled in 50 µL of sterile PBS. The MicroSprayer creates a mist rather than droplets, for better tissue distribution and reduces the risk of animal suffocation. Control mice were instilled with 50 µl of sterile PBS with no additives. This intratracheal maneuvering and delivery took about 30 seconds to complete. Animals were allowed to recover from sedation. Water was supplemented with the compound/drug beginning either before, 7 or 20 days after bleomycin treatment.

Compounds of the present invention activate PP2A responses in fibroblasts from healthy subjects. Lung fibroblasts from 6 subjects were stimulated with 1 micromolar of example compounds for 24 hours. FIG. 1 presents data for Example 6 (Ex-6), N-(2-(2,8-difluoro-10,11-dihydro-5H-dibenzo[a,d][7]annulen-5-yl)tetrahydro-2H-pyran-4-yl)-4-(trifluoromethoxy)benzenesulfonamide, in suppression of pro-fibrotic gene expression.

Figure 2:
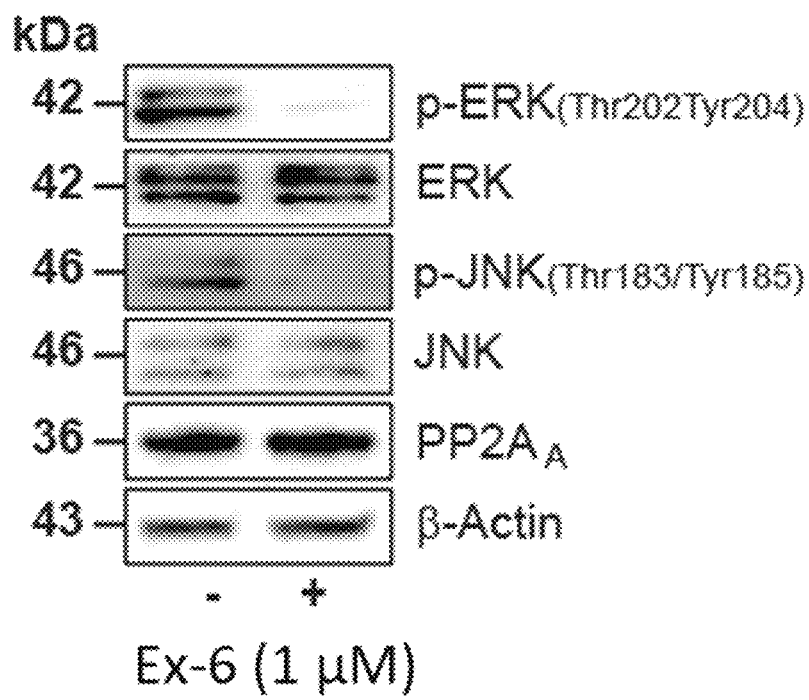
FIG. 2 shows immunoblots of certain proteins of lung fibroblasts from healthy subjects after exposure to 1 μM Example 6 for 24 hours.
Figure 3:
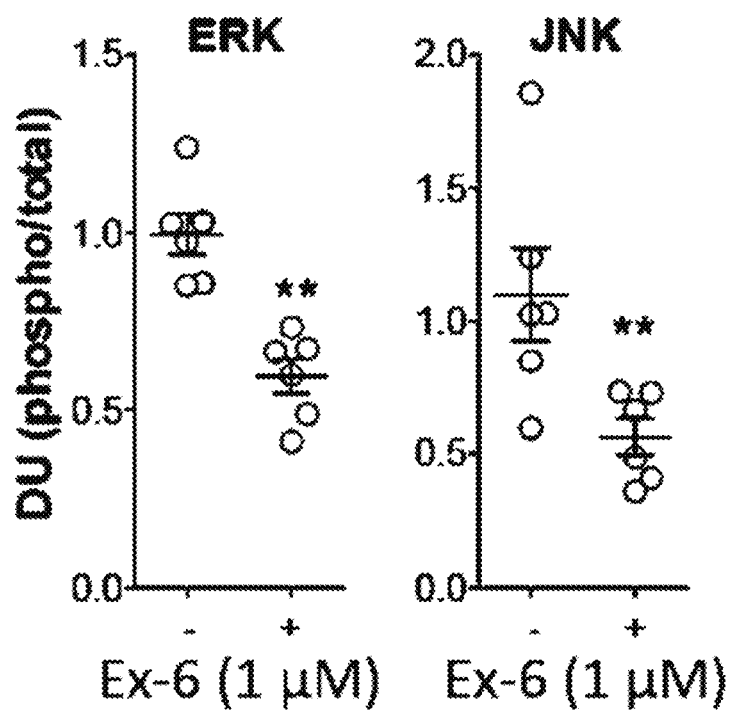
FIG. 3 shows densitometry analysis in terms of relative densitometry units (DU) of phosphorylated and unphosphorylated forms of ERK and JNK in lung fibroblasts from healthy subjects after exposure to 1 μM Example 6 for 24 hours. Each dot represents cells from a different subject. Student t-tests or 2-way ANOVA were performed and a p-value >0.05 was denoted as ** when comparing between phosphorylated and unphosphorylated groups.

Compounds of the present invention reactivate PP2A responses in fibroblasts from healthy and IPF subjects. FIGS. 2 and 3 present data from lung fibroblasts from 6 healthy nonsmokers (NS) and 6 IPF subjects respectively on treatment with Example 6 (Ex-6), N-(2-(2,8-difluoro-10,11- dihydro-5H-dibenzo[a,d][7]annulen-5-yl)tetrahydro-2H-pyran-4-yl)-4-(trifluoromethoxy)benzenesulfonamide, showing reduced ERK and JNK signaling.

Figure 4:
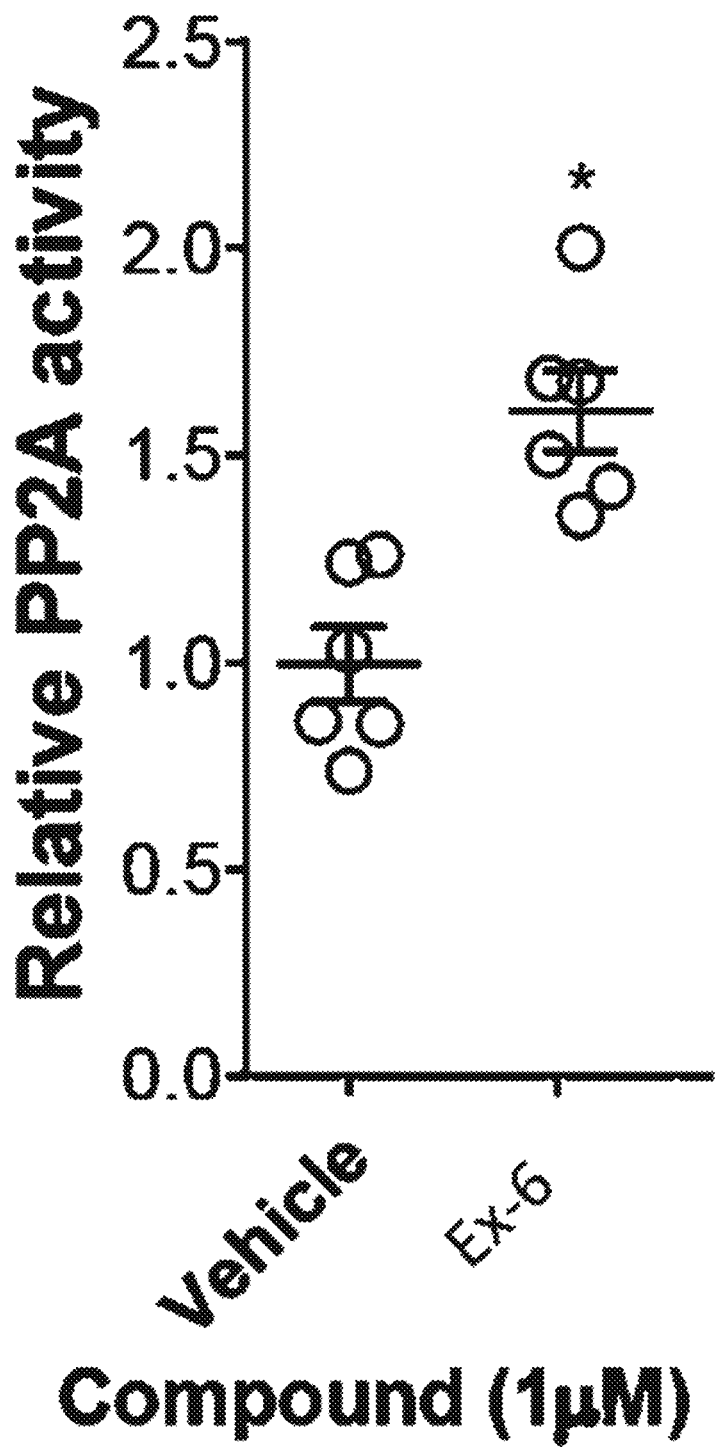
FIG. 4 shows reactivation of PP2A responses in lung fibroblasts from healthy subjects after exposure to 1 μM Example 6 for 24 hours. Each dot represents cells from a different subject. Student t-tests or 2-way ANOVA were performed and a p-value >0.05 was denoted as * when comparing to the vehicle treated groups.
Figure 5:
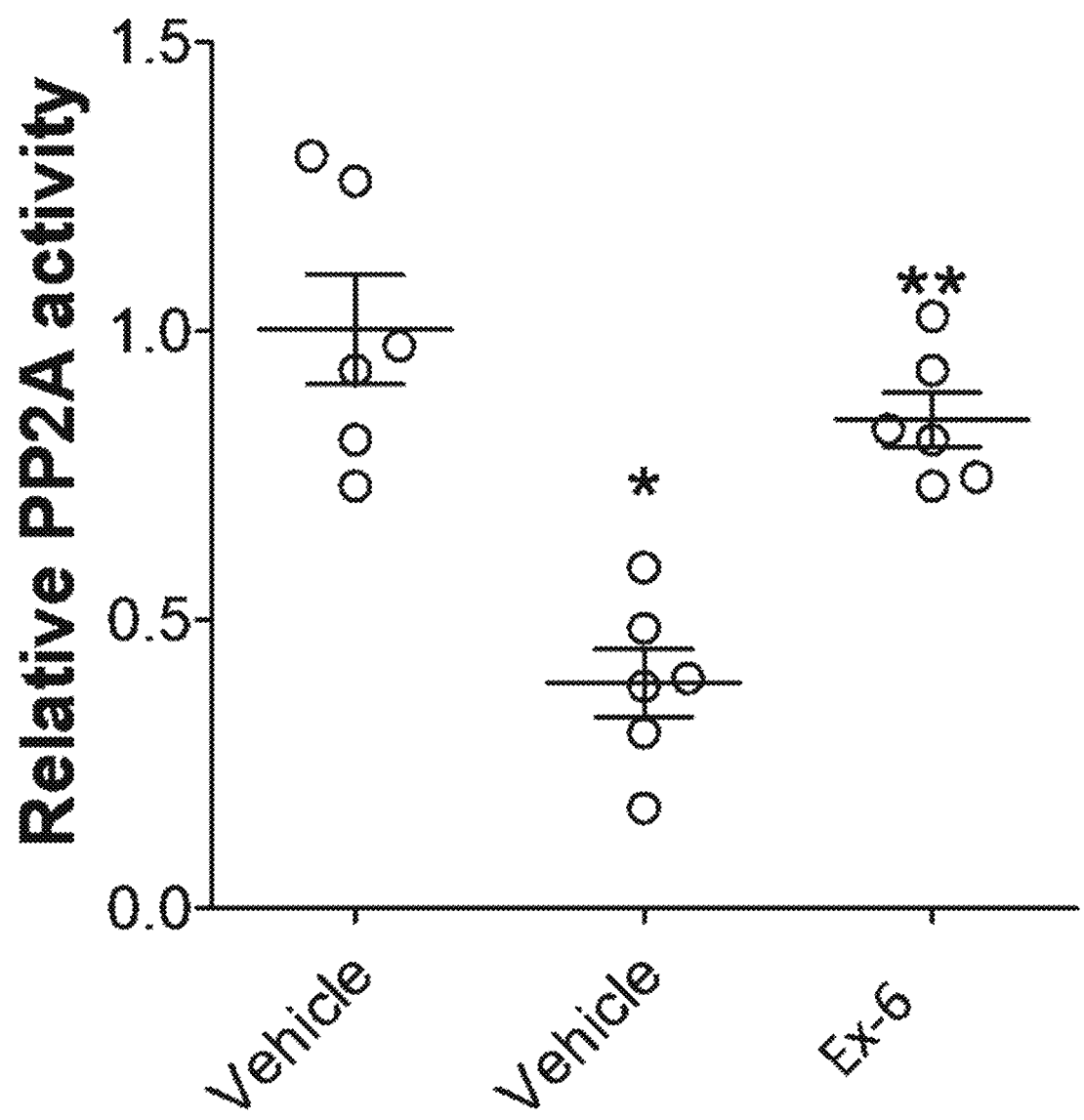
FIG. 5 shows decrease of PP2A responses in lung fibroblasts from idiopathic pulmonary fibrosis (IPF) following exposure to vehicle for 24 hours (middle plot), and reactivation of PP2A responses in lung fibroblasts from idiopathic pulmonary fibrosis (IPF) following exposure to 1 μM Example 6 for 24 hours (right plot) as compared to lung fibroblasts from healthy non-smokers (NS) exposed to vehicle for 24 hours (left plot). Each dot represents cells from a different subject. Student t-tests were performed and a p-value >0.05 was denoted as * when comparing non-smoker (NS) to IPF vehicle groups or ** when comparing vehicle IPF to compound IPF groups. Left plot: cell source—healthy non-smoker; Middle plot: cell source—IPF; Right: cell source—IPF.

FIG. 4 shows activation of PP2A responses in fibroblasts from 6 healthy nonsmokers (NS) versus vehicle control. FIG. 5 shows PP2A activity in lung fibroblasts from 6 IPF subjects, center group. IPF fibroblasts were exposed to v or 1 micromolar of the ATUX compounds media for 24 hours and increase in PP2A activity is shown in right hand group. PP2A activity in vehicle treated fibroblasts from healthy nonsmokers is shown for comparison in the left hand group.

Figure 6:
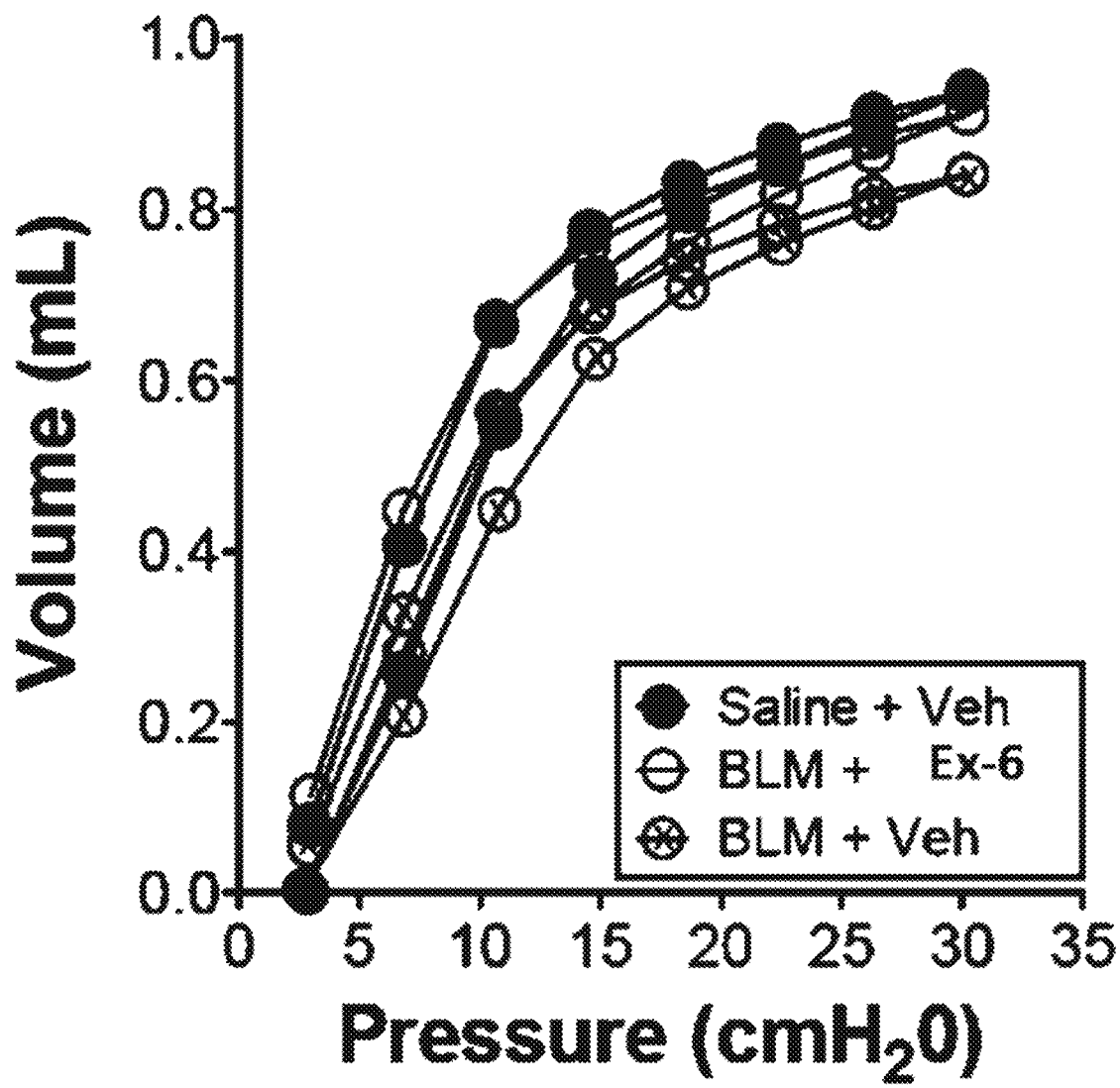
FIG. 6 shows differences in pressure volume loops of 3-month-old $C_{57}BL/6J$ mice following administration of vehicle or Example 6 after tracheal instillation of saline or bleomycin, indicating prevention of bleomycin-induced pulmonary fibrosis in mice by administration of Example 6.

In an in vivo fibrosis model, three-week Example 6 (Ex-6) administration resulted in no obvious toxicity in mice, with external appearance, behavior, and body weight similar to vehicle groups. Ex-6 was dosed at 5 mg/kg in the bleomycin induced fibrosis. In vivo data is shown in FIG. 3: C57BL/6J mice were orally administered 5 mg/kg Ex-6 once daily, beginning on the same day as bleomycin (BLM) treatment to test if activation of PP2A could prevent establishment of idiopathic pulmonary fibrosis (IPF). C57BL/6J mice exhibit several IPF associated changes following bleomycin instillation (FIG. 6) which were prevented by early treatment with Ex-6. Ex-6 compound treatment prevented bleomycin-induced PV loop changes, compliance, tissue elastance and forced vital capacity (FVC) (FIG. 6). Differences were shown in compliance, tissue elastance, and forced vital capacity of 3-month-old C57BL/6J mice following administration of vehicle or Example 6 after tracheal instillation of saline or bleomycin, indicating prevention of bleomycin-induced pulmonary fibrosis in mice by administration of Example 6. Graphs were represented as mean±S.E.M, where n=7 animals per group. P values, shown when comparing both treatments connected by a line, were determined by Student t-tests. Therefore, oral administration of Ex-6 triggers robust responses in the lungs of bleomycin-exposed animals.

Figure 7:
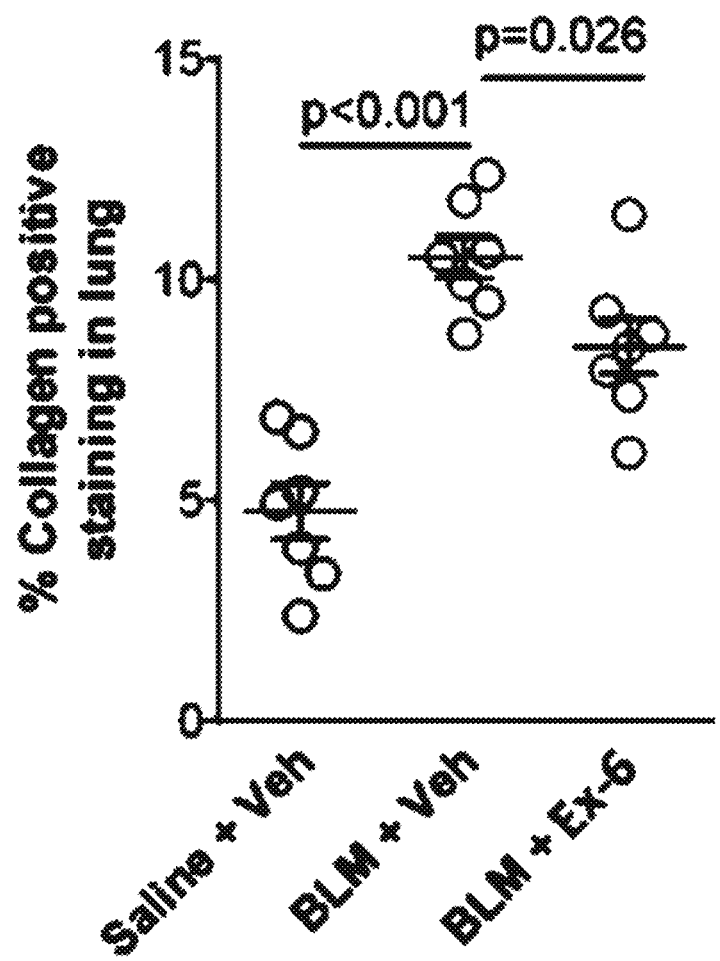
FIG. 7 shows differences in collagen positive staining in lungs of 3-month-old C57BL/6J mice following administration of vehicle or Example 6 after tracheal instillation of saline or bleomycin, indicating prevention of bleomycin-induced pulmonary fibrosis in mice by administration of Example 6.

Histology was performed to examine collagen deposition within the lungs of treated animals versus controls. FIG. 7 presents data on Ex-6 treatment showing it attenuates collagen deposition with reduced trichrome positive lung tissues observed in treated mice versus vehicle control.

Figure 8:
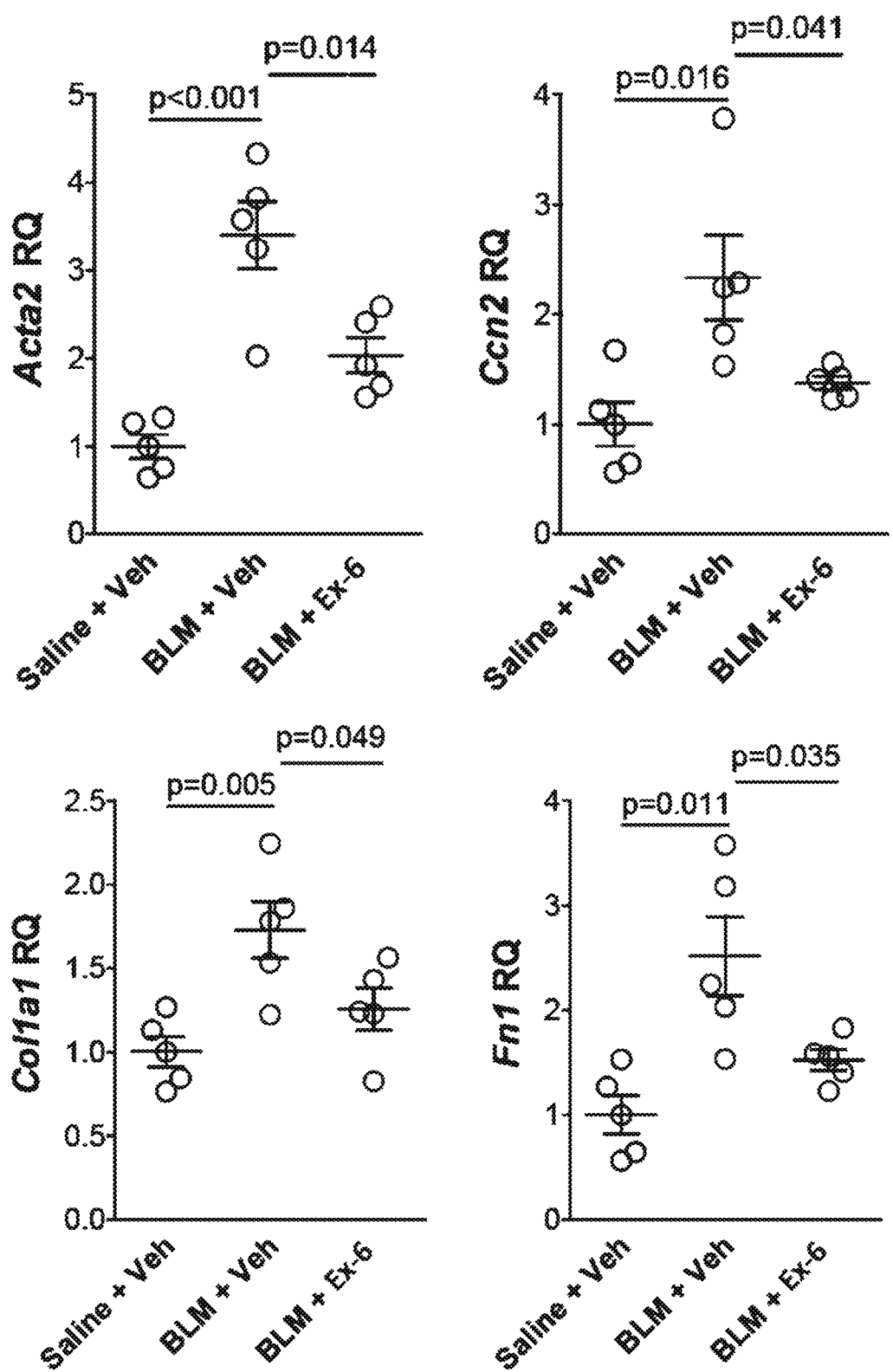
FIG. 8 shows differences in expression of fibrosis markers Acta2, Ccn2, Col1a1, and Fn1 from lung tissue of 3-month-old $C_{57}BL/6J$ mice following administration of vehicle or Example 6 after tracheal instillation of saline or bleomycin, indicating prevention of bleomycin-induced pulmonary fibrosis in mice by administration of Example 6.

FIG. 8 shows data on expression of fibrosis related genes from lung tissue of compound treated animals versus vehicle control. Thus Ex-6 suppressed bleomycin-induction of smooth muscle actin alpha 2 (Acta2), cellular communication network factor 2 (Ccn2), type I collagen called the pro-α1 (I) chain (Col1a1), and fibronectin (FN1).

Data shown in FIGS. 1-8 demonstrates that a PP2A activation approach using compounds of the present invention is applicable to their use as pulmonary fibrosis therapeutics.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

Various embodiments of the invention can be described in the text below:

[1]. A compound of formula (I):

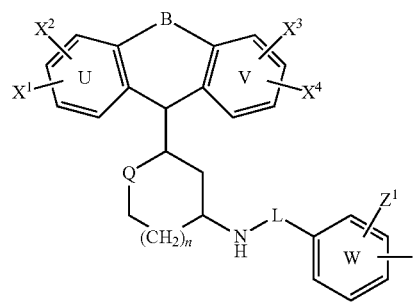

I wherein:
B is absent or is selected from a direct bond, —$CH_2CH_2$—, —CH=CH—, O, S, or —$NR^B$—C(O)—;
Q is selected from —O— or $NR^Q$;
L is a group selected from:

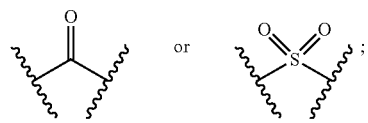

U, V and W are independently carbocyclic aromatic or heteroaromatic rings;
n=0 or 1;
$X^1$, $X^2$, $X^3$ and $X^4$ are independently selected in each instance from hydrogen, halogen, nitro, cyano, ($C_1$-$C_6$) alkyl optionally-OH, ($C_1$-$C_6$)haloalkyl, ($C_1$-$C_6$)haloalkoxy,
($C_1$-$C_6$)haloalkylthio, —$NR^1R^2$, —$OR^1$, —$C(O)R^1$, —$OC(O)R^1$, —$C(O)NR^1R^2$, —$C(O)OR^1$, —$SR^1$, —$SO_2R^1$, and —$SO^2NR^1R^2$;
$Z^1$ and $Z^2$ are independently selected in each instance from hydrogen, halogen, nitro, cyano, azido, ($C_1$-$C_6$) alkyl, ($C_1$-$C_6$)haloalkyl, ($C_1$-$C_6$)haloalkoxy, ($C_1$-$C_6$) haloalkylthio, —$NR^1R^2$, —$NR^1C(O)R^2$, —$NR^1C(O)$ $OR^3$, —$OR^1$, —$C(O)R^1$, —$OC(O)R^1$, —$C(O) NR^1R^2$, —$C(O)OR^1$, —$SR^1$, —$SO^2R^1$, —$SO_2NR^1R^2$, and five membered heterocyclyl;
$R^1$, $R^2$ and $R^3$ are, independently, lower alkyl
$R^B$ is selected from H, or lower alkyl
$R^Q$ is selected from H, optionally substituted lower alkyl, aryl

[2]. A compound according to [1] above, or according to other embodiments of the invention, of formula IIa:

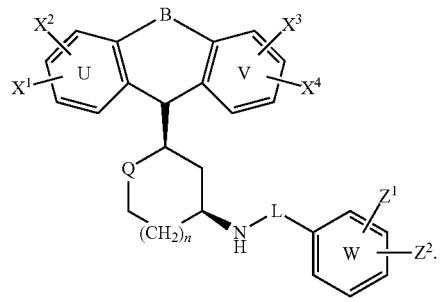

[3]. A compound according to [1] above, or according to other embodiments of the invention, of formula IIb:

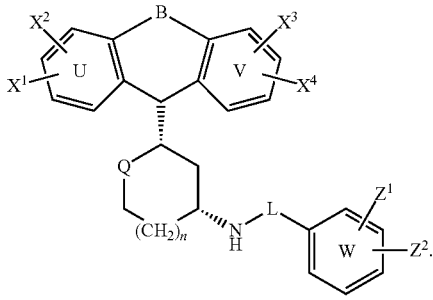

[4]. A compound according to any of [1] through [3] above, or according to other embodiments of the invention, wherein B is absent.

[5]. A compound according to any of [1] through [3] above, or according to other embodiments of the invention, wherein B is —(CH$_2$)$_2$—.

[6]. A compound according to any of [1] through [3] above, or according to other embodiments of the invention, wherein B is a direct bond.

[7]. A compound according to any of [1] through [3] above, or according to other embodiments of the invention, wherein B is —S—.

[8]. A compound according to any of [1] through [6] above, or according to other embodiments of the invention, wherein Q is —O— with n=1.

[9]. A compound according to any of [1] through [6] above, or according to other embodiments of the invention, wherein Q is —O— with n=0.

[10]. A compound according to any of [1] through [6] above, or according to other embodiments of the invention, wherein Q is —NR$^Q$— with n=1.

[11]. A compound according to any of [1] through [6] above, or according to other embodiments of the invention, wherein one of U or V is carbocyclic.

[12]. A compound according to any of [1] through [6] above, or according to other embodiments of the invention, wherein both of U and V are carbocyclic.

[13]. A compound according to any of [1] through above, or according to other embodiments of the invention, wherein L is

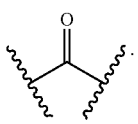 [SMILES: *C(*)=O]

[14]. A compound according to any of [1] through [12] above, or according to other embodiments of the invention, wherein L is

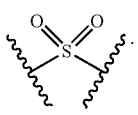

[15]. A compound according to any of [1] through [12] above, or according to other embodiments of the invention, wherein W is carbocyclic.

[16]. A compound according to any of [1] through [12] above, or according to other embodiments of the invention, wherein W is heteroaromatic.

[17]. A compound according to any of [1] through [16] above, or according to other embodiments of the invention, wherein $X^1$, $X^2$, $X^3$, and $X^4$ are independently selected in each instance from hydrogen, halogen, nitro, cyano, (C$_1$-C$_6$)alkyl optionally substituted with —OH, (C$_1$-C$_6$)haloalkyl, (C$_1$-C$_6$)haloalkoxy, (C$_1$-C$_6$)haloalkylthio, —NR$^1$R$^2$, —OR$^1$, —C(O)R$^1$, —OC(O)R$^1$, —C(O)NR$^1$R$^2$, —C(O)OR$^1$, —SR$^1$, —SO$_2$R$^1$, and —SO$^2$NR$^1$R$^2$.

[18]. A compound according to any of [1] through [17] above, or according to other embodiments of the invention, wherein $X^2$ and $X^4$ are each hydrogen.

[19]. A compound according to any of [1] through [18] above, or according to other embodiments of the invention, wherein $X^1$ and $X^3$ are each chosen independently from hydrogen, halogen, nitro, cyano, (C$_1$-C$_6$)alkyl optionally substituted with —OH, (C$_1$-C$_6$)haloalkyl, (C$_1$-C$_6$)haloalkoxy, (C$_1$-C$_6$)haloalkylthio, —NR$^1$R$^2$, —OR$^1$, —C(O)R$^1$, —OC(O)R$^1$, —C(O)NR$^1$R$^2$, —C(O)OR$^1$, —SR$^1$, —SO$_2$R$^1$, and —SO$^2$NR$^1$R$^2$.

[20]. A compound according to any of [1] through [19] above, or according to other embodiments of the invention, wherein $X^1$ and $X^3$ are each chosen independently from —H, —F, —Cl, —CF$_3$, —OMe, or —OCF3.

[22]. A compound according to any of [1] through [20] above, or according to other embodiments of the invention, wherein all of $X^1$, $X^2$, $X^3$ and $X^4$ are each hydrogen.

[23]. A compound according to any of [1] through [22] above, or according to other embodiments of the invention, wherein $Z^1$ and $Z^2$ are independently selected in each instance from hydrogen, halogen, nitro, cyano, azido, (C$_1$-C$_6$)alkyl, (C$_1$-C$_6$)haloalkyl, (C$_1$-C$_6$)haloalkoxy, (C$_1$-C$_6$)haloalkylthio, —NR$^1$R$^2$, —NR$^1$C(O)R$^2$, —NR$^1$C(O)OR$^6$, —OR$^1$, —C(O)R$^1$, —OC(O)R$^1$, —C(O)NR$^1$R$^2$, —C(O)OR$^1$, —SR$^1$, —SO$^2$R$^1$, —SO$_2$NR$^1$R$^2$ and five membered hetercyclyl.

[24]. A compound according to any of [1] through [23] above, or according to other embodiments of the invention, wherein $Z^1$ and $Z^2$ are independently selected in each instance from hydrogen, halogen, halo (C$_1$-C$_6$) alkyl, (C$_1$-C$_6$) alkoxy, and halo (C$_1$-C$_6$) alkoxy.

[25]. A compound according to any of [1] through [24] above, or according to other embodiments of the invention, wherein $Z^1$ is hydrogen.

[26]. A compound according to any of [1] through [25] above, or according to other embodiments of the invention, wherein $Z^2$ is chosen from hydrogen, halogen, and (C$_1$-C$_6$)haloalkoxy.

[27]. A compound according to any of [1] through [26] above, or according to other embodiments of the invention, wherein $Z^2$ is chosen from hydrogen, F, Cl, CF$_3$, and trifluoromethoxy.

[28]. A compound according to any of [1] through [27] above, or according to other embodiments of the invention, wherein $Z^2$ is trifluoromethoxy.

[29]. A compound according to any of [1] through [28] above, or according to other embodiments of the invention, wherein one of $Z^1$ and $Z^2$ is para to the sulfonyl amide.

[30]. A compound according to any of [1] through [29] above, or according to other embodiments of the invention, wherein $Z^1$ is hydrogen $Z^2$ is para to the sulfonyl amide.

[31]. A pharmaceutical composition comprising a pharmaceutically acceptable carrier and a compound of any of [1] to [30] above, or according to other embodiments of the invention.

[32]. A method for treating a disease in a patient chosen from:
(a) cancer
(b) diabetes
(c) autoimmune disease, such as rheumatoid arthritis or multiple sclerosis
(d) age onset proteotoxic disease, particularly neurodegenerative disease
(e) mood disorder
(f) acne vulgaris
(g) solid organ transplant rejection (graft vs. host disease)
(h) pulmonary disease, such as COPD or pulmonary fibrosis
(i) cardiac hypertrophy and heart failure
(j) viral or parasitic infection and
(k) inflammatory conditions, such as asthma;
the method comprising administering to the patient a therapeutically effective amount of
a compound of any of [1] to [30] above, or according to other embodiments of the invention.

[33]. A method for treating a disease in a patient chosen from:
(a) cancer 72
(b) diabetes
(c) autoimmune disease, such as rheumatoid arthritis or multiple sclerosis
(d) age onset proteotoxic disease, particularly neurodegenerative disease
(e) mood disorder
(f) acne vulgaris
(g) solid organ transplant rejection (graft vs. host disease)
(h) pulmonary disease, such as COPD or pulmonary fibrosis
(i) cardiac hypertrophy and heart failure
(j) viral or parasitic infection and
(k) inflammatory conditions, such as asthma;
the method comprising administering to the patient a therapeutically effective amount of
a pharmaceutical composition of [31] above, or according to other embodiments of the invention.

[34]. The method of [32] or [33] above, or according to other embodiments of the invention, wherein said cancer is selected from the group consisting of: ovarian, endometrial, pancreatic, renal cell, breast, prostate, lung, hepatocellular carcinoma, glioma, leukemia, lymphoma, colorectal cancers, and sarcomas.

[35]. The method of [32] or [33] above, or according to other embodiments of the invention, for treating cancer, wherein said cancer is chemotherapy resistant cancer.

[37]. The method of any of [33], [33], [34], or [35] above, or according to other embodiments of the invention, wherein the method further comprises administering one or more additional cancer chemotherapeutic agents.

[36]. The method of [31] above, or according to other embodiments of the invention, for treating an age onset proteotoxic disease, particularly neurodegenerative disease, such as Alzheimer's disease, Parkinson's disease, Huntington's disease, and amyotrophic lateral sclerosis.

[39]. The method of [31] above, or according to other embodiments of the invention, for treating a pulmonary disease.

[40]. The method of [31] above, or according to other embodiments of the invention, wherein the pulmonary disease is COPD, asthma or pulmonary fibrosis.

[41]. The method of [31] above, or according to other embodiments of the invention, for treating an inflammatory or autoimmune disease.

[42]. The method of [31] above, or according to other embodiments of the invention, wherein the inflammatory or autoimmune disease is multiple sclerosis.

[43]. A method for restoring sensitivity to one or more chemotherapeutic agents in the treatment of cancer, the method comprising administering an effective amount of a compound of any of [1] to [30] above, or according to other embodiments of the invention.

[44]. A method for restoring sensitivity to one or more chemotherapeutic agents in the treatment of cancer, the method comprising administering an effective amount of a pharmaceutical composition of [31] above, or according to other embodiments of the invention.

[45]. A method for treating a disease or disorder in a patient where the disease or disorder involves the dysregulation of the PI3K-AKT-FOXO signaling pathway, the method comprising administering to the patient a therapeutically effective amount of a compound of any of [1] to [30] above, or according to other embodiments of the invention.

[46]. A method for treating a disease or disorder in a patient where the disease or disorder involves the dysregulation of a Myc dependent signaling pathway, the method comprising administering to the patient a therapeutically effective amount of a compound of any of [1] to [30] above, or according to other embodiments of the invention.

[47]. A method for treating a metabolic or neurological disease or disorder in a patient wherein the disease or disorder involves the dysregulation of the mTOR-PP2A signaling axis, the method comprising administering to the patient a therapeutically effective amount of a compound of any of [1] to [30] above, or according to other embodiments of the invention.

[48]. A method for treating a disease or disorder in a patient where the disease or disorder involves the dysregulation of the PI3K-AKT-FOXO signaling pathway, the method comprising administering to the patient a therapeutically effective amount of a pharmaceutical composition of [31] above, or according to other embodiments of the invention.

[49]. A method for treating a disease or disorder in a patient where the disease or disorder involves the dysregulation of a Myc dependent signaling pathway, the method comprising administering to the patient a therapeutically effective amount of a pharmaceutical composition of [31] above, or according to other embodiments of the invention.

[50]. A method for treating a metabolic disease or disorder in a patient wherein the disease or disorder involves the dysregulation of the mTOR-PP2A signaling axis, the method comprising administering to the patient a therapeutically effective amount of a pharmaceutical composition of [31] above, or according to other embodiments of the invention.

What is claimed is:

1. A compound, having a formula:

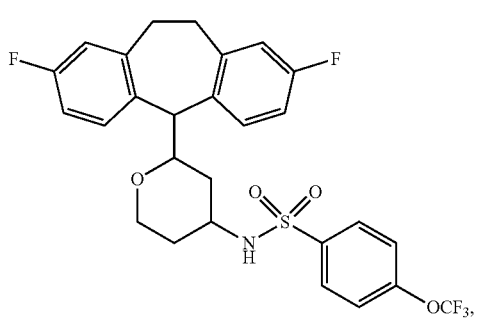 [SMILES: O=S(=O)(NC1CCOC(C2c3ccc(F)cc3CCc3cc(F)ccc32)C1)c1ccc(OC(F)(F)F)cc1]

or a pharmaceutically acceptable salt thereof.

2. A compound, having a formula:

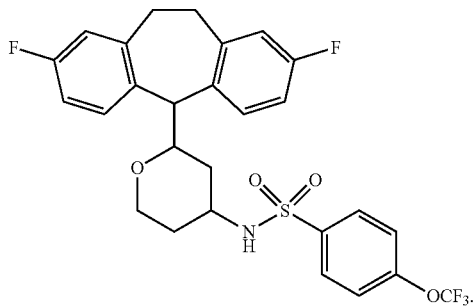 [SMILES: O=S(=O)(NC1CCOC(C2c3ccc(F)cc3CCc3cc(F)ccc32)C1)c1ccc(OC(F)(F)F)cc1]

3. A compound, having a formula:

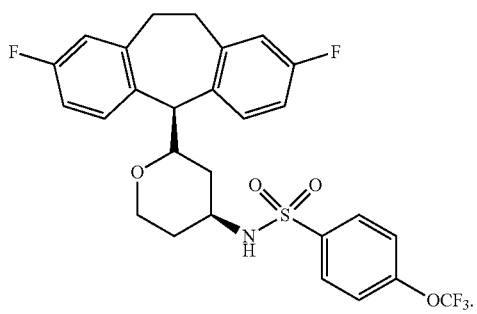

4. The compound of claim 1, having a formula:

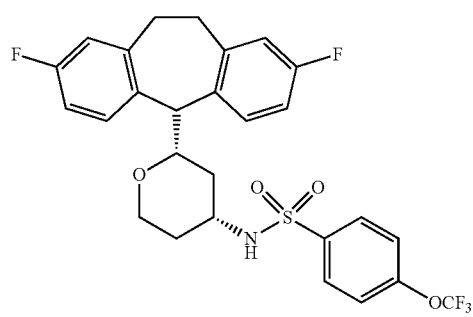 [SMILES: O=S(=O)(N[C@@H]1CCO[C@H](C2c3ccc(F)cc3CCc3cc(F)ccc32)C1)c1ccc(OC(F)(F)F)cc1]

or a pharmaceutically acceptable salt thereof.

5. The compound of claim 1, having a formula:

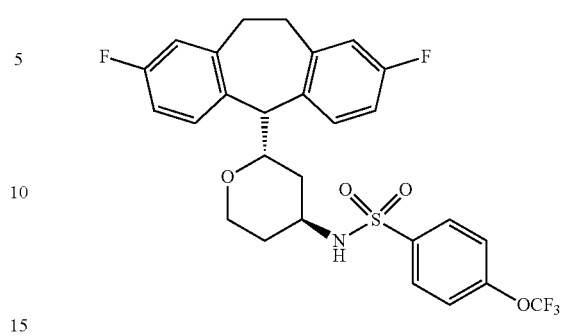

or a pharmaceutically acceptable salt thereof.

6. The compound of claim 1, having a formula:

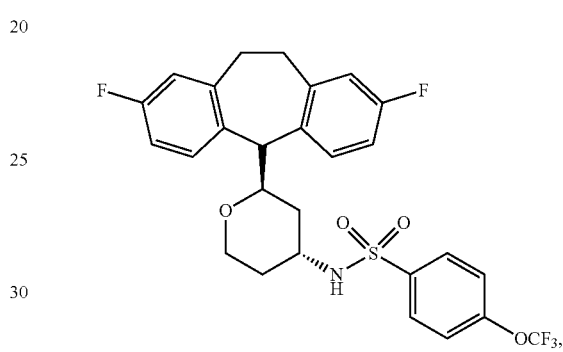

or a pharmaceutically acceptable salt thereof.

7. A composition, comprising the compound of claim 1.
8. A composition, comprising the compound of claim 2.
9. A composition, comprising the compound of claim 3.
10. A composition, comprising the compound of claim 4.
11. A composition, comprising the compound of claim 5.
12. A composition, comprising the compound of claim 6.
13. A pharmaceutical composition, comprising the compound of claim 1 and a pharmaceutically acceptable excipient.
14. A pharmaceutical composition, comprising the compound of claim 2 and a pharmaceutically acceptable excipient.
15. A pharmaceutical composition, comprising the compound of claim 3 and a pharmaceutically acceptable excipient.
16. A pharmaceutical composition, comprising the compound of claim 4 and a pharmaceutically acceptable excipient.
17. A pharmaceutical composition, comprising the compound of claim 5 and a pharmaceutically acceptable excipient.
18. A pharmaceutical composition, comprising the compound of claim 6 and a pharmaceutically acceptable excipient.
19. A method of preparing the compound of claim 1, comprising combining 4-trifluoromethoxybenzenesulfonyl chloride and an other compound in a mixture, the other compound having a formula

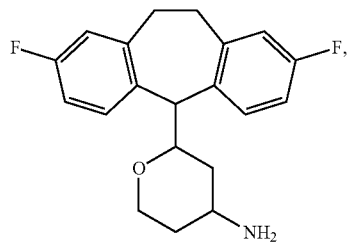 [SMILES: NC1CCOC(C2c3ccc(F)cc3CCc3cc(F)ccc32)C1]
thereby forming the compound.
* * * * *